United States Patent
Ellingson et al.

(10) Patent No.: US 10,546,139 B2
(45) Date of Patent: Jan. 28, 2020

(54) SYSTEMS AND METHODS FOR SECURELY TRANSMITTING LARGE DATA FILES

(71) Applicant: NTROPY LLC, Haymarket, VA (US)

(72) Inventors: John Ellingson, Haymarket, VA (US); Robert M. Hansen, Annandale, VA (US)

(73) Assignee: NTROPY LLC, Haymarket, VA (US)

( * ) Notice: Subject to any disclaimer, the term of this patent is extended or adjusted under 35 U.S.C. 154(b) by 0 days.

(21) Appl. No.: 16/046,564

(22) Filed: Jul. 26, 2018

(65) Prior Publication Data

US 2018/0357431 A1 Dec. 13, 2018

Related U.S. Application Data

(63) Continuation-in-part of application No. 15/493,572, filed on Apr. 21, 2017, now Pat. No. 10,057,269.

(51) Int. Cl.
*G06F 21/60* (2013.01)
*H04L 29/06* (2006.01)
(Continued)

(52) U.S. Cl.
CPC .......... *G06F 21/606* (2013.01); *G06F 16/178* (2019.01); *H04L 63/0428* (2013.01);
(Continued)

(58) Field of Classification Search
USPC ............ 726/7, 2, 21, 36; 713/150, 163, 181; 380/255, 264, 279
See application file for complete search history.

(56) References Cited

U.S. PATENT DOCUMENTS 6,055,637 A * 4/2000 Hudson ............... G06F 21/6218
709/225
8,321,670 B2 * 11/2012 Lior .................... H04L 63/0823
713/168
(Continued)

FOREIGN PATENT DOCUMENTS

KR 10-2014-0066230 A 5/2014

OTHER PUBLICATIONS

International Search Report from Korean Intellectual Property Office in International Application No. PCT/US2018/024521 dated Jul. 12, 2018.
(Continued)

*Primary Examiner* — Sharif E Ullah
(74) *Attorney, Agent, or Firm* — The Marbury Law Group, PLLC

(57) ABSTRACT

In methods, systems, and computing devices configured to implement methods of conveying a data file from a first computing device to a second computing device. A referential complex dataset (RCD) is stored in memory of a first computing device and a second computing device. The first computing device may compare bit strings within a data file to bit strings within the RCD to identify a matching bit string in the RCD, generate a set of rules for locating the matched bit string in the RCD, and transmit the rule set to the second computing device. The second computing device may receive the rule set, sequentially use each rule in the rule set to identify corresponding bit strings in the RCD in memory, and copy the identified bit strings into a memory to replicate the data file.

15 Claims, 25 Drawing Sheets

(51) Int. Cl.
  *H04W 12/02* (2009.01)
  *G06F 16/178* (2019.01)
  *H04L 29/08* (2006.01)
(52) U.S. Cl.
  CPC ............ *H04L 63/08* (2013.01); *H04L 63/102* (2013.01); *H04L 67/06* (2013.01); *H04W 12/02* (2013.01); *H04L 63/0272* (2013.01)

(56) References Cited

U.S. PATENT DOCUMENTS

| | | | | |
|---|---|---|---|---|
| 2003/0182327 | A1* | 9/2003 | Ramanujam | G06F 16/273 |
| 2004/0172423 | A1* | 9/2004 | Kaasten | G06F 16/1787 |
| 2007/0186115 | A1* | 8/2007 | Gao | H04L 63/0846 713/184 |
| 2008/0313698 | A1* | 12/2008 | Zhao | H04L 63/08 726/1 |
| 2010/0299308 | A1* | 11/2010 | Prasad | G06F 16/178 707/622 |
| 2011/0258161 | A1* | 10/2011 | Constantinescu | G06F 11/1453 707/640 |
| 2012/0167169 | A1* | 6/2012 | Ge | H04L 9/321 726/2 |
| 2012/0243679 | A1* | 9/2012 | Obana | G06F 21/6209 380/28 |
| 2013/0097117 | A1 | 4/2013 | Lasky et al. | |
| 2013/0276092 | A1* | 10/2013 | Sun | H04L 63/0227 726/13 |
| 2015/0039651 | A1* | 2/2015 | Kinsely | G06F 16/254 707/779 |
| 2015/0101037 | A1 | 4/2015 | Yang et al. | |
| 2016/0063466 | A1* | 3/2016 | Sheridan | G06Q 20/1235 705/26.25 |
| 2018/0357431 | A1 | 12/2018 | Ellingson et al. | |

OTHER PUBLICATIONS

Bocek, "Attack on Trust Threat Bulletin: Sony Breach Leaks Private Keys, Leaving Door Open", Venafi Blog, http://www.venafi.com/blog/attack-on-trust-threat-bulletin-sony-breach-leaks, 7 pages, (Jan. 19, 2017).
Cisco, "Dynamic Shared Secrets for the Cisco CMTS Routers", Cisco IOS CMTS Software Configuration Guide, 32 pages, (Feb. 14, 2008).
Juniper Networks, Inc., "Enabling IMS AAA Dynamic Authorization", 5 pages, (1999-2010).
Kwong, et al., "On the Feasibility and Efficacy of Protection Routing in IP Networks", University of Pennsylvania Scholarly Commons, Department of Electrical & Systems Engineering, 11 pages, (Dec. 10, 2009).
IBM Knowledge Center, "RSCS Dynamic Authorization Server Virtual Machine", 2 pages.
Stack Exchange, "What can an attacker do with a stolen SSL private key? What should the web admin do?", Information Security Stack Exchange, 2 pages, (Jan. 19, 2017).
Cnodder, et al., "RADIUS Dynamic Authorization Server MIB", Network Working Group, Request for Comments; 4673, 25 pages, (Sep. 2006).
Chiba, et al., "Dynamic Authorization Extensions to Remote Authentication Dial in User Service (RADIUS)" Network Working Group, Request for Comments: 5176, 35 pages, (Jan. 2008).
RSA, "Global Security Chiefs Over Five Recommendations to Overhaul Outdated Information Security Processes", http://www.rsa.com/en-us/company/newsroom/global-security-chiefs-offer-five-recommendations-to-overhaul, pp. 1-11, (Dec. 10, 2013).
DBIR, "2016 Data Breach Investigations Report—89% of breaches had a financial or espionage motive", Verizon 2016 Data Breach Investigations Report, pp. 1-85, (2016).
Grass, et al., "DRAFT NIST Special Publication 800-63B Digital Authentication Guideline, Authentication and Lifecycle Management", National Institute of Standards and Technology, U.S. Department of Commerce, pp. 1-48, (Nov. 18, 2015).
Wikipedia, "Man-in-the-middle attack", https://en.wikipedia.org/w/index.php?title=Man-in-the-middle_attack&oldid=753645501; 5 pages, (Dec. 8, 2016).
Pansa, et al., "Web Security Improving by using Dynamic Password Authentication", 2011 International Conference on Network and Electronics Engineering, pp. 32-36, (2011).
Amyx, "Managed PKI certificates: One step at a time toward securing the IoT", Unshackle the Internet of Things, TechBeacon, 14 pages, (2016).
Commission on Enhancing National Cybersecurity, "Report on Securing and Growing the Digital Economy", 100 pages, (Dec. 1, 2016).
Wikipedia, "Dynamic SLL", http://en.wikipedia.org/wiki/Dynamic_SLL, Dynamic SSL—Wikipedia, the free encyclopedia, pp. 1-4, (Aug. 25, 2016).
Glover, "PC1 3.1: Stop Using SSL and Outdated TLS Immediately", http://blog.securitymetrics.com/2015/04/pci-3-1-sss-and-tls.html; pp. 1-6, (Aug. 25, 2016).
Dierks, "The Transport Layer Security (TLS) Protocol Version 1.1", Network Working Group, https://tools.ietf.org/html/rfc4346?cm_mc_uid=55413578387314706858380&cm_mc_sid_50200000=1472153170, pp. 1-174, (Apr. 2006).
IBM, "The Secure Sockets Layer and Transport Layer Security", Verification of X.509 Public Key Certificates for Secure Communications, http://www.ibm.com/developerworks/library/ws-ssl-security, pp. 1-48, (Jun. 6, 2012).
RSA, "Two-Factor Authentication Is a Must for Mobile", https://blogs.rsa.com/two-factor-authentication-is-a-must-for-mobile, www.rsa.com, pp. 1-7, (Aug. 24, 2016).
Jarmoc, "Transitive Trust and SSL/TLS Interception Proxies, SecureWorks", http://www.secureworks.com/research/transitive-trust, pp. 1-21, (Mar. 21, 2012).
Lim, et al., "A Dynamic Key Infrastructure for Grid", Information Security Group, pp. 1-10.
Levi, et al., "An efficient, dynamic and trust preserving public key infrastructure", IEEE.org, IEEE Xplore Digital Library, 3 pages, (Aug. 6, 2002).
Dr. Dobbs, "The Book Cipher Algorithm", http://www.drdobbs.com/security/the-book-cipher-algorithm/210603676, 5 pages, (Sep. 24, 2008).
Meyburgh, "Dynamic Distributed Key Infrastructure DDKI, Tunnel Project with GateKeeper and KeyVault", A00214314, (COMP 8045 & COMP 8046), 47 pages.
Salem, et al., "The Case for Dynamic Key Distribution for PKI-Based VANETs", International Journal of Computer Networks & Communications (IJCNC), vol. 6, No. 1, 18 pages, (Jan. 2014).
Palo Alto Networks, "Government Endpoint", Use Case, 6 pages.
wnlabs, "One time pad security", http://www.wnlabs.com/solution.htm, 2 pages, (retrieved Jun. 13, 2017).
Whitenoise, "Unclassified story of Whitenoise Super Key Encryption and Dynamic Identity Verification and Authentication", 9 pages.
Hosseinkhani, et al., "Using image as cipher key in AES", IJCSI International Journal of Computer Science Issues, vol. 9, Issue 2, No. 2, ISSN (Online): 1694-0814, pp. 538-544, (Mar. 2012).
Haghighi, et al., "Optimizing run-length algorithm using octonary repetition tree", International Journal of Computer Science and Information Security (IJCSIS),vol. 14, No. 8, Aug. 2016, pp. 265-271.
Chandra, et al., "Frequency-Directed Run-Length (FDR) Codes with Application to System-on-a-Chip Test Data Compression", Department of Electrical and Computer Engineering, Duke University, 6 pages, Apr.-May 2001.
Venish et al., "Study of Chunking Algorithm in Data Deduplication," Proceedings of the International Conference on Soft Computing Systems, vol. 2, pp. 13-20, Advances in Intelligent Systems and Computing, 2006.
Dewakar et al., "Storage Efficiency Opportunities and Analysis for Video Repositories," Conference Paper • Jul. 2015, 6 pages, USENIX (HotStorage 2015) retrieved from https://www.researchgate.net/publication/278328640.

(56) References Cited

OTHER PUBLICATIONS

International Search Report and Written Opinion of the International Searching Authority received from the Korean Intellectual Property Office in related Application No. PCT/US2019/043535 dated Nov. 8, 2019.

* cited by examiner

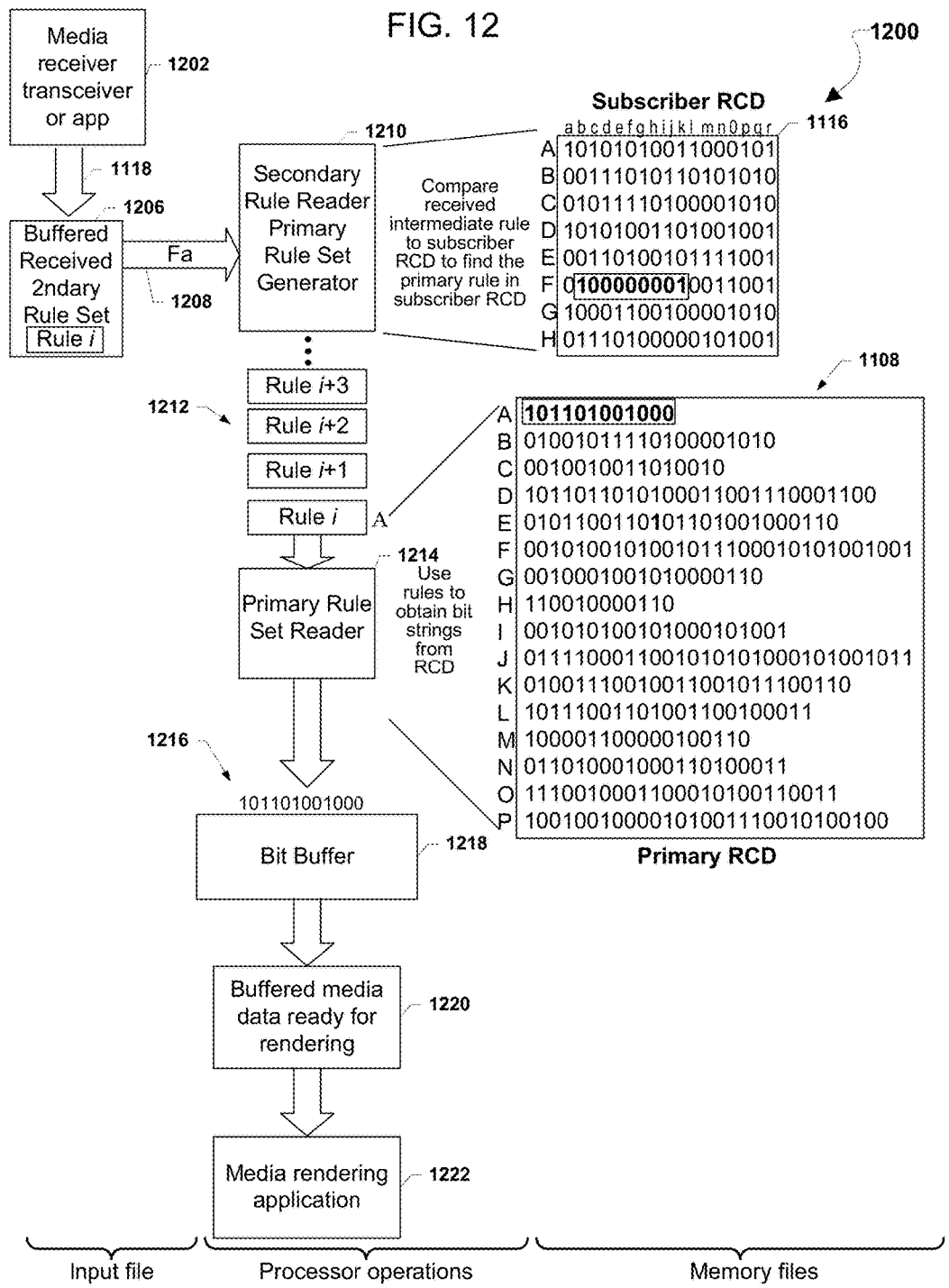

SYSTEMS AND METHODS FOR SECURELY TRANSMITTING LARGE DATA FILES

RELATED APPLICATIONS

This application is a continuation-in-part to U.S. application Ser. No. 15/493,572 entitled "Systems and Methods for Device Verification and Authentication" filed Apr. 21, 2017, the entire contents of which are hereby incorporated by reference.

BACKGROUND

The development of a digital environment has enabled a vast expansion in rapid communication, including the transmission of documents, photographs, movies, and other forms of information media, among other things. However, bandwidth is finite, and its scarcity imposes carriage limitations. For example, conventional email or SMS messaging systems readily enable the sending of a single photo, or a small group of photos. But such systems do not support the sending of, for example, an entire vacation album of photographs. As another example, the size of even a short home movie file exceeds the limits of conventional communication systems (e.g., email, SMS messaging). Typically, in order to share large files, or large numbers of files, users must resort to a third-party service to post large files to a remote server (e.g., Dropbox, Google Drive) and then provide a recipient with permission to access the remote server so that the recipient can download the file(s) from the remote server.

SUMMARY

Various embodiments include methods of encoding a large file for transmission by referencing long strings of bits in the file that match to bit strings within a data set that is shared between a first computing device and a second computing device and only transmitting the references, which are referred to herein as rules. Various embodiments may include storing a referential complex dataset (RCD) in memory of the first computing device and in memory of the second computing device, performing by a processor of the first computing device the following operations sequentially on the data file until the entire data file has been processed: comparing bit strings within the data file to bit strings within the RCD to identify a matching bit string in the RCD, generating a rule for locating the matched bit string in the RCD, and storing the generated rule sequentially in a rule set; and then transmitting the rule set to the second computing device.

In some embodiments, storing the RCD in memory of the first computing device and in memory of the second computing device may include generating, by the processor of the first computing device, a rule for changing the RCD stored in memories of both the first computing device and the second computing device, applying, by the processor of the first computing device, the generated rule to the RCD stored in memory of the first computing device to generate a changed RCD, and transmitting the rule to the second computing device in a format that will enable a processor of the second computing device to apply the rule to the RCD to generate the changed RCD in the second computing device.

In some embodiments, storing the RCD in memory of the first computing device and in memory of the second computing device may include generating the RCD by the processor of the first computing device, and transmitting the RCD to the second computing device for storage. In some embodiments generating the RCD by the processor of the first computing device may include analyzing one or more data files representative of the data file to be transmitted to identify long bit strings that appear at least a threshold number of times, storing in the RCD each long bit string that appear at least a threshold number of times, and generating an index for locating each long bit string stored in the RCD, and wherein generating a rule for locating the matched bit string in the RCD and storing the generated rule sequentially in a rule set comprises storing the index for the matched bit string in the rule set. Some embodiments may further include generating metadata corresponding to each long bit string stored in the RCD that provides information useful for comparing data files to the RCD to identify matching long bit strings, and storing the generated metadata in association with the corresponding long bit string, wherein comparing bit strings within the data file to bit strings within the RCD to identify a matching bit string in the RCD comprises using metadata associated with a matched bit string in the RCD to determine whether a longer bit string including the same matched bits exists in the RCD.

Some embodiments may further include storing a subscriber RCD in memory of the first computing device and in memory of the second computing device, performing by the processor of the first computing device the following operations sequentially on the rule set until the entire rule set has been processed: comparing a bit string of each rule in the rule set to bit strings within the subscriber RCD to identify a matching bit string in the subscriber RCD, generating a secondary rule for locating the matched bit string in the subscriber RCD, and storing the generated secondary rule in a secondary rule set, wherein transmitting the rule set to the second computing device comprises transmitting the secondary rule set to the second computing device.

Some embodiments may further include receiving the secondary rule set in the second computing device, sequentially using each secondary rule in the secondary rule set to identify corresponding bit strings in the subscriber RCD in memory, using the identified corresponding bit strings in the subscriber RCD as rule to identify corresponding bit strings in the RCD in memory, and copying the identified bit strings into a memory to replicate the data file. In some embodiments, the data file to be transmitted is a multimedia file and analyzing one or more data files representative of the data file comprises analyzing one or more multimedia files having a similarity to the multimedia file to be transmitted.

Some embodiments may further include receiving the rule set in the second computing device, sequentially using each rule in the rule set to identify corresponding bit strings in the RCD in memory, and copying the identified bit strings into a memory to replicate the data file. Some embodiments may further include processing the replicated data file using an application compatible with the data file processed by the first computing device.

Various embodiments may include method of receiving a data file in a first computing device from a second computing device, including storing a referential complex dataset (RCD) in memory of the first computing device that matches an RCD stored in the second computing device, receiving a rule set from the second computing device, sequentially using each rule in the rule set to identify corresponding bit strings in the RCD in memory, and copying the identified bit strings into a memory to replicate the data file. Some embodiments may further include processing the replicated data file using an application compatible with the data file.

Some embodiments may further include storing a subscriber RCD in memory of the first computing device, receiving a secondary rule set from the second computing device, sequentially using each secondary rule in the secondary rule set to identify corresponding bit strings in the subscriber RCD in memory, using the identified corresponding bit strings in the subscriber RCD as rule to identify corresponding bit strings in the RCD in memory, and copying the identified bit strings into a memory to replicate the data file.

Various embodiments further include computing devices configured with processor-executable instructions to perform operations of the methods summarized above. Various embodiments further include a system including a first computing device and a second computing device, each configured to perform operations of the methods summarized above. Various embodiments further include a non-transitory processor-readable storage medium having stored thereon processor-executable instructions configured to cause a processor of computing device to perform operations of the methods summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 12 is a block diagram illustrating a method of receiving and reproducing a file based on received rules, a shared RCD and a shared subscriber RCD according to some embodiments.

DETAILED DESCRIPTION

Figure 1A:
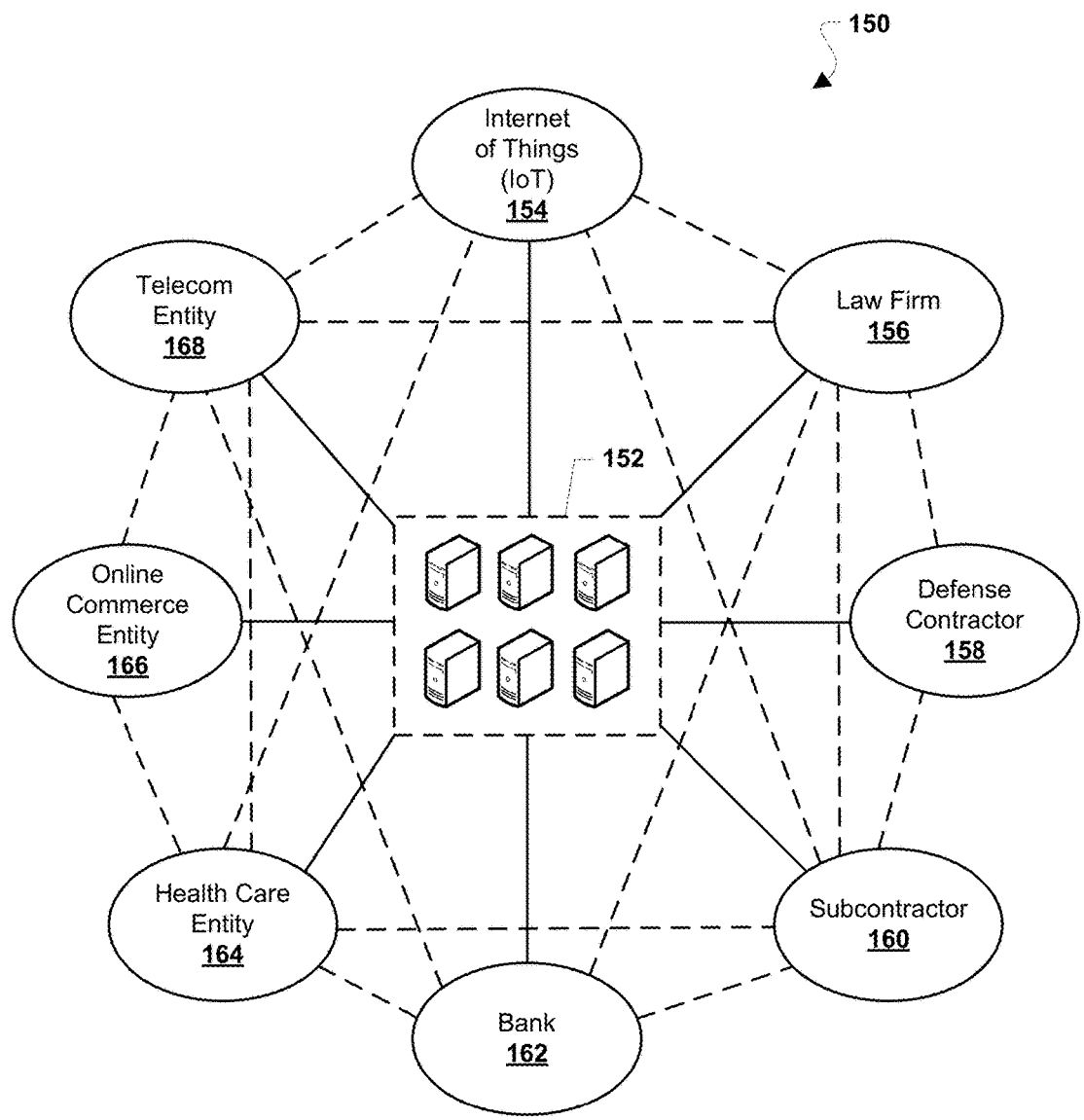
FIGS. 1A-1C are component block diagrams of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include systems and methods for sending data files, particularly multimedia files, between computing devices by using a shared data set. The shared data set may be compiled over time, and may be changed by a computing device occasionally, periodically, and/or upon the occurrence of a triggering event. Changing or altering the shared data set may include reordering one or more portions of the data set, adding information to the data set, subtracting information from the data set, and/or transforming one or more portions of the shared data set. Changing or altering the shared data set is sometimes referred to herein as "transforming" the shared data set.

In some embodiments, the shared data set may a referential complex database (RCD), which is a complex shared data set that may contain a plurality of files. In various embodiments, the RCD includes a large amount of binary data, which may be randomized or specially configured to include strings of bits predicted to appear in files to be transferred. In some embodiments, the plurality of files may include a plurality of image files. In some embodiments, the computing devices may use an agreed upon method for altering the RCD so that the RCD changes over time enable both computing devices to alter the RCD while maintaining an identical shared data set. In some embodiments, the method for altering the shared data set may be agreed to by the computing devices in advance. In some embodiments, the method for altering the shared data set may be agreed to dynamically by the computing devices (e.g., "on the fly").

As an example, a shared data set may include two or more image files, and each image file may include numerous pixels (picture elements). Each image file may be associated with additional data, such as a time stamp or other time information, location information and/or geolocation information where the image was obtained, weather information, and the like. Each pixel may be associated with a large number of information elements, such as a coordinate location in an image, color, intensity, luminosity, and the like. Each pixel may also be associated with the information of its respective image file. Thus, each pixel may be associated with a large number of information elements, which may be considered variables. In some embodiments, the rule set may include information identifying one or more pixels of the shared data set. In some embodiments, the rule set may include information identifying one pixel of the shared data set, and relationship information that enables the identification of one or more other pixels using the identified first pixel and the relationship information.

However, the shared data set is not limited to image files, and a shared data set may be generated or compiled using data that may include identifiable data elements, and/or in which relationships between or among two or more data elements may be determined. Examples of such data include video files, audio files, biometric samples, location data (e.g., Global Positioning Satellite system data), and the like.

Various embodiments employ processing on a file to be sent that identifies large chunks of data that match chunks of data in the RCD and determines rules for finding matching chunks in the RCD. The determined rules can then be transmitted to a computing device that shares the same RCD, which enables the receiving computing device to reconstruct the file by using the rules to find the corresponding data chunks and copy the data chunks into a file buffer. The rule to locate a chunk of data in the RCD may be significantly smaller than data itself. This enables a large amount of information to be conveyed from the transmitting computing device to the receiving computing device without actually transmitting the data itself because the stream of rules enables a recipient to find the data in their corresponding synchronized copy of the RCD. Instead of compressing data, adding error correction data, and then sending the actual file in packets, the raw binary data is conveyed by the exchange of the RCD in advance. Later, to convey a file to the receiver, the transmitter sends only the rules for finding the data within the RCD, and the receiver uses the rules to find the data to replicate the file (e.g., video, audio, text, etc.). Thus, large files can be provided to a receiving computing device without actually sending the file. Further, files can be sent and rendered in this manner using any conventional communication network and protocol, and rendered using any conventional rendering or editing software compatible with the original file.

Various embodiments have particular applicability in communication situations in which conserving bandwidth or transmitting a large amount of information within limited bandwidth is more important than the time required to prepare the information for transmission. Such situations are common in many forms of modern telecommunications. For example, video streaming on-demand via the Internet (e.g., the services provided by Netflix®, Hulu®, YouTube, etc.) requires uninterrupted playback, but the video is stored in server farms with the video files formatted for transmission via Internet protocols hours, days or months in advance of being accessed and played by subscribers. As another example, users desiring to use their smart phones to transmit a large image or video file that exceeds the email or messaging capacity of their network service have the option today of forwarding the file via the Internet to a third party, which is slower than a direct transmission.

For example, in the multimedia application, a media service (e.g., Netflix®, Hulu®, etc.) may deliver the RCD as part of a subscription sign-up process. The delay in transmitting the large amount of information that is in the RCD will typically be acceptable to a user as part of the sign-up or application registration process. Once that sign-up delivery of the RCD is been accomplished, various embodiments enable the communication of very large files through the transmission of rule sets that point to large chunks of data within the RCD to be loaded into a play buffer so that a media application can render the media as if the media file had been transmitted directly. Thus, with the advance delivery of the RCD to the recipient computing device and the pre-transmission processing of the information (text, video, audio, etc.) to generate the rule set, large media files can be transmitted through limited bandwidth communication channels with fidelity. The further encoding of the file information into rule sets may also enable improved delivery or rendering of the file by the receiving device.

The use of the RCD as a repository for chunks of binary data indicated by rule sets solves four problems that are common in communication situations.

First, by using rule sets that point to pre-deployed chunks of data, significant data compression is achieved by avoiding sending the information itself, by transmitting rules that enable the recipient to reconstruct the information. This ability to compress information for transmission can be equally applied to data files that have been compressed by other methods. Thus, greater data compression and greater transmission efficiency may be achieved using various embodiments.

Second, the rule set provides a form of encryption of the information, since the information itself is not transmitted. Thus, various embodiments provide an effective means of securing the information, as well as protecting privacy rights of the users.

Third, by linking the rule sets that are transmitted to the particular RCD in possession of the recipient and the transmitter, the various embodiments provide an effective protection for intellectual property rights. Delivery of the RCD to a recipient via a subscription sign-up process provides an efficient digital rights management (DRM) process that is as robust as the mechanisms employed for "transforming" the RCD at the transmitter and receiver devices as described herein.

Fourth, various embodiments provide robust communication of information through imperfect communication channels by preloading the raw bit level information in the RCD and using short rule set transmissions to enable replication at the receiver end. This enables high redundancy to be implemented in the rule set to increase the probability that all rule sets will be received, while ensuring that single bit errors are all but eliminated. These benefits are all achieved using standard communication channels and enable support by standard media players.

In various embodiments, the RCD may be any form of data file that has sufficient size and variability in the bit string patterns to support the encoding methods. The key is to have sufficient variability and sufficiently extensive bit patterns to enable matching long bit strings in the RCD to bit strings In the to a file to be transmitted. For example, the RCD may range from one or more photographs shared between two parties to a carefully crafted data file that has data patterns statistically developed to match a particular type of information to be transmitted broadly.

In embodiments suitable for messaging and the exchange of large data files between individuals, the RCD may be any large file that is shared between the two parties. For example, a party seeking to send large data files to another may first provide a large file, such as a photograph or another digital image, to the other, followed by rule sets based on the files to be transferred and the shared photograph. As a particular example, if a first party is desires to send a large number of photographs to another party, one photograph may be transmitted using normal communication protocols, such as messaging or email. For example, if a person desires to transmit vacation photographs to another, the person may select a particular photograph that is representative of a majority of the photographs to be transmitted. For instance, if the majority of photographs involve scenic views, the suitable photograph to serve as the RCD may be an average scenic view image. Such an image is likely to have large data segments that match data strings in the other similar photographs. Once the selected photograph has been transmitted, the sender's computing device performs the operations of developing rule sets for the rest of the photographs to be transmitted, followed by transmission of the generated rule sets to the other party.

As another example, if a lawyer seeks to send a large number of documents in a secure manner to a client (e.g., a doctor), the lawyer may select a first document that is not necessarily confidential, and send that document via message or electronic mail to the client. After that, the lawyer's computing device may generate rule sets for the rest of the documents to be transmitted using the exchanged document as the RCD. Text documents are likely to include large data segments that match those of other written documents, and thus the exchanged document provides a suitable RCD. According to various embodiments, transmitting only the rule set to the client provides a level of encryption suitable to prevent unauthorized parties from "intercepting" the documents, at least because the documents themselves are not transmitted and the rules that are transmitted are only useful when applied to the shared RCD. Further security can be provided by changing the document used as the RCD, or by both the sender and the receiver altering the RCD document using the same alteration method.

In some applications, the RCD may be crafted based on statistical math analysis of files to be transmitted so that the RCD contains large strings of binary values representative of the type of data to be transmitted. Thus, the RCD may appear to be complete gibberish in that the data within the RCD does not translate to any particular images, characters or usable information. An example of such an application is the transmission of movies and similar multimedia from a central repository (e.g., Netflix®, Hulu®, etc.) to subscribers. In this application, the media supplying service may use a computer to perform statistical analysis on the raw data of a number of movies (or other media) to identify large repetitive strings of binary information and arrange the identified strings into a data set with appropriate indexing or addressing capabilities for use in generating rule sets. This may be accomplished using any of a variety of methods of identifying repeating blocks of data, including known methods used for compressing data files. As an example, a movie download service may analyze a large number of movies within a given genre and use this analysis of such movies to generate a genre-specific RCD. The reason for this is that the bit patterns of action films, which include explosions and fast-moving scenes, may have a different characteristic pattern than romantic comedy movies, which will feature more facial images and fewer outdoor scenes. As a video download service anticipates transmitting videos via the Internet over a long period of time, the investment in time and money to perform the statistical analysis of movies to generate genre-specific RCDs is offset by the long-term savings and improved subscriber satisfaction from transmitting movies via data sets linked to RCD data files. Further, movie RCD data files may be customized to a particular subscriber through transformation of the RCD according to an algorithm specific to the subscriber, thereby also solving the digital rights management challenge faced by such companies.

In some embodiments, the statistical analysis involved in generating a data file specific RCD may be similar to a process for graphing the frequency at which particular bit strings appear in the media to be transmitted. The computing device may begin by reading raw bit strings from a file into a buffer and comparing segments of newly read data to segments already stored in the buffer to identify matching patterns. As soon as a bit is read that doesn't match a pattern stored in the buffer, the buffer contents may be stored as a first data string in memory. The computer may then continue to read bit strings comparing bit sequences both against the strings already stored in memory and against the next read bid until a pattern break is detected (i.e., the next bit does not match a bit in either the buffer or a stored data string), which identifies the end of another data segment. As this process is continued, larger and larger bit string patterns will be identified. If the bit string being read in matches a stored data string completely, the data string may continue to be stored in a new data file.

A media distributing service implementing various embodiments may use the RCD as both a mechanism for reducing the bandwidth required to transmit a multimedia file (e.g., a movie) as well as to detect digital rights and subscription compliance. Subscribers should accept the time required to upload the RCD as part of the process and time required to initiate a subscription. The media distribution service may generate a subscriber-specific RCD from a media-optimized standard RCD by transforming the data elements so that different rule sets are required to access the same bit patterns. Thus, each subscriber may be associated with (and may receive) a unique version of the statistically optimized RCD used by the media distributor. Further, each media distribution service can generate its own RCD through its own statistical analysis of media files, and such RCDs should not be interchangeable (i.e., a subscriber to one service cannot receive files from another service using the same RCD). Moreover, since each subscriber receives a unique version of the RCD, subscribers cannot share multimedia files by sharing rule sets, because a rule set will only indicate the correct data elements in one subscriber's RCD.

The media distribution service may generate subscriber-specific RCDs by moving around or transforming the bit strings according to a proprietary algorithm that may be linked to a subscriber reference number. Thus, the media distribution service need not save an RCD for every subscriber. Instead, the subscriber reference number and the algorithm used to shuffle the basic RCD may be used as part of generating a subscriber-specific rule set for a particular rendition of the media file.

To ensure that digital rights are protected, and in particular, preventing unauthorized use or viewing of media files by intercepting or copying the rule set, the RCD used in a particular download and play out of a media file may be transformed or randomized per the methods described herein. The further, the rule set for playing a media file may be adjusted using an algorithm that is tied to the algorithm used in transforming the RCD for a particular plan. Thus, the media distribution service can provide an appropriate level of security to protect digital media rights while avoiding the need to generate new rule sets for each subscriber or each rendition of the media file. While the limited shuffling of the RCD using such algorithm-based mechanisms tied to individual subscriber identifiers may not may prevent cracking by a sophisticated party, the protections afforded should be more than sufficient to satisfy digital rights protection required by copyright holders.

Alternatively, the rule set transmitted to a subscriber to enable playback of a media file may be encrypted using standard multimedia distribution encryption methods. Thus, digital rights management protections may be afforded without the need for shuffling the RCD for each play out. Since the amount of information required to transmit the rule set is substantially less than the data required to transmit the entire media file, encryption of the rule set is an affordable alternative.

Generation of subscriber-specific RCD files tied to individual subscribers may be accomplished simply using a subscriber reference number as a shift index. Since shifting the bit locations by a single digit will render the rule set inoperable, the RCD data set may be shifted by the subscriber-unique reference number. In this way, each subscriber will receive a subscriber-specific RCD file and the media delivery service can generate that adjust the rule set simply by adding the subscriber's reference number using binary addition. Many other forms of transforming or individualizing the RCD files may also be used.

In a further embodiment, media distribution services may simplify the media RCD by using a second RCD for the purpose of obfuscating or customizing the rule set for individual subscribers. In such embodiments, a primary RCD may be crafted by the media delivery service through statistical analysis of multimedia files (e.g., movies or particular versions of movies) and organize the bit fields within that RCD according to a simple index. For example, the most common bit pattern may be identified with the index value '1' and the second most common bit pattern may be indexed with the with "2" and so forth. While this RCD enables simple rule sets (e.g., just the index value for particular bit string), it may be difficult to transform or develop an algorithm for assembling rule sets associated with the transformed RCD. Therefore, a second RCD that is smaller and used for other determining rule sets associated with the primary RCD may be used. In such embodiments, all subscribers may be provided with the primary RCD and individual subscribers may be provided with a subscriber-specific secondary RCD that is unique and to each subscriber. In such embodiments, the media distribution service develops rule sets for rendering a particular media file (e.g., particular movie), and then determines a secondary rule set based on the subscriber-specific secondary RCD that will enable the subscriber's computing device to render the primary rule set. The media distribution service then transmits the secondary rule set to a subscriber's computing device requesting access to a particular media file, and the subscriber's computing device uses the received rule set to obtain the primary rule set (e.g., index values) using the subscriber's secondary RCD, and then uses the primary rule set to reproduce the media file for rendering by a conventional media player.

Such embodiments have the advantage of simplifying the generation of primary RCDs because the need to transform or obfuscate that file is removed. Digital media rights are still protected by the use of the secondary RCD, because the rule sets received by a subscriber can only be used with that subscriber's secondary RCD. Further, the secondary RCD may be much smaller, and thus easier to transform according to an algorithm that can be used to simply generate the secondary rule set. Such embodiments retain the advantage of transmitting a smaller data set when delivering a media file as well as ensuring that individual subscribers are managed with respect to digital meteorites and subscription compliance.

In such embodiments, the media distribution service may download both the primary RCD or RCDs and the subscriber specific secondary RCD during the subscription sign-up process. The secondary RCD may then be transformed each time the subscriber orders a media file, periodically (e.g., monthly with each subscription payment), or not at all, depending upon the media delivery service's business model. As with other embodiments, the media rendering application may be a standard player as the output of the embodiment systems on the subscriber's computing device is the standard media bit string for media. Thus, various embodiments may be implemented as an intermediary media receiver application that integrates (e.g., interoperates) with media data transmission protocols (e.g., Internet protocol) and standard media players.

Various embodiments may be implemented within a variety of communication systems 150, an example of which is illustrated in FIG. 1A. The communication system 150 may include a variety of entities that may communicate using a communication network, such as an IoT network 154, a law firm 156, a defense contractor 158, a subcontractor 160, a bank 162, a health care entity 164, an online commerce entity 166, and a telecom entity 168. Each of the entities 154-168 may communicate with and among each other. Each of the entities 154-168 may also communicate with a certificate authority 152. The certificate authority 152 may include one or more computing devices configured to perform operations to enable the authentication of a computing device, as further described below. The entities 154-168 are merely exemplary, and the communication network 150 may include a wide variety of entities, including entities that may handle health care records, secure communications (e.g., for a business or government agency), public records, voting systems, financial services, security brokerage systems, IoT communications, commercial transactions, and a wide range of other contexts.

Figure 1B:
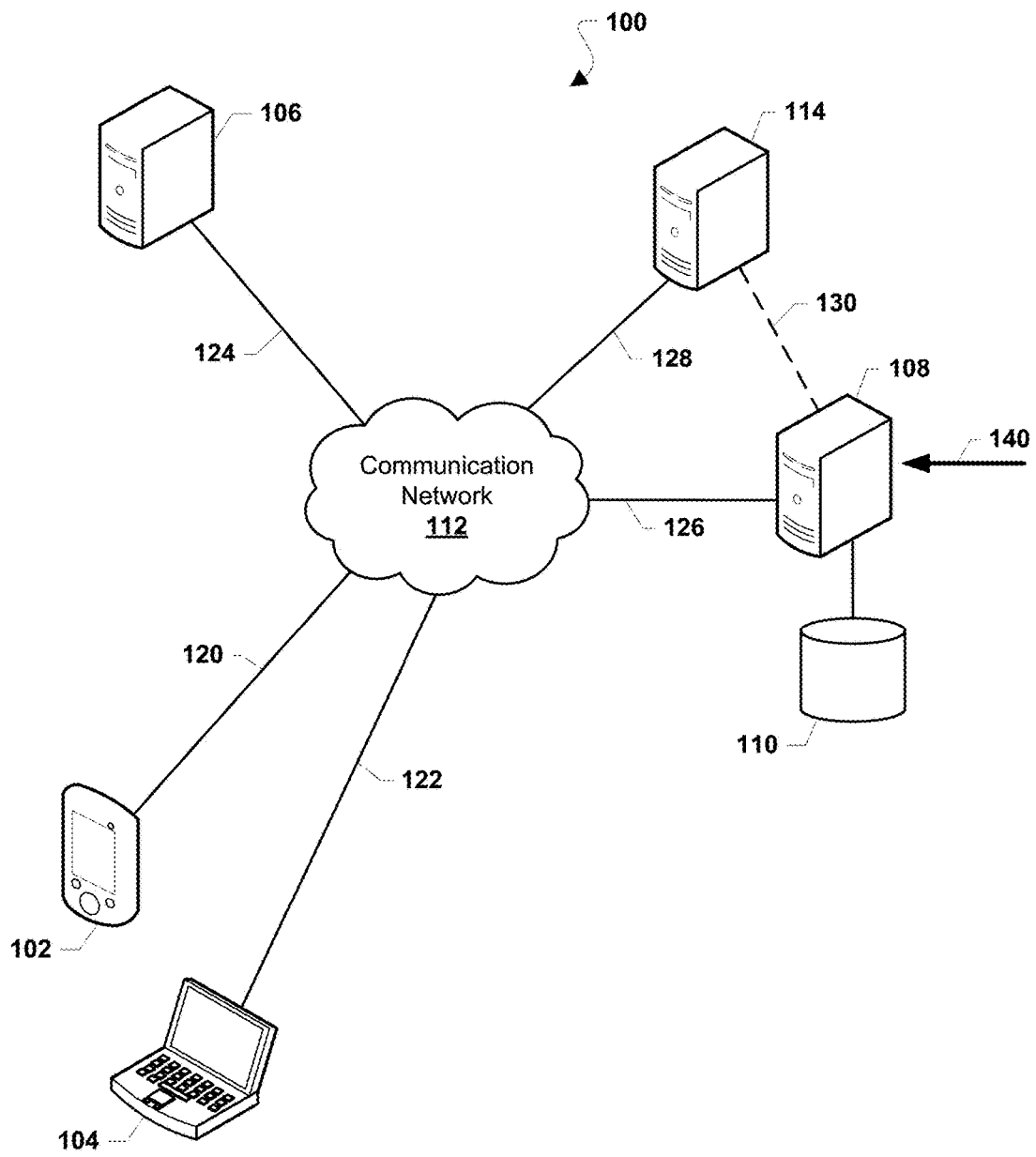

Various embodiments may be implemented within a variety of communication systems 100, an example of which is illustrated in FIG. 1B. With reference to FIGS. 1A and 1B, the elements of communication system 100 may be used in any of the entities 154-168. The communication system 100 may include computing devices 102, 104, 106, and 108. In some embodiments, the computing devices 102 and 104 may include a computing device used directly by a user, such as a smart phone, a laptop computer, a desktop computer, and the like. It will be understood that a user may operate more than one such computing device similar to the computing devices 102 and 104. In some embodiments, the computing devices 102 and 104 may include one or more IoT devices. Non-limiting examples of IoT devices include personal or mobile multi-media players, gaming systems and controllers, smart televisions, set top boxes, smart kitchen appliances, smart lights and lighting systems, smart electricity meters, smart heating, ventilation, and air conditioning (HVAC) systems, smart thermostats, building security systems including door and window locks, vehicular entertainment systems, vehicular diagnostic and monitoring systems, machine-to-machine devices, and similar devices that include a programmable processor and memory and circuitry for establishing wireless communication pathways and transmitting/receiving data via wireless communication pathways. The computing devices 102 and 104 may also include an unmanned, autonomous, semi-autonomous, or robotic vehicle capable of travel of travel on land, sea, air, or in space. The computing devices 102 and 104 may further include a smart firearm or another processor-equipped weapon or weapon system.

In some embodiments, the computing devices 106 and 108 may include a back-end computing device such as a server. In some embodiments, the computing device 108 may communicate with an electronic security system 114 over a communication link 130. In some embodiments, the computing devices 106 and 108 (and possibly the computing device 114) may be operated by one entity. For example, a health care entity 164 or a telecom entity 168 may operate one or more of the computing devices 106, 108, and/or 114. In some embodiments, the computing devices 106, 108, and 114 may be operated by more than one entity.

Each of the computing devices 102, 104, 106, and 108, and the electronic security system 114 may communicate with a communication network 112 over a respective communication link 120, 122, 124, 126, 128, and 130. In some embodiments, the communication network 112 may include two or more communication networks. The communication links 120, 122, 124, 126, 128, and 130 may include wired or wireless communication links, and may further include additional devices to facilitate communication between the computing devices 102, 104, 106, and 108, the electronic security system 114, and the communication network 112. Examples of such additional devices may include access points, base stations, routers, gateways, wired and/or wireless communication devices, as well as backhaul communication links that may include fiber optic backhaul links, microwave backhaul links, and other suitable communication links.

In some embodiments, the computing devices 102, 104, 106, and 108, and the electronic security system 114 may be part of a secure network, such as an internal enterprise network, a government agency secure network, a virtual private network (VPN), or another similar network environment. In such a secure network, the communication links 120, 122, 124, 126, 128, and 130 may include additional security, such as encryption at one or more layers (i.e., Open Systems Interconnection (OSI) layers), and other implementations to secure communications along the communication links 120, 122, 124, 126, 128, and 130.

In some embodiments, the computing device 106 may be configured to perform operations related to information transactions in a variety of contexts, including, without limitation, health care record management, secure communications, public records management systems, voting systems, financial services systems, security brokerage systems, as an IoT device controller, to perform a commercial transaction, as well as other contexts. In some embodiments, the computing device 108 may be configured to perform operations related to generating and/or obtaining transitory identities, and authentication of a computing device such as one or more of the computing devices 102, 104, and 106, as further described below.

In some embodiments, the electronic security system 114 may be configured to perform network monitoring or network security functions, such as a network monitoring system, a key logging system, or another similar system. In some embodiments, electronic security system 114 may detect an unauthorized user or electronic intruder using or accessing the communication network 112, and may send an indication to the computing device 108 of the detection of the unauthorized user or electronic intruder. In some embodiments, the electronic security system 114 may be configured to monitor for and/or detect unauthorized accesses of a system, memory, network element, or component of a network element from an otherwise authorized user (e.g., an "insider" threat). In some embodiments, the electronic security system 114 may be configured to receive a command or an indication that a computing device should be de-authorized from access to the communication system. For example, the electronic security system 114 may be a component or an element of a network authorization system, or a human resources system, or a system that provides a list of authorized users of the communication system, or another similar system. In such embodiments, the electronic security system 114 may receive a command or another message indicating that an authorization of a computing device should be removed or blocked. In some embodiments, in response to receiving an indication that an unauthorized user or electronic intruder has been detected, that a computing device authorization should be removed or blocked, or another similar indication, the computing device 108 may send an instruction to one or more of the computing devices 102, 104, and 106 to obtain a new transitory identity, as further described below.

The communication network 112 may include a variety of communication networks, including communication networks within an entity or enterprise, and external communication networks, publicly available communication networks, and combinations of networks as well as internetworks, including the internet. The communication network 112 may support communications using one or more wired and wireless communication protocols. Each of the communication links 120, 122, 124, and 126 may be two-way wired or wireless communication links. Wireless communication protocols may include one or more radio access technologies (RATs). Examples of wireless RATs include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other RATs. Examples of RATs may also include Wi-Fi, Bluetooth, Zigbee, LTE in Unlicensed spectrum (LTE-U), License Assisted Access (LAA), and MuLTEfire (a system that uses LTE on an unlicensed carrier band). Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

While the communication links 120, 122, and 124 are illustrated as single links, each of the communication links may include a plurality of wired or wireless links, such as plurality of frequencies or frequency bands, each of which may include a plurality of logical channels. Additionally, each of the various communication links 120, 122, and 124 may utilize more than one communication protocol.

The computing device 108 may communicate with a data store 110, such as a memory device, database, server device, or another device capable of storing data. In some implementations, the data store 110 may store an audit trail and associated metadata.

The computing device 108 may receive data inputs 140 over time. The data inputs 140 may include information that the computing device 108 may use to generate a data set that can be shared with another computing device (e.g., the computing devices 102, 104, and 106). The data inputs 140 may include, for example, images, photographs, video, sound recordings (e.g., music, ambient sound recordings, or another such recording), biometric information inputs (e.g., facial recognition scans, iris scans, DNA samples, a voice-print recordings, fingerprints, and the like), or any other such data input.

Figure 1C:
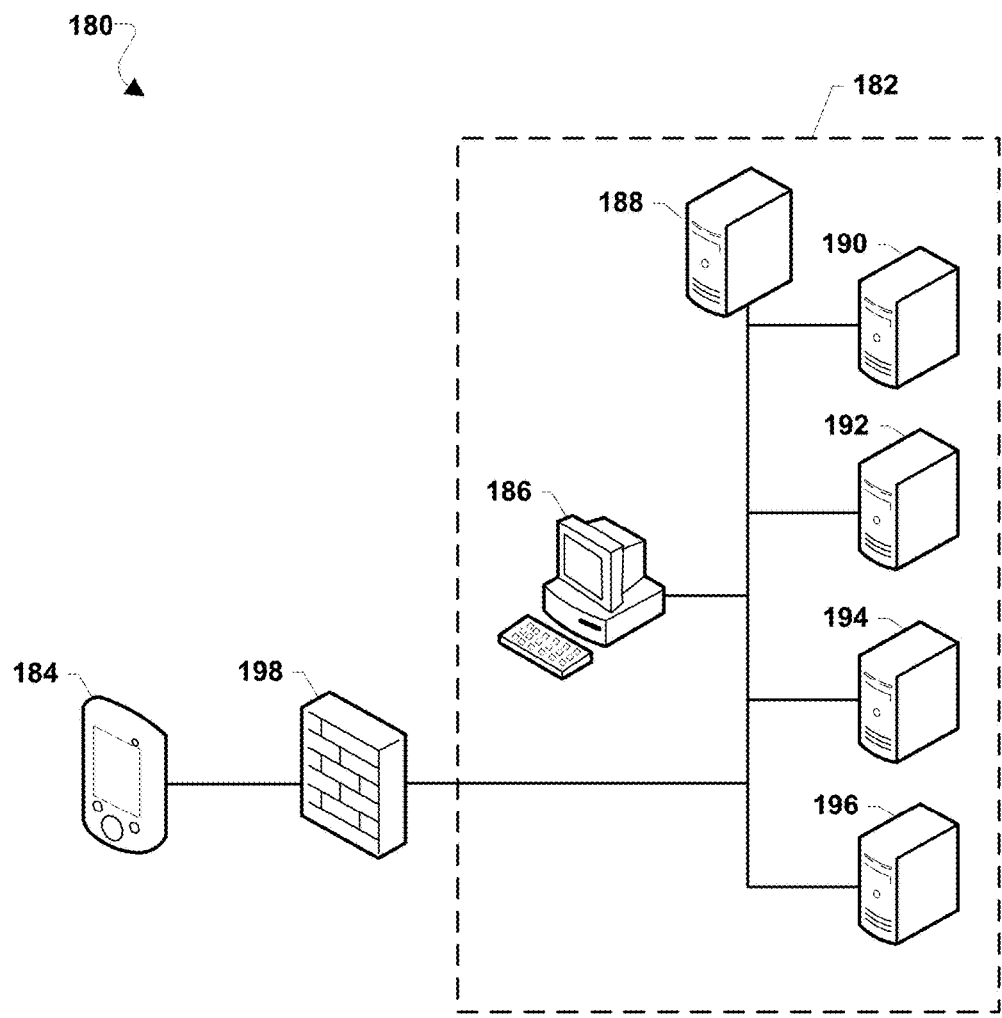

Various embodiments may be implemented within a variety of communication systems 180, an example of which is illustrated in FIG. 1C. With reference to FIGS. 1A-1C, the elements of communication system 150 may be used in any of the entities 154-168. The communication system 180 may include computing devices 184, 186, 188, 190, 192, 194, and 196. The computing devices 190-196 may include network elements, such as file servers, databases, or other similar network-accessible data sources. The computing devices 184 and 186 may include any form of user-operable network terminal, and may be similar to the computing devices 102 and 104. The computing devices 186-196 may be elements in a communication network 182, access to which may be protected by a device configured to protect electronic access to the communication network 182, such as a firewall 198.

Conventional communication security implementations, such as the firewall 198, may protect the network 182 against attacks or exploitation by an external device, such as the computing device 184. However, the firewall 198 may not protect the network 182 against attacks or explication from a device that is inside the firewall 198, such as the computing device 186.

Various embodiments may include the computing device 188 (which may be similar to the third computing device 108), which may be configured to perform operations related to generating and/or obtaining transitory identities, and authentication of an identity of a computing device such as one or more of the computing devices 184, 186, 190, 192, 194, and 196.

In various embodiments, while the firewall 198 may be employed to perform network operations such as traffic monitoring, gateway functions, routing, and other similar functions, the firewall 198 may not perform a security function or an authentication function of devices such as the computing devices 184 and 186. Rather, in the communication system 180, the computing devices 184 and 186 may communicate with the computing device 188 and/or with each other, enabling authentication of an identity of each of the computing devices 184 and 186, as well as, in some embodiments, an identity of the computing device 188. Similarly, while the communication system 180 may use inputs received at the computing device 184 or 186, such as a username and password, to identify a purported user or as a pointer to a user account, communication system 180 may not use credentials such as a username and password for security purposes or for authentication purposes. Rather, the communication system 180 may authenticate the identity of the computing devices 184 and 186 based on transitory and/or dynamic information of each computing device, as further described below.

Figure 2:
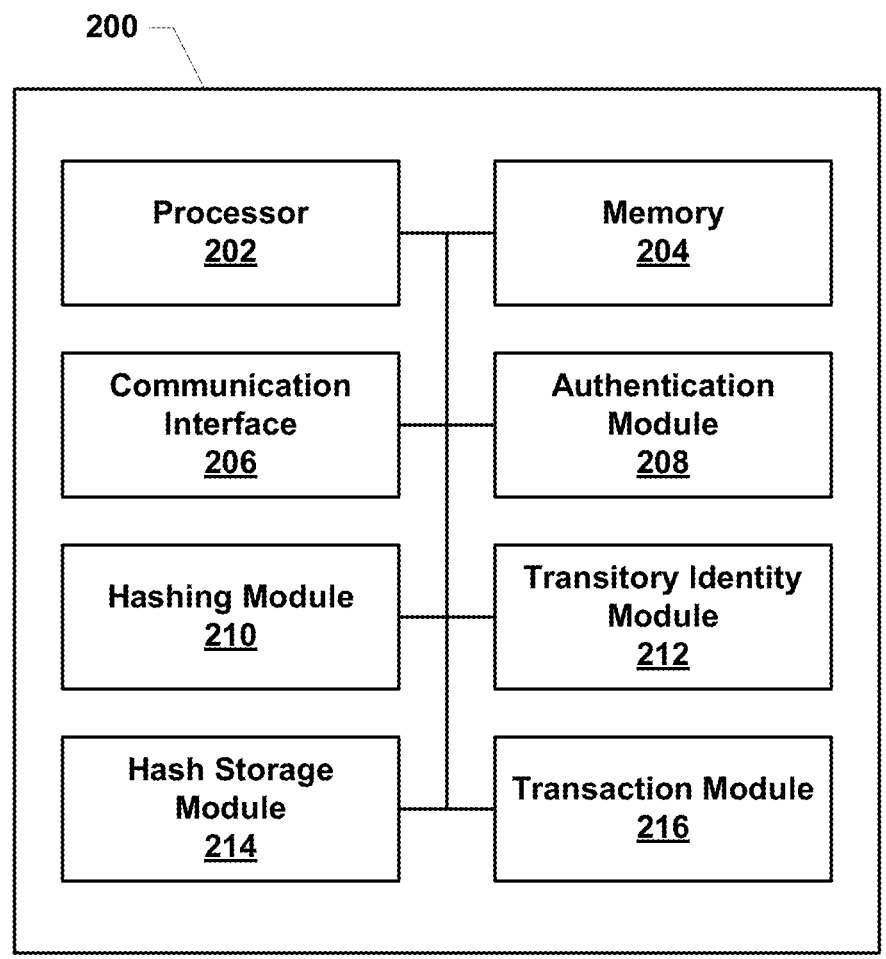
FIG. 2 is a component block diagram of a communication device suitable for use with various embodiments.

FIG. 2 is a component block diagram of a computing device 200 suitable for implementing various embodiments. With reference to FIGS. 1 and 2, in various embodiments, the computing device 200 may be similar to the computing devices 102, 104, 106, and 108.

The computing device 200 may include a processor. The processor 202 may be configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to memory 204, which may be a non-transitory computer-readable storage medium that stores processor-executable instructions. The memory 204 may store an operating system, as well as user application software and executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 may also communicate with a variety of modules for units configured to perform a variety of operations, as further described below. For example, the processor 202 may communicate with a communication interface 206, an authentication module 208, a hashing module 210, a transitory identity module 212, the hash storage module 214, and a transaction module 216. The modules/units 206-216 may be implemented on the computing device 200 in software, and hardware, or in a combination of hardware and software. Firmware, chip, system-on-a-chip (SOC), dedicated hardware (i.e., "firmware") circuit configured to perform operations of the various embodiments, or a combination of dedicated hardware/firmware and a programmable processor. The processor 202, the memory 204, and the various modules/units 206-216 may communicate over a communication bus or any other communication circuitry or interface.

The communication interface 206 may include a network interface that may enable communications with a communication network (e.g., the communication network 112). The communication interface 206 may include one or more input/output (I/O) ports through which a connection, such an Ethernet connection, a fiber optic connection, a broadband cable connection, a telephone line connection, or other types of wired communication connection may be provided. The communication interface 206 may also include a radio unit that may enable radio frequency communication.

The authentication module 208 may provide or be in communication with one or more input devices to receive an input from a user for login to the computing device 200. The input devices may include one or more buttons, sliders, touchpads, keyboards, biometric input devices, cameras, fingerprint readers, and other similar input devices.

The transaction module 216 may enable communication related to a transaction (as well as other communications) with another computing device (for example, between the computing device 102 and the computing device 106). In some implementations, the transaction module 216 may include hardware and/or software configured to provide a streamlined communication and/or transaction process with the transaction server. In some implementations, the transaction module may include hardware and/or software configured to provide a streamlined communication related to a specific service provider, such as a so-called "1-click" service or another streamlined communication/transaction process.

Figure 3A:
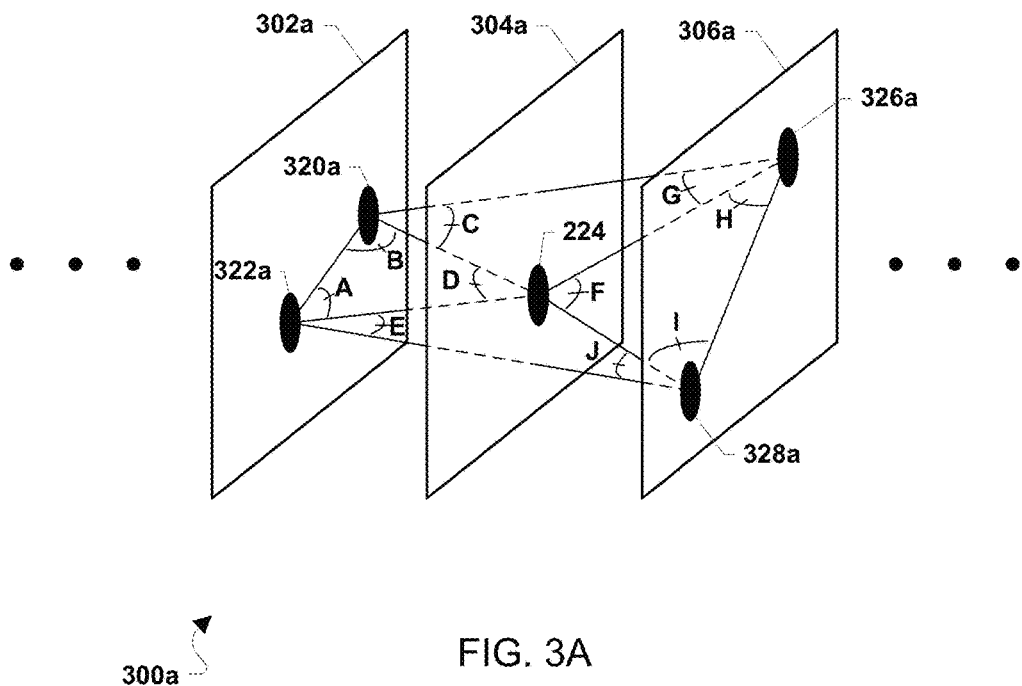
FIGS. 3A-3E illustrate relationships among elements of portions of shared data sets according to various embodiments.
Figure 3B:
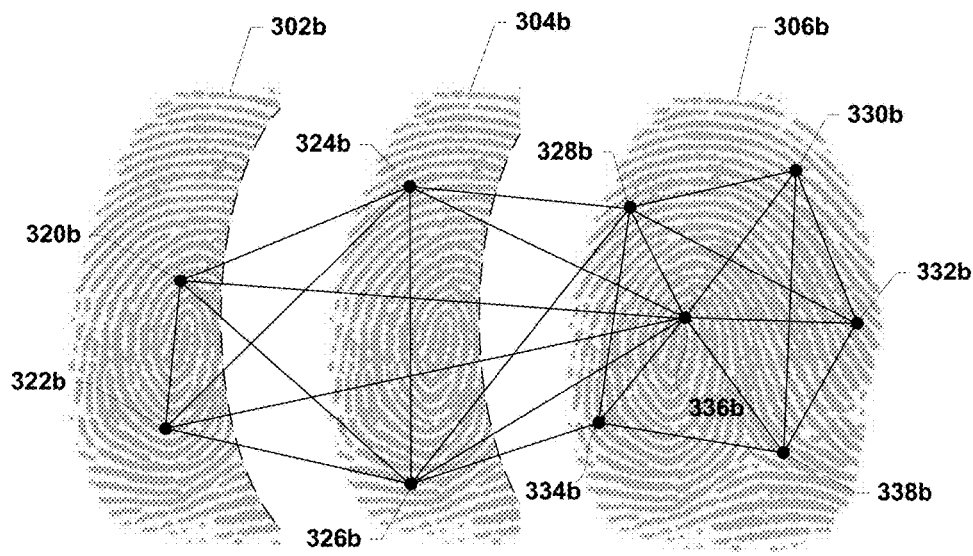
Figure 3C:
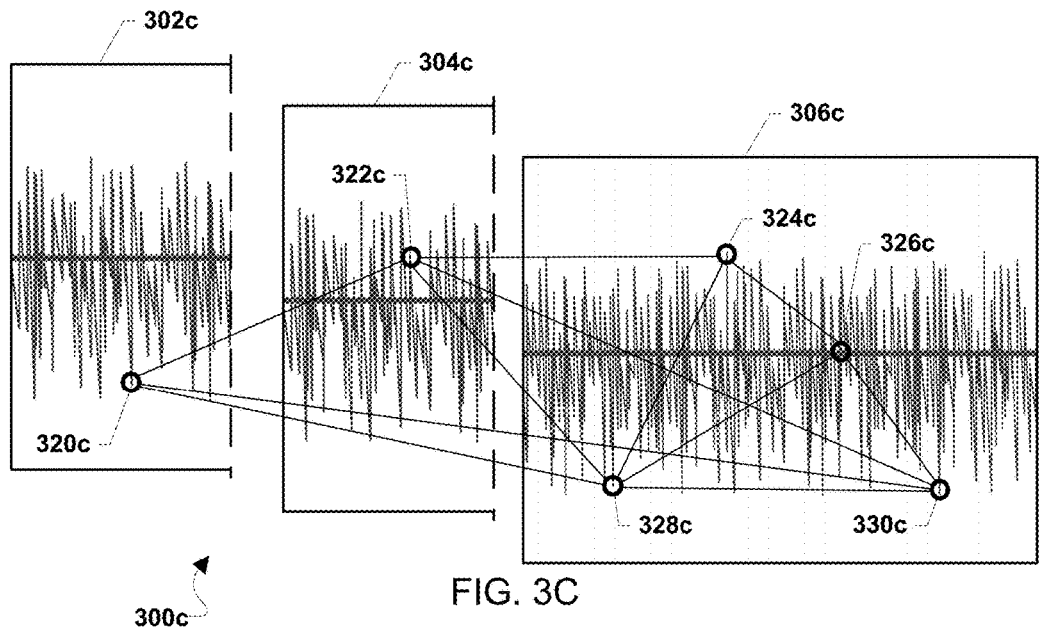

FIG. 3A illustrates one example of a shared data set 300a, according to some embodiments. In some embodiments, the shared data set may include two or more portions. Each portion of the shared data set may include one or more elements. In some embodiments, the portions of the shared data set may include a discrete constituent, such as an image, a photograph, video, sound recording, a biometric input, or another such discrete constituent.

In some embodiments, the shared data set may include two or more transitory identities of one of the computing devices. For example, as described above, the first computing device may generate a series of transitory identities over time and may send the transitory identities to the second computing device in the normal conduct of secured communications using methods described herein. The second computing device may store the transitory identities generated by and received from the first computing device. Thus, in some embodiments the shared data set may include the first computing device's transitory identities received over time during secured and/or authenticated communications. In some embodiments, the shared data set may include two or more transitory identities of the second computing device.

The shared data set 300a may include one or more portions, such as portions 302a, 304a, and 306a. Each of the portions 302a, 304a, and 306a may include one or more elements. For example, portion 302a may include elements 320a and 322a, portion 304a may include element 324a, and portion 306a may include elements 326a and 328a. In some embodiments, the portions 302a, 304a, and 306a may each be a transitory identity that was generated by a computing device (e.g., one or more of the computing devices 102, 104, 106, and 108). In some embodiments, the portions 302a, 304a, and 306a may include discrete constituents, such as photographs, sound recordings, fingerprints, biometric data, or other discrete portions.

In some embodiments, the shared data set 300a may be built up over time. For example, a first computing device (e.g., the computing device 102, 104) may generate a plurality of transitory identities over time, store a copy of each transitory identity, and may send a copy of each transitory identity to a second computing device (e.g., the computing device 108), thereby providing the first computing device and the second computing device with a shared data set made up of the transitory identities of the first computing device. In some embodiments, the second computing device may perform similar operations, obtaining transitory identities and providing its transitory identities to the first computing device. In some embodiments, the first and second computing devices may combine the shared transitory identities from each of the first and second computing devices to generate the shared data set. In some embodiments, the first and second computing devices may each compile two discrete shared data sets, made up of transitory identities of the first computing device, and transitory identities of the second computing device, respectively.

In some embodiments, the shared data set 300a may be built up over time by one computing device and then shared with another computing device. For example, the computing device 108 may receive data inputs over time (e.g., the data inputs 140). The data inputs may include one or more discrete constituents, such that the computing device 108 may build up a data set of the data inputs over time. The computing device 108 may then share or send the data set with another computing device (e.g., the computing device 102, 104, 106).

In various embodiments, the elements 320a-328a may include information that enables the identification or indexing of each element within a portion. For example, an element may include information identifying a location, position, and/or time of the element within its portion, or any other information that allows the indexing or identification of each selected element.

In various embodiments, the portions 302a-306a and/or the elements 320a-328a may include data from which one or more relationships to at least one other data element may be determined. For example, the portions 302a-306a and/or the elements 320a-328a may be associated with a timestamp. As another example, portions and/or elements may be associated with a variety of data, such as a location, a position, a color, a pitch, a frequency, a biometric aspect, or another aspect of the portion and/or element. The relationship between the two or more elements may include a comparative difference between the two or more elements, such as a time difference, a location difference, a positional difference, a color difference, a pitch difference, a frequency difference, a biometric difference, or another difference.

As another example, the elements 320a-328a may have different positions or locations within a portion, or between different portions. The elements 320a-328a may also be associated with a different time, as well as with different positions or locations, relative to two or more other elements. In some embodiments, three or more elements may define a relationship of one element to two or more other elements. For example, the position/location differences among elements 320a, 322a, and 324a may define three angles, angle A, angle B, and angle D. Similarly, the relative position/location and/or time differences among elements 320a, 322a, 324a, 326a, and 328a may define additional angles, angles C, E, F, G, H, I, and J. In various embodiments, a relationship may be a relative difference in time, space, distance, or another informational difference, within a portion, among or between portions, and/or within the shared data set 300a.

FIGS. 3B-3E illustrate exemplary shared data sets 300b, 300c, 300d, and 300e. A shared data set may include one or more of a variety of types of data, and the examples illustrated in FIGS. 3A-3D are intended to illustrate the variety of data types and not as limitations.

For example, the shared data set 300b may include fingerprints 302b, 304b, and 306a. The fingerprints 302b-306b may be captured, for example, by a biometric scanning device such as a fingerprint scanner. The fingerprints 302b-306b may be captured over time, such that the fingerprints 302b-306b each constitute a portion of the shared data set 300b. A processor of a computing device (e.g., the computing devices 102-108) may select elements from the portions (e.g., the fingerprints 302b-306b) of the shared data set 300b, such as elements 320b-338b. In some embodiments, the elements 320b-338b may include fingerprint minutiae. The elements 320b-338b may include information that enables a processor of a computing device to identify or index each element within a portion (e.g., within one of the fingerprints 302b-306b), such as information identifying a location or position of the element within its portion. Further, each portion may be associated with a timestamp or another time element.

The portions (e.g., the fingerprints 302b-306b) and/or the elements 320b-338b may include data from which one or more relationships to at least one other data element may be determined, such as position, location, and/or time information. In some embodiments, the portions and/or elements may include data from which one or more relationships among the elements may be determined. In some embodiments, the relationships may be based on one or more comparative differences between or among the elements.

As another example, the shared data set 300c may include sound recordings 302c, 304c, and 306c. The sound recordings may be captured, for example, by a microphone or similar device, or the sound recordings may be received electronically by a processor of a computing device (e.g., the computing devices 102-108) from such a device. The sound recordings 302c-306c may be captured over time, and may include or be associated with time information. Each of the sound recordings 302c-306c may constitute a portion of the shared data set 300c. Additionally, or alternatively, a single recording (e.g., one of 302c, 304c, or 306c) may be divided into portions, for example, portions of a certain time duration, portions divided by frequency range, portions divided by amplitude ranges, and other divisions.

A processor of a computing device may select elements from the portions of the sound recordings 302c-306c, such as elements 320c-330c. The elements 320c-330c may include information that enables the identification or indexing of each element within a sound recording, such as information identifying a location or position of the element within its portion. Each element 320c-330c may be associated with timestamp or another time element and/or other information, such as frequency, a pitch, and amplitude, a rate of attack, a rate of decay, a duration of sustain, The portions (e.g., the one or more sound recordings 302c) and/or the elements 320c-330c may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

Figure 3D:
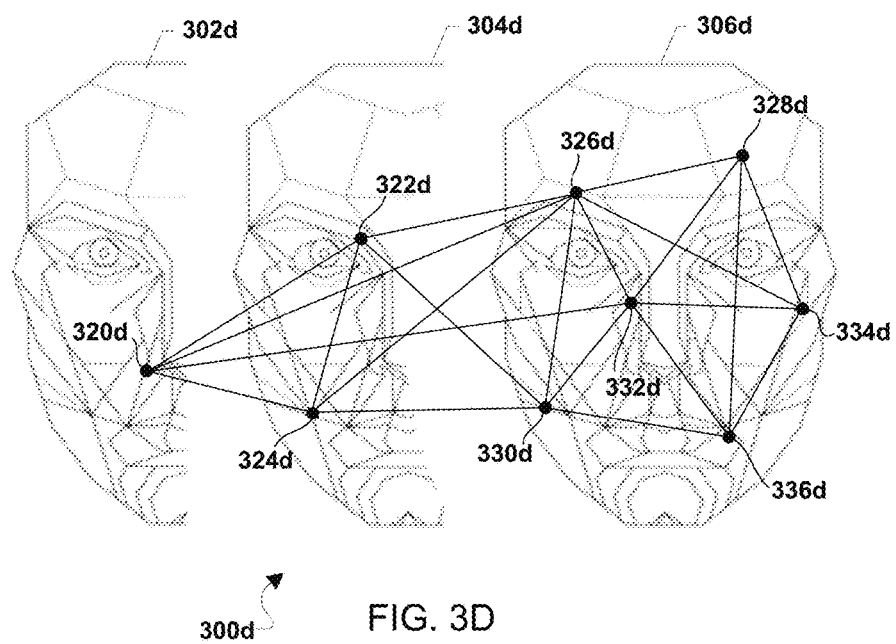
Figure 3E:
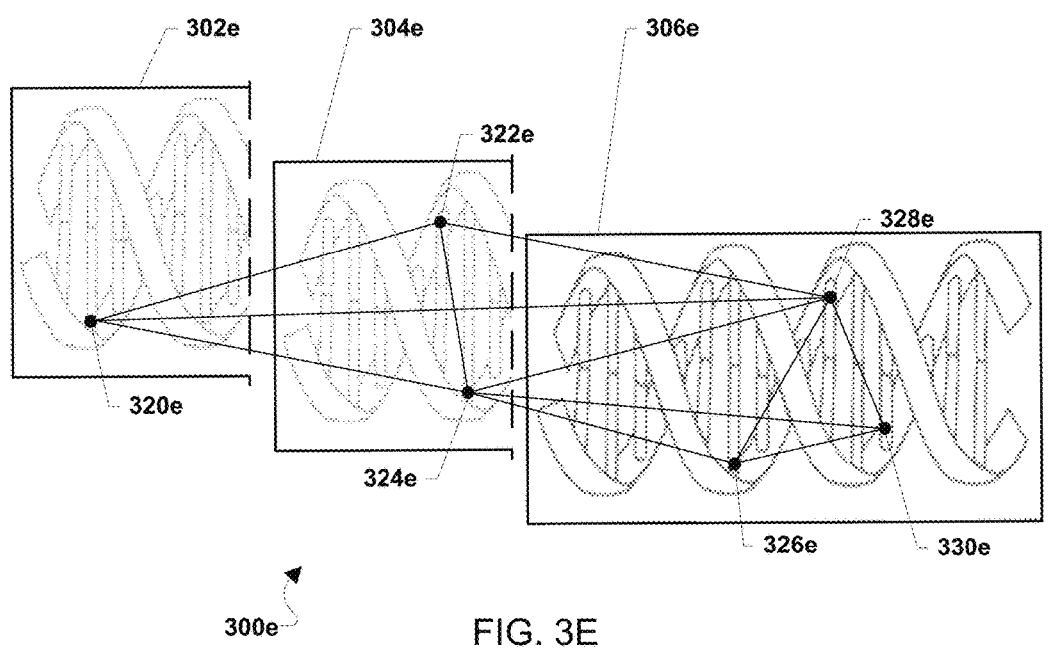

As another example, the shared data set 300d may include images 302d, 304d, and 306d. The images 302d-306d may be of, for example, a face as illustrated in FIG. 3D, but in various embodiments the images 302d-306d may be any images. The images 302d-306d may be captured, for example, by a camera or another image receiving device. The images 302d-306d may be captured over time, such that the images 302d-306d each constitute a portion of the shared data set 300d. A processor of a computing device (e.g., the computing devices 102-108) may select elements from the portions (e.g., the images 302d-306d) of the shared data set 300d, such as elements 320d-336d. For example, the processor of the computing device may select the elements 320d-336d using a facial recognition or other similar system. The elements 320d-336d may include information that enables a processor of a computing device to identify or index each element within a portion (e.g., within one of the images 302d-306d), such as information identifying a location or position of the element within its portion. Further, each portion may be associated with a timestamp or another time element.

The portions (e.g., the images 302d-306d) and/or the elements 320d-336d may include data from which one or more relationships to at least one other data element may be determined, such as position, location, and/or time information. In some embodiments, the elements 320d-336d may be associated with image information, such as color, tint, hue, grayscale, RGB information, Pantone color number, digital color code (e.g., hypertext markup language color code), saturation, brightness, contrast, or other image information. In some embodiments, the portions and/or elements may include data from which one or more relationships among the elements may be determined. In some embodiments, the relationships may be based on one or more comparative differences between or among the elements. In some embodiments, the comparative differences may include differences in image information, including relative, linear, and/or numerical differences in information indicating color, tint, hue, etc.

As another example, the shared data set 300e may include one or more biometric data units or constituents, such as DNA samples 302e, 304e, and 306e. Biometric data may be captured by an appropriate scanner or capture device and received by a processor of a computing device (e.g., the computing devices 102-108). The biometric data may be captured over time, and may include or be associated with time information. The shared data set 300e may include two or more biometric data constituents or units, each of which may constitute a portion of the shared data set (e.g., two or more discrete biometric samples). Additionally or alternatively, a biometric sample may be divided into portions, which divisions may be determined based on the information available in the biometric sample. For example, the DNA samples 302e, 304e, and 306e may be divided into portions of a certain base-pair length or number, a certain length of the DNA backbone, by type of nucleotide (e.g., adenine, guanine, cytosine, or thymine), by type of base pair (e.g., adenine-thymine, cytosine-guanine), or another division.

A processor of a computing device may select elements from the portions of the biometric data unit 300e, such as elements 320e-330e. The elements 320e-330e may include information that enables the identification or indexing of each element within a biometric data, such as information identifying a location or position of the element within its portion, such as a position along the DNA strand 302e. Each element 320e-330e may be associated with timestamp or another time element.

The portions (e.g., the one or more biometric data units 302e) and/or the elements 320e-330e may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

Figure 4:
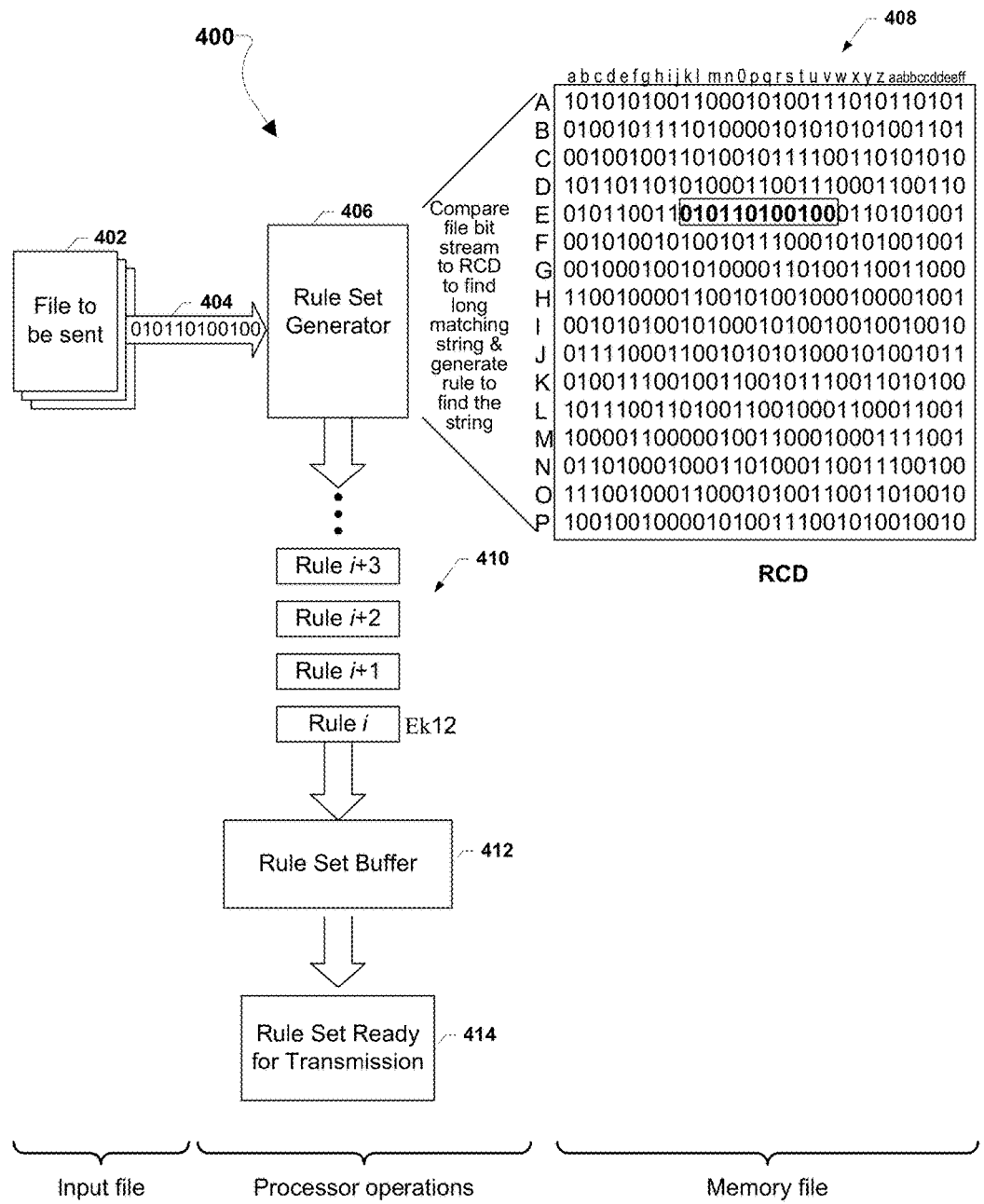
FIG. 4 is a block diagram illustrating a method of encoding a file into a rule set based on a referential complex database (RCD) according to various embodiments.

FIG. 4 illustrates graphically an overall method 400 for transforming any of a variety of files for efficient or encrypted transmission by matching streams of bits within the files to portions of an RCD and generating a rule set for locating the matching portions of the RCD so that the rule set can be transmitted to a recipient.

Referring to FIG. 4, a file 402 to be transmitted may be received by a computing device that implements a rule set generator 406 according to various embodiments. The rule set generator may receive the raw data of the file 402 as a string of bits 404. The rule set generator may compare the file bit string 404 to strings of bits within the RCD 408 to find long strings of matching bits. This process may be accomplished using any of a variety of algorithms. For example, the rule set generator 406 may read in bit strings 404 while matching the bits to portions of the RCD 408 and continue to do so until a match in the RCD is no longer found. Thus, the longest matching bit string appearing in the RCD 408 may be identified by the rule set generator 406.

When the longest matching string is identified, the rule set generator 406 may generate a rule 410 that will enable a recipient computing device to locate the string within the same RCD 408 (i.e., a copy of the RCD stored in memory of the recipient computing device). The rules 410 for locating matching bit strings may depend upon the organization of the RCD 408. A variety of RCD structures are described above, but a simple example is illustrated in FIG. 4 in which the RCD 408 structured as a table with horizontal and vertical indices. Using this example RCD 408, the portion matching the file bit string 604 begins at the intersection of vertical index "E" and horizontal index "k" and is 12 bits long. Thus the example rule i is "Ek12". This rule for locating the matching bit string is intended to be illustrative, and not limit the claims in any way to a particular form of indexing or locating bit strings within an RCD.

As the rule set generator 406 identifies (or generates) rules 410 for locating a long bit string within the RCD 408, the rules may be accumulated in a rule buffer 412, and ultimately stored as a set of rules in memory (e.g., the rule set 414) that can then be transmitted to a receiver computing device to which the file 402 is to be transmitted. In some embodiments, if the matched bit string in the RCD is longer than the length of the rule, the bit string itself may be used as the rule, such as with a flag or a symbol indicating that a particular rule is the bit string. Once the file 402 has been matched to the RCD and rule sets generated, the rule sets may be transmitted using any form of computer-to-computer communication protocol and network. In some embodiments, the rule sets may be transmitted once the file 402 has been completely matched to the RCD. In some embodiments, a group of rule sets 414 may be transmitted when the rule set buffer is full, or is filled to a threshold amount of data. Thus, in some embodiments the file 402 does not need to be completely matched to the RCD before a rule set or rule sets are sent to the receiver computing device. Further, unless the RCD 408 is known to the public, the transmission of only the rule set provides effective encryption because a party intercepting or copying the received rule set transmission will be unable to reconstruct the file. Thus, the rule set may be transmitted using any form of communication network protocol without further encryption while achieving a high degree of security. The security of such transmissions may be further enhanced by transforming the RCD 408 using various embodiments described above, such as shifting the data in the RCD by a particular length, line or row.

Thus, in the method illustrated in FIG. 4, a computing device receives and transforms an input file through a series of processor operations referencing an RCD 408 stored as a memory file into a rule set that essentially encodes the file to be sent as a series of rules that the receiving computing device can use to reconstruct the file referencing the same RCD stored in the device's local memory.

Figure 5:
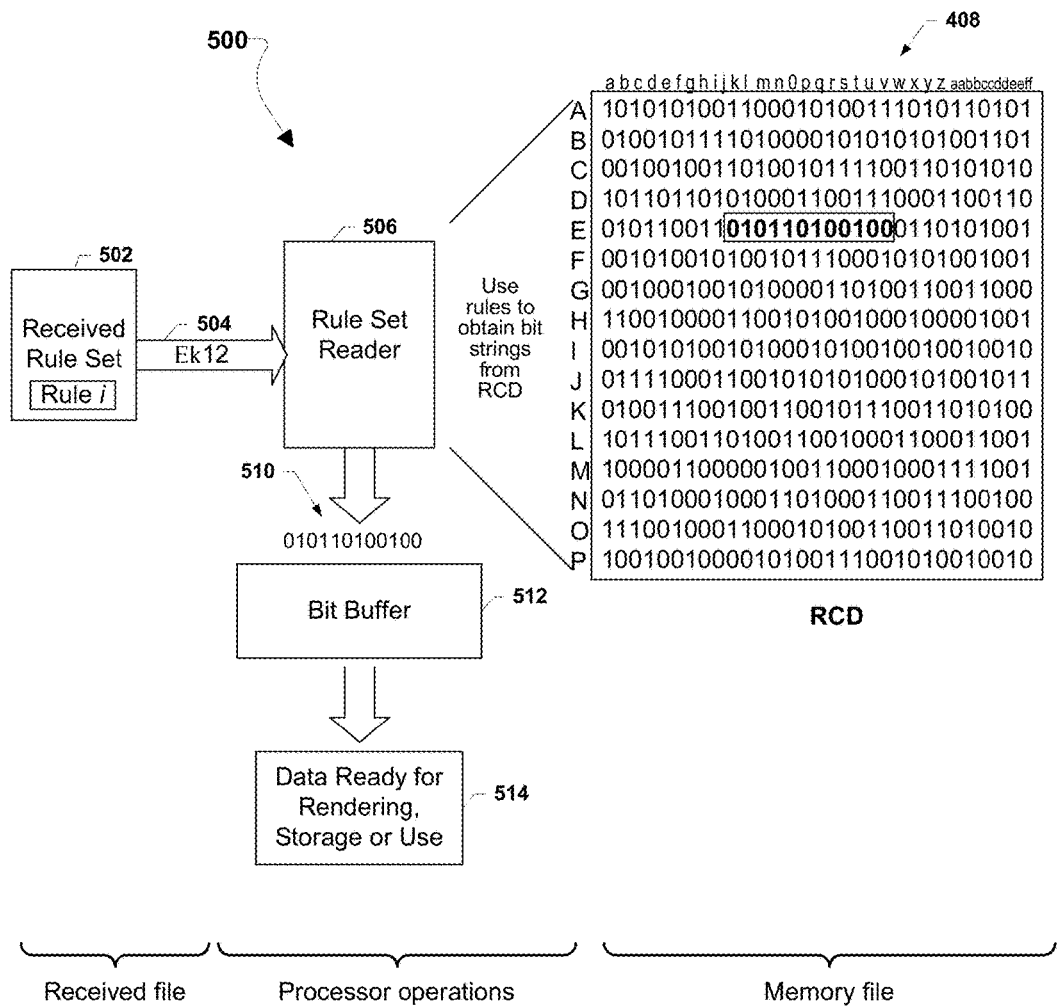
FIG. 5 is a block diagram illustrating a method of receiving and reproducing a file based on received rule and a shared RCD according to various embodiments.

FIG. 5 graphically illustrates a method 500 by which a computing device receiving a transmission of a rule set that is generated according to the method 400 and having the same RCD 408 stored in an available memory can quickly reconstruct the original file 402.

The receiving computing device may receive a transmission (e.g., via email, Internet, SMS, etc.) of a rule set 502 that includes the sequence of rules generated as illustrated in FIG. 4. The rule set 502 may be received by a receiving system that properly orders the received rule sets for provision to the rule set reader 506 (e.g., to correct for packet reordering and the like). As an illustration, the rule set may include a particular Rule i "Ek12" for locating a particular string of bets within the RCD 408. A rule set reader 506 executing within the computing device may receive individual rules 504 and use each rule to look up the corresponding bit string within the RCD 408. In the illustrated example in which the RCD 408 is a tabular data file having vertical and horizontal indexes, the rule "Ek12" enables the rule set reader 506 to identify a string of bits beginning at the intersection of horizontal index "E" and vertical index "k" and extending for 12 bits (i.e., "010110100100"). This output 510 may be temporarily stored in a bit buffer 512 adjacent to a previously obtained bit string. Periodically data held within the bit buffer 512 may be copied to a data file 514 ready for rendering storage, display or other use. In this manner, as each rule is used by the rule set reader 506, the original file (i.e., 402) may be reconstructed at the raw binary data level.

Thus, in the method 500 illustrated in FIG. 5, a computing device receives a rule set by any of a variety of communication networks and protocols, uses each rule to look up a corresponding string of bits within an RCD 408 stored as a memory file, and accumulates the identified bit strings into a reconstruction of the original file at the binary data level.

Figure 6:
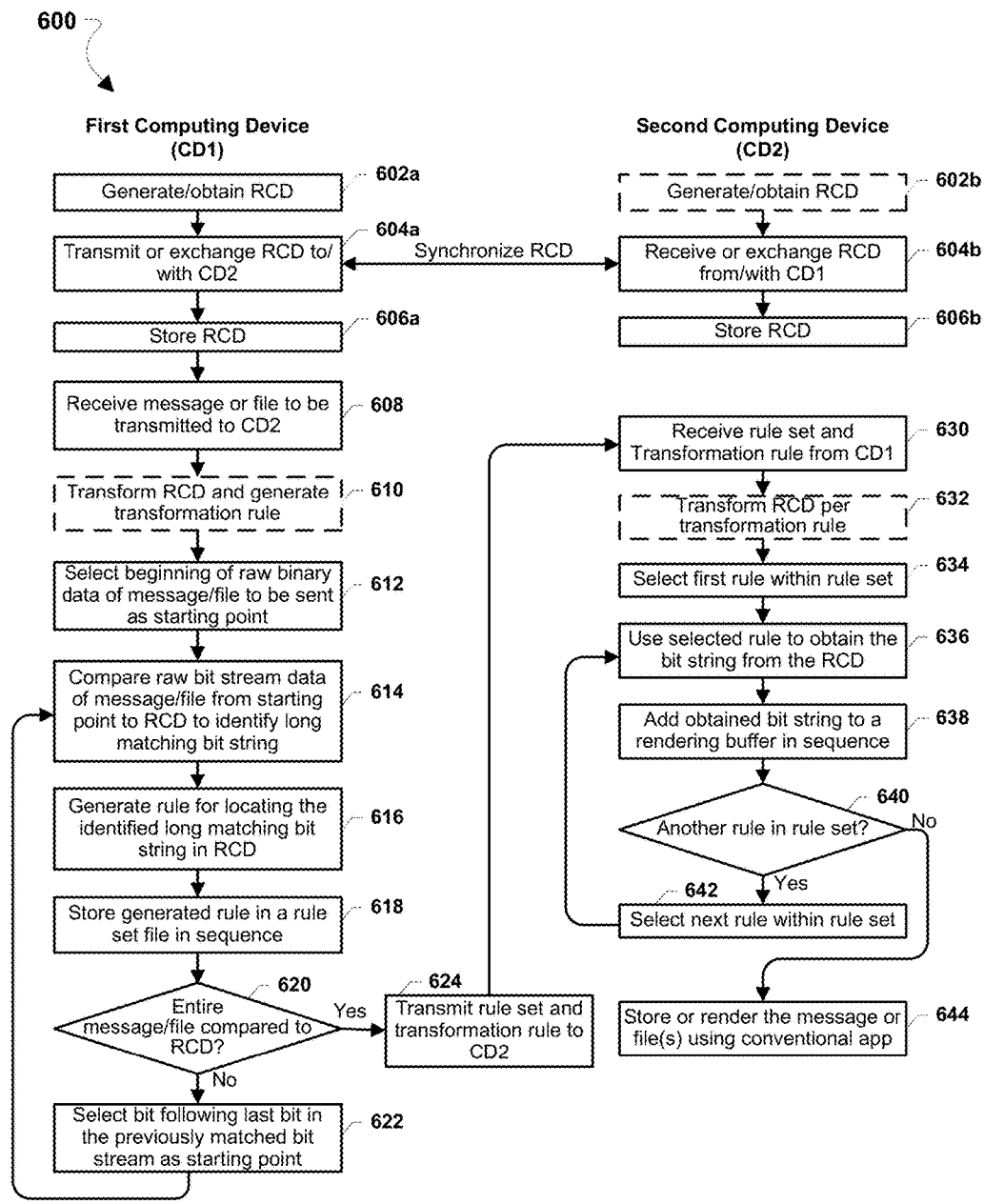
FIG. 6 is a process flow diagram illustrating methods for encoding, transmitting, receiving and reproducing a file using a shared RCD according to various embodiments.

FIG. 6 illustrates algorithms or methods 600 that may be implemented on a first computing device (CD1) sending a file to a second computing device (CD2) using the techniques illustrated in FIGS. 4 and 5 and described above. With reference to FIGS. 1-6, the algorithms or methods 600 may be implemented by one or more processors (e.g., 202) in each of the first and second computing devices each with access to memory storing a synchronized RCD.

In order to transmit a file using various embodiments, the first computing device will synchronize and RCD with the second computing device to which the file is to be transmitted. As described above, various methods may be used to either provide an RCD to the second computing device or synchronize an RCD based on files that are shared in both computers and rules for transforming or otherwise randomizing the RCD in each computer. As a nonlimiting example, the first computing device may generate or obtain an RCD in block 602a that will be used in generating the rule set for transmitting the file. In some embodiments, the RCD may be stored in memory of both computing devices, and obtaining the RCD in block 602a may merely involve accessing the file in memory. In some embodiments, the RCD may be stored in memory of both computing devices, and obtaining the RCD in block 602a may involve accessing the file in memory in performing a transformation, translation or other manipulation of the RCD as described previously. In some embodiments, the RCD may be a one-time data set to be used for transmissions of a single file or set of files to the second computing device, an example of which is described below with reference to FIG. 7. In some embodiments, the RCD may be obtained from the second computing device in a data exchange in blocks 604a and 604b as described below.

In block 604a, the first computing device may transmit the RCD to the second computing device, transmit information (e.g., rules for transforming the RCD) to the second computing device to enable generation or synchronization the RCD, or receive the RCD from the second computing device.

Similarly, the second computing device may optionally generate or obtain the RCD in block 602b and communicate with the first computing device in block 604b to synchronize the RCD, such as by receiving the RCD from the first computing device, receiving information (e.g., rules for transforming the RCD) for generating the RCD, or transmit to the first computing device an RCD generated in block 602b.

In blocks 606a and 606b the first and second computing device may store or otherwise make available the synchronized RCD for use in the rest of the method 600. In some embodiments, this may simply involve storing rules or an algorithm for manipulating either the RCD or rule sets used for locating bit strings within the RCD.

As described above, the operations of synchronizing and storing the RCD on the first and second computing devices may be performed in advance of transmitting particular file or files. For example, the first and second computing devices may exchange or synchronize an RCD that is used for all communications between the two devices. As another example, the first and second computing devices may use files that are stored on both devices (e.g., default image files), and merely agree on the particular data files that are going to serve as the RCD.

In block 608, the processor of the first computing device may receive a message or file to the second computing device. For example, a user of the first computing device may type a message to be transmitted in a secure manner to the second computing device. As another example, a user may identify one or more files stored on the first computing device (e.g., photographs, audio files, etc.) that the user wants transmitted to the second computing device.

In optional block 610, the processor of the first computing device may transform the RCD and generate a rotation rule as described above for various embodiments. This optional transformation or modification of the RCD may be performed to ensure that the communication of the file or files to the second computing device will be secure (i.e., receivable only by the second computing device). This operation may be optional because the RCD may be randomized or transformed as part of the operation of synchronizing the RCD in blocks 604a and 604b as described above. Also, this operation may be optional when there is no need to secure the communication of the file or files, such as when the method 600 is being used to exploit the communication efficiency enabled by the method (e.g., to send a large file using email, SMS or other non-streaming communication method).

In block 612, the processor of the first computing device may select the beginning (e.g., first bit) of the raw binary data of the message or file(s) to be transmitted as a starting point of the process of converting to a rule set linked to the RCD.

In block 614, the processor of the first computing device may begin comparing a sequence of bits of the raw binary data beginning from the selected starting point to the RCD to identify a long matching bit string that appears within the RCD data. As described above with reference to FIG. 4, this may be accomplished by using a rule set generator application to read in a string of bits from the message or file so long as matches to the string of bits can be located in the RCD. A long string of bits may be identified when an additional bit cannot be matched to a bit string within the RCD or the length of the bit string reaches a preset maximum or threshold length.

Once a long string of bits is identified in block 614, the processor of the first computing device may generate a rule for locating or recovering the string of bits within/from the RCD in block 616. The rule may be generated using any of a variety of methods, including methods described above, depending upon the data structure of the RCD.

In block 618, the processor may store the generated rule in a rule set file in sequence.

In determination block 620, the processor may determine whether the entire message or file(s) has/have been compared to the RCD.

In response to determining that the entire message or file(s) has/have not been compared to the RCD (i.e., determination block 620="No"), the processor may select the bit within the message or file(s) following the last bit in the previously matched bit string as the starting point for the next round of comparison in block 622, and then compare the sequence of bits of the raw binary data beginning from the newly selected starting point to the RCD to identify a long matching bit string that appears within the RCD data in block 614 as described above. Thus, the operations of matching strings of bits to the RCD to identify long strings of bits and rules for finding those long strings in the RCD until the entire message or file(s) has/have been compared to the RCD.

In response to determining that the entire message or file(s) has/have been compared to the RCD (i.e., determination block 620="Yes"), the processor may transmit the generated rule set generated in blocks 612-622 and, optionally, the transformation rule generated in block 610, to the second computing device in block 624. As the information in the rule set and the rotation rule are useable only by a computing device possessing the synchronized RCD, this information may be transmitted to the second computing device using any communication network and protocol without encryption. Additionally, by linking long strings of bits to RCD-lookup rules that are relatively small, the method 600 may enable the first computing device to relay large messages or files to the second computing device using communication methods that have limited bandwidth or a small maximum file size. Further, the rule set may be broken into separate messages that are transmitted within message size limits. As noted above, in some embodiments, a group of rule sets may be transmitted when the rule set buffer is full, or is filled to a threshold amount of data. Thus, in some embodiments the message or file to be conveyed to the second computing device does not need to be completely matched to the RCD before a portion of the rule set or rule sets are sent to the second computing device.

In block 630, the second computing device may receive the rule set and, optionally, the transformation rule from the first computing device.

In optional block 632, the processor of the second computing device may use the received transformation rule to transform or adjust the RCD in the same manner as the RCD used in generating the rule set (i.e., the result of transforming/adjusting the RCD in optional block 610).

In block 634, the processor of the second computing device may select the first rule within the rule set.

In block 636, the processor may use the selected rule to obtain the correlated bit string from the RCD. As described with reference to FIG. 5, the processor may perform this operation using a rule set reader application or software to apply the information in the rule to identify the sequence of bits within the RCD and copy that bit string.

In block 638, the processor of the second computing device may add the obtained bit string to a rendering bit buffer or memory file in sequence in block 638. In this operation, the processor may store the bit string copied from the RCD into the buffer or memory file adjacent to (i.e., concatenated with) the previously stored bit string.

In determination block 640, the processor of the second computing device may determine whether there is another rule within the rule set to be applied.

In response to determining that there is another rule within the rule set to be processed (i.e., determination block 640="Yes"), the processor may select the next rule within the rule set in block 642, and use this selected rule to obtain the bit string from the RCD in block 636 and proceed with blocks 638-642 until all rules within the received rule set have been processed.

In response to determining that all rules within the rule set have been processed (i.e., determination block 640="Yes"), the processor may store and/or render the message or file(s) on the second computing device using a conventional application appropriate for the message or file(s) in block 644. For example, if the transmitted file is a photograph, the photograph may be rendered on a display of the second computing device using a conventional photo rendering application in block 644. As another example, if the transmitted file is a text document, the document may be rendered on a opened in a word processing application on the second computing device in block 644. As another example, if the transmitted file is a video clip, the video may be rendered on a display of the second computing device by a video application in block 644.

The method 600 may be used to transmit a wide variety of files, and may use a generic RCD, such as any of the various types of RCDs described above. However, in some implementations or applications, an RCD generated specifically for transmission of particular types of files or documents may be more efficient because of a higher incidence of large repeating strings within it. In such instances, the RCD used in both the first and second computing devices may be smaller because bit sequences included within the RCD appear frequently within the files being transmitted and less of the data with the RCD is not used in such transmissions. An example of such an implementation is the use for transmitting text-based documents because many words and word sequences (as well as letter sequences) will be repeated across various documents, and therefore large bit sequences can be expected to be repeated.

Figure 7:
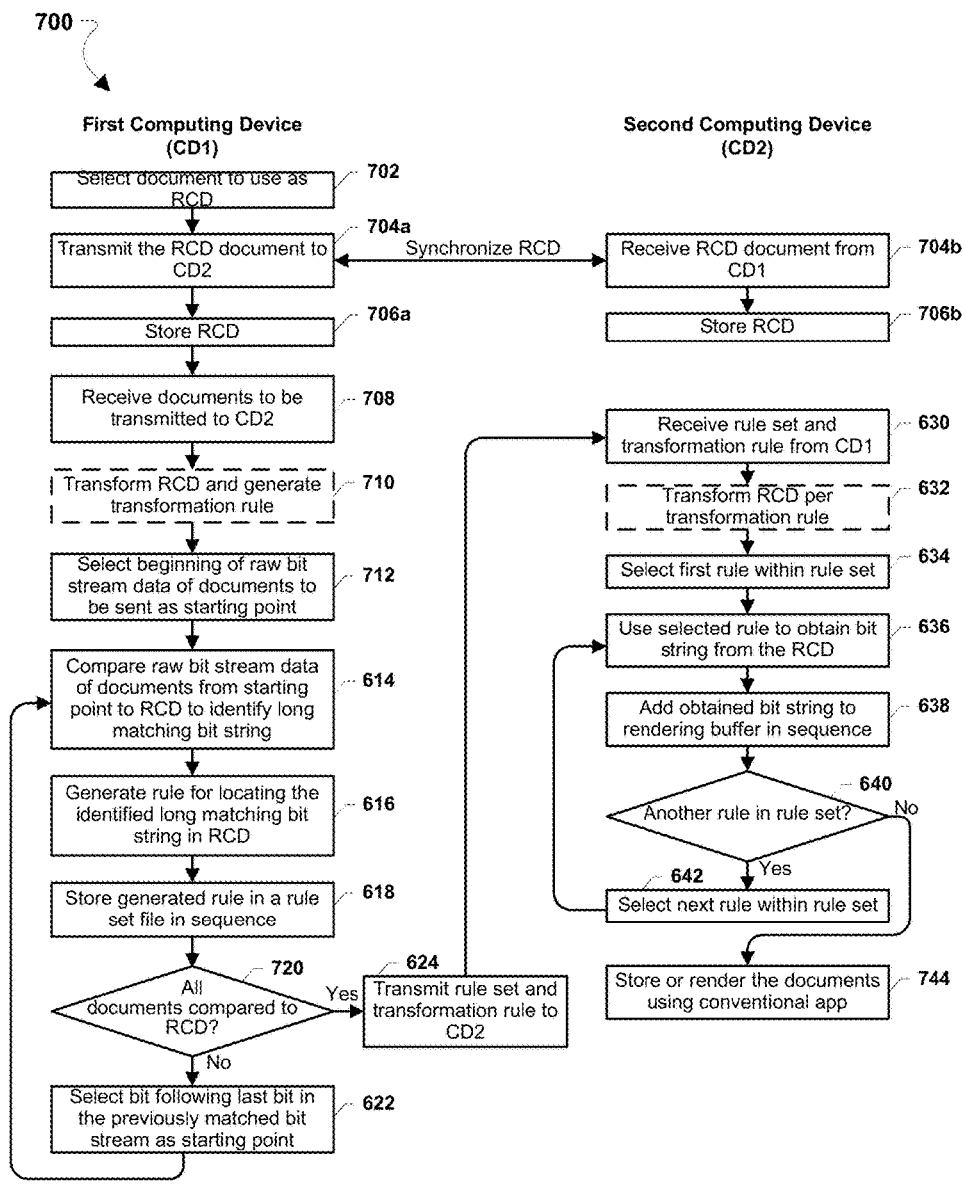
FIG. 7 is a process flow diagram illustrating methods for encoding, transmitting, receiving and reproducing a text documents using a shared RCD according to some embodiments.

FIG. 7 illustrates of a method 700 of an example application in which an embodiment is used to securely transmit a number of documents from the first computing device to a second computing device. The method 700 may be implemented by processors (e.g., 202) of the first and second computing devices. In particular, the method 700 may be useful in a situation in which a number of documents need to be transmitted securely between the first and second computing devices that have not previously exchanged an RCD. In the method 700, the processors may perform operations of like numbered blocks of the method 500 as described with reference to FIG. 5.

In block 702, a user of the first computing device may select a particular document to serve as the source of an RCD. Such a document may be of sufficient length so that it contains a large number of words and word sequences likely to appear in the other documents that will be sent as rule sets based upon the RCD generated from that document. In some embodiments, the document may be sent to the second computing device in the open (i.e., and not encrypted). For example, in a situation in which a large number of proprietary documents (e.g., a due diligence package for a corporate or financial transaction) will be transmitted to the second computing device using the method 700, a suitable document to serve as the RCD could be the nondisclosure agreement by which the parties controlling the first and second computing devices have agreed to exchange the documents confidentially. As another example, a public document (e.g., section of a newspaper, a portion of a textbook, etc.) may be selected to serve as the RCD in block 702.

In block 704*a*, the processor of the first computing device may transmit the RCD document to the second computing device, which may receive the document in block 704*b*. The two computing devices may further exchange information in order to synchronize the RCD between the two devices. In blocks 706*a* and 706*b*, the processors of the first and second computing devices may store the synchronized RCD.

In block 708, the processor of the first computing device may receive the document or documents to be transmitted to the second computing device. Such documents may be loaded in memory and accessed by the processor. In some embodiments, the documents may be combined into a single data file in block 708. In some embodiments, the documents may be sequenced for transmission as part of the operations in block 708.

In optional block 710, the processor of the first computing device may transform the RCD and generate a transformation rule as described above for various embodiments. This optional transformation or modification of the RCD may be performed to ensure that the communication of the documents to the second computing device will be secure (i.e., receivable only by the second computing device). This operation may be optional because the RCD may be randomized or rotated as part of the operation of synchronizing the RCD in blocks 704*a* and 704*b*. Also, this operation may be optional when the documents are not confidential (i.e., do not need to be encrypted) and the method 700 is being used to exploit its communication efficiency.

In block 712, the processor of the first computing device may select the beginning (e.g., first bit) of the raw binary data of the document(s) to be transmitted as a starting point of the process of converting to a rule set linked to the RCD.

In blocks 714-718, the processor of the first computing device may perform the operations of like numbered blocks of the method 500 as described above to generate a rule for locating long bit strings within the RCD that match bit strings within the document(s) to be transmitted.

In determination block 720, the processor may determine whether the entire document or documents has/have been compared to the RCD. In some embodiments, rule sets may be transmitted to the second computing device before all of the documents have been compared to the RCD. For example, the rule sets for documents may be transmitted for a single document or for a subset of all of the documents. In some embodiments, a group of rule sets may be transmitted to the second computing device when a rule set buffer of the first computing device is full, or is filled to a threshold amount of data. Thus, in some embodiments, all of the documents do not need to be completely matched to the RCD before transmission of a rule set or rule sets to the second computing device begins.

In response to determining that the entire document or documents has/have has/have not been compared to the RCD (i.e., determination block 720="No"), the processor may select the bit within the message or file(s) following the last bit in the previously matched bit string as the starting point for the next round of comparison in block 622, and then compare the sequence of bits of the document(s) raw binary data beginning from the newly selected starting point to the RCD to identify a long matching bit string that appears within the RCD data in block 614 as described above. Thus, the operations of matching strings of bits to the RCD to identify long strings of bits and rules for finding those long strings in the RCD until the entire document(s) has/have been compared to the RCD.

In response to determining that the entire document(s) has/have been compared to the RCD (i.e., determination block 720="Yes"), the processor may transmit the rule set generated in blocks 614-622 and, optionally, the transformation rule generated in optional block 710, to the second computing device in block 624. As the information in the rule set and the transformation rule are useable only by a computing device possessing the synchronized RCD, this information may be transmitted to the second computing device using any communication network and protocol without encryption (although any form of encryption may also be applied to the rule sets for transmission). Additionally, by linking long strings of bits to RCD-lookup rules that are relatively small, the method 700 may enable the first computing device to relay large documents to the second computing device using communication methods that have limited bandwidth or a small maximum file size. Further, the rule set may be broken into separate messages that are transmitted within message size limits.

In block 630, the processor of second computing device may receive the rule set and, optionally, the transformation rule from the first computing device. In blocks 632-642, the processor of second computing device may perform the operations of the like numbered blocks of the method 600 as described to use the rule set to find long bit strings within the RCD and generate a concatenated binary data file replicating the document(s) being transmitted.

In response to determining that all rules within the rule set have been processed (i.e., determination block 640="Yes"), the processor may store and/or open the document(s) on the second computing device using a conventional word processor or document application in block 744.

Figure 8A:
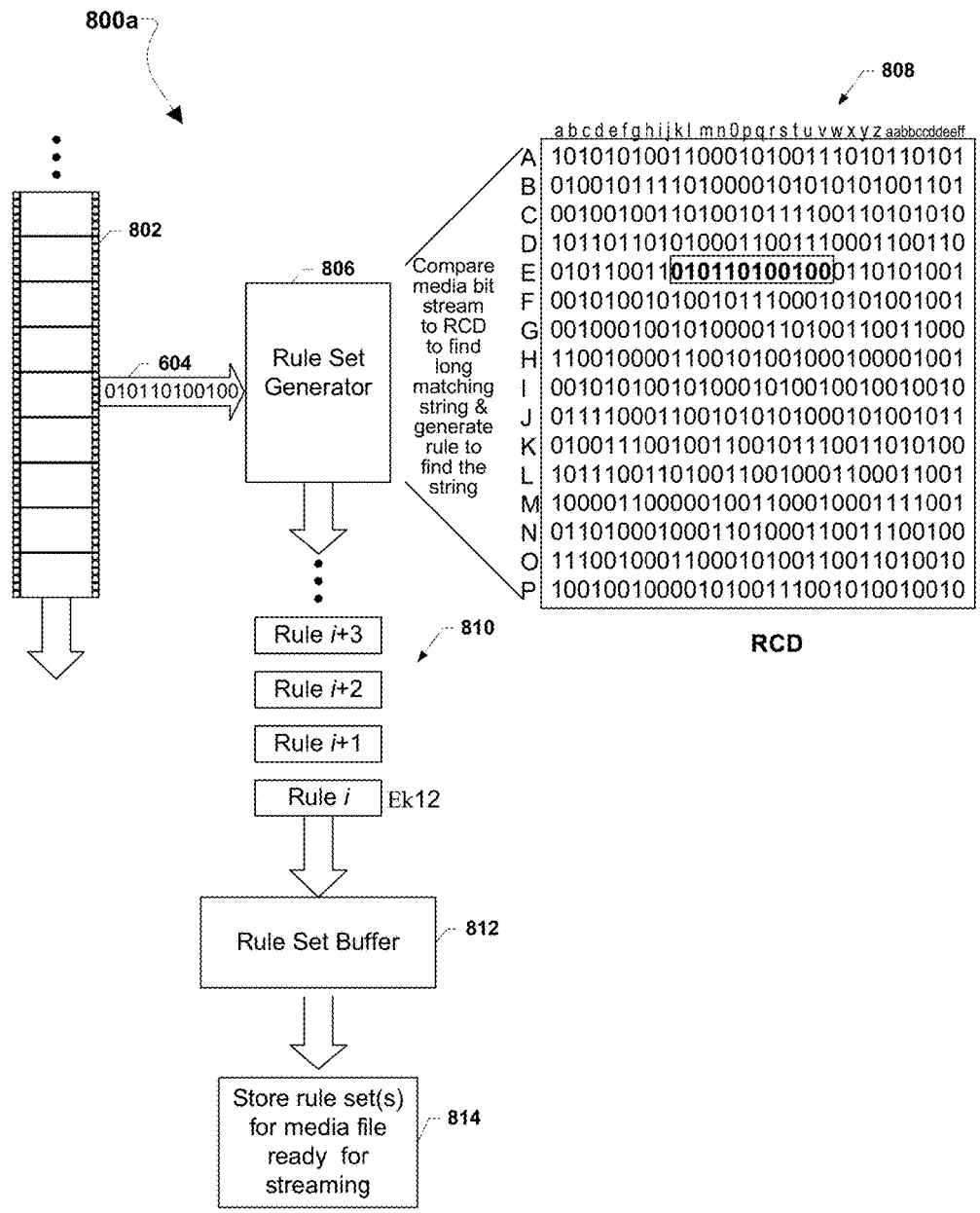
FIGS. 8A and 8B are block diagrams illustrating methods of encoding a multimedia file into rule sets based on an RCD according to some embodiments.

Various embodiments may similarly be applied to transmitting video and multimedia, including streaming of movies and similar multimedia files. FIG. 8A illustrates graphically an overall method 800a for transforming a stream of multimedia image frames for efficient or encrypted transmission by matching streams of bits within the frames to portions of an RCD and generating rule sets for locating the matching portions of the RCD so that the rule sets can be transmitted to a second computing device for rendering of multimedia.

Referring to FIG. 8A, a multimedia file including a stream of image frames 802 that are to be delivered to receiving devices may be obtained or received by a computing device that implements a rule set generator 806 according to various embodiments. The multimedia file may be formatted in any conventional media data format. For example, the media file may be in full fidelity high definition image format in which each image frame includes information for each and every pixel. As another example, the media file may be in a high definition (HD) video format. As another example, the media file may be in a digital video broadcasting (DVB) format such as compliant with the DVB-X standard. As another example, the media file may be in the Multimedia Messaging Service (MMS) format. As another example, the multimedia file may be in the multimedia broadcast and multicast system (MBMS) format or the enhanced MBMS (eMBMS) format. As another example, the multimedia file may be in a compressed video format such as defined in ISO/IEC 14496-10/MPEG-4 AVC. Another format of multimedia, including multimedia formats yet to be defined, may be used with various embodiments. Some media formats may not include complete image data for each frame, such as compressed video formats that intersperse information regarding changes in portions or particular pixels from one frame to the next between full image frames. For ease of reference, the term "image frame" is used to refer to the information included in a multimedia file associated with a particular frame of video as well as associated audio, even if that information is not a complete, standalone image. Thus, the various embodiments enable conversion and delivery of multimedia regardless of the format of the input multimedia file.

The rule set generator may receive the raw data of each image frame 802 as a string of bits 804. The rule set generator may compare the file bit string 604 to strings of bits within the RCD 808 to find long strings of matching bits. This process may be accomplished using any of a variety of algorithms. For example, the rule set generator 806 may read in bit strings 604 while matching the bits to portions of the RCD 808 and continue to do so until a match in the RCD is no longer found. Thus, the longest matching bit string appearing in the RCD 808 may be identified by the rule set generator 806. In some embodiments, this comparison of bit string's 604 to the RCD may be performed until a maximum bit string length is reached. While the process of matching the raw bit string of image files to the RCD may be time-consuming, the various embodiments are most useful in applications in which there is sufficient time to transform large video files into relatively small rule set files for later transmission.

When a long matching string is identified, the rule set generator 806 may generate a rule 810 that will enable a recipient computing device to locate the string within the same RCD 808. The rules 810 for locating matching bit strings may depend upon the organization of the RCD 808. A variety of RCD structures are described above, but a simple example is illustrated in FIG. 8A in which the RCD 808 structured as a table with horizontal and vertical indices. Using this example RCD 808, the portion matching the file bit string 604 begins at the intersection of vertical index "E" and horizontal index "k" and is 12 bits long. Thus, the example rule i is "Ek12". This rule for locating the matching bit string intended to be illustrative, and not limit the claims in any way to a particular form of indexing or locating bit strings within an RCD.

As the rule set generator 806 identifies rules 810 for locating a long bit string within the RCD 808, the rules may be accumulated in a rule set buffer 812, and ultimately stored as a set of rules in memory 814 that can be transmitted to a computing device to which the media file 802 is to be provided. The rule set may be transmitted using any form of computer-to-computer communication protocol and network, including communication protocols not otherwise suitable for communicating multimedia files. Further, unless the RCD 808 is known to the public, the transmission of only the rule set provides effective protections for digital rights because a party intercepting or copying the received rule set transmission will be unable to reconstruct the multimedia file. Thus, digital rights management (DRM) requirements can be satisfied while transmitting the multimedia files using any form of communication network protocol without encryption. The effectiveness of the DRM protections may be further enhanced by transforming the RCD 808 using various embodiments described above.

Thus, in the method 800a illustrated in FIG. 8A, a computing device receives and transforms an input multimedia file through a series of processor operations referencing an RCD 808 stored as a memory file, into one or more rule sets that essentially encodes the image frames and audio as a series of rules that a receiving computing device can use to reconstruct the file referencing the same RCD stored in the device's local memory.

Figure 8B:
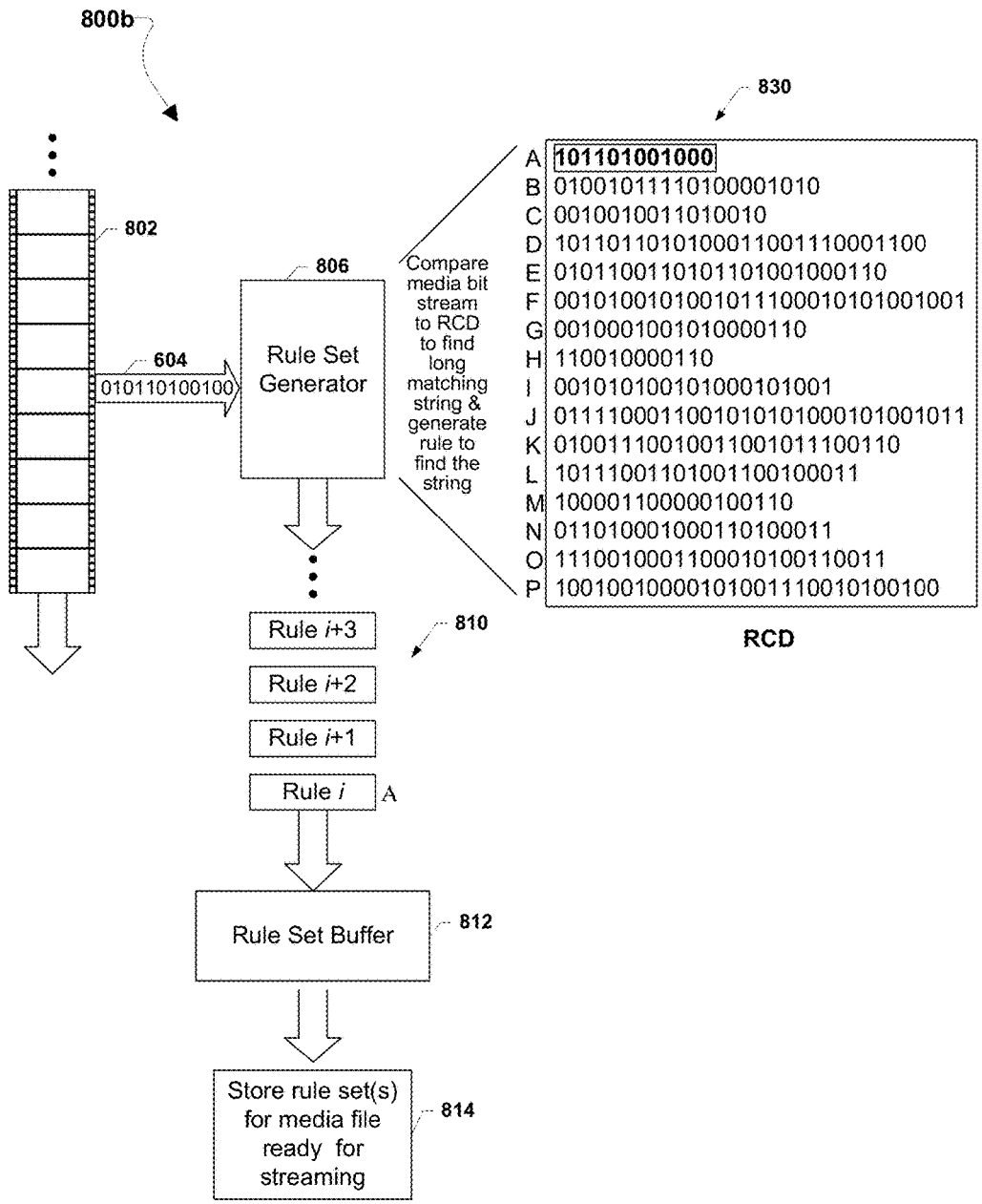
Figure 14:
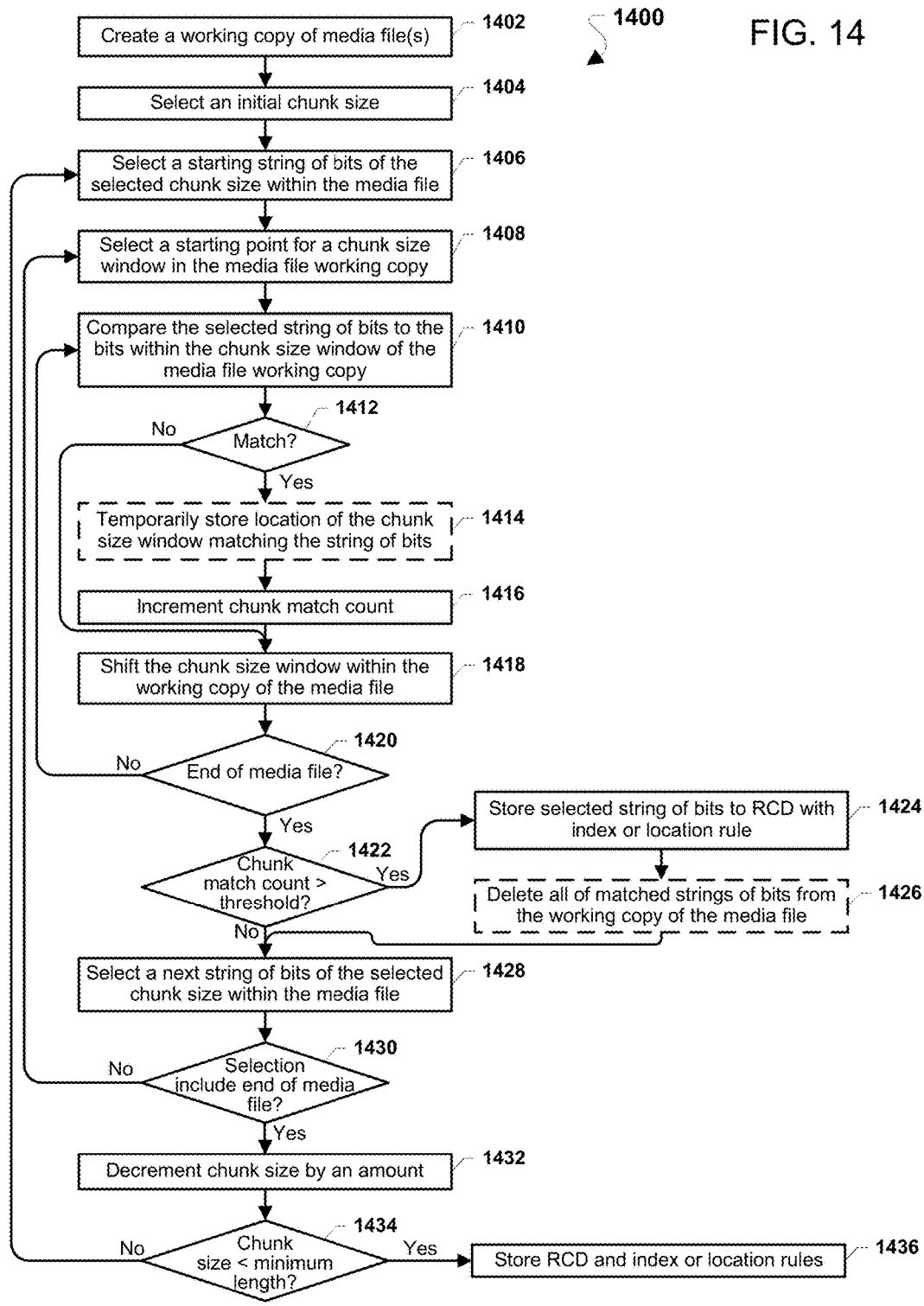
FIG. 14 is a process flow diagram illustrating an example method for generating a media-specific RCD based on a multimedia file according to some embodiments.

Referring to FIG. 8B, the method 800b involves a computing device such as a server of a media delivery service transforming an input multimedia file, such as a movie or similar file, through a series of processor operations referencing a media-specific RCD 830 stored as a memory file, into a series of rules sets that essentially encodes the image frames and audio as a series of rules that a receiving computing device can use to reconstruct the file referencing the same RCD stored in the device's local memory. The difference between the method 800a illustrated in FIG. 8A and the method 800b in FIG. 8B is that the RCD is specially created to include primarily long bit strings that have been determined to be present in many or most multimedia files, such as movies. FIG. 14 below illustrates an example of a method for generating such media-specific RCDs. Generally, such a media-specific RCD may be regarded as a database of long bit strings indexed so that the index may be used as a substitute (e.g., as a rule) for the corresponding bit string by a computing device storing the same media-specific RCD.

FIG. 8B illustrates simple example in which the RCD 830 structured as an indexed table with each row or file associated with a single index value (illustrated A-P). The potential advantage of using a media-specific RCD 830 is that the various bit strings can be treated as data fields in an indexed database, thus simplifying the format of rules used to identify particular bit strings. Using this example RCD 1108, the portion matching the file bit string "010110100100" 604 has the index value "A". Thus, the example Rule i is "A". This rule for locating the matching bit string is intended to be illustrative, and not limit the claims in any way to a particular form of indexing or locating bit strings within an RCD.

In view of the ability to use an index rule for a media-specific primary RCD when a secondary RCD is used to obfuscate primary rules, short bit strings of a length equal to the index binary bit length may be included within the primary RCD. For bit strings in the multimedia file that are shorter than the index binary bit length, the data itself may be the corresponding rule, such as with a most significant bit serving as a flag to indicate whether the rest of the index value is a data string or a rule mapping to the primary RCD. For example, if the primary RCD includes no more than 32,768 entries, a two-byte index can be used leaving the most significant bit available for use as a flag for indicating raw bit string data (e.g., a "0" in the most significant bit) or an RCD lookup rule (e.g., a "1" in the most significant bit). Thus, in this non-limiting example, the primary rule set generator 806 that is unable to match a bit string longer than 16 bits to the RCD would output a 16 bit rule in which the first bit is "0" and the rest of the bits in the index are the first 15 bits of the unmatched bit string. Because such data rules will be interspersed with rules mapped to long bit strings, this transmission of raw data should not compromise the DRM protections provided by various embodiments.

Figure 9A:
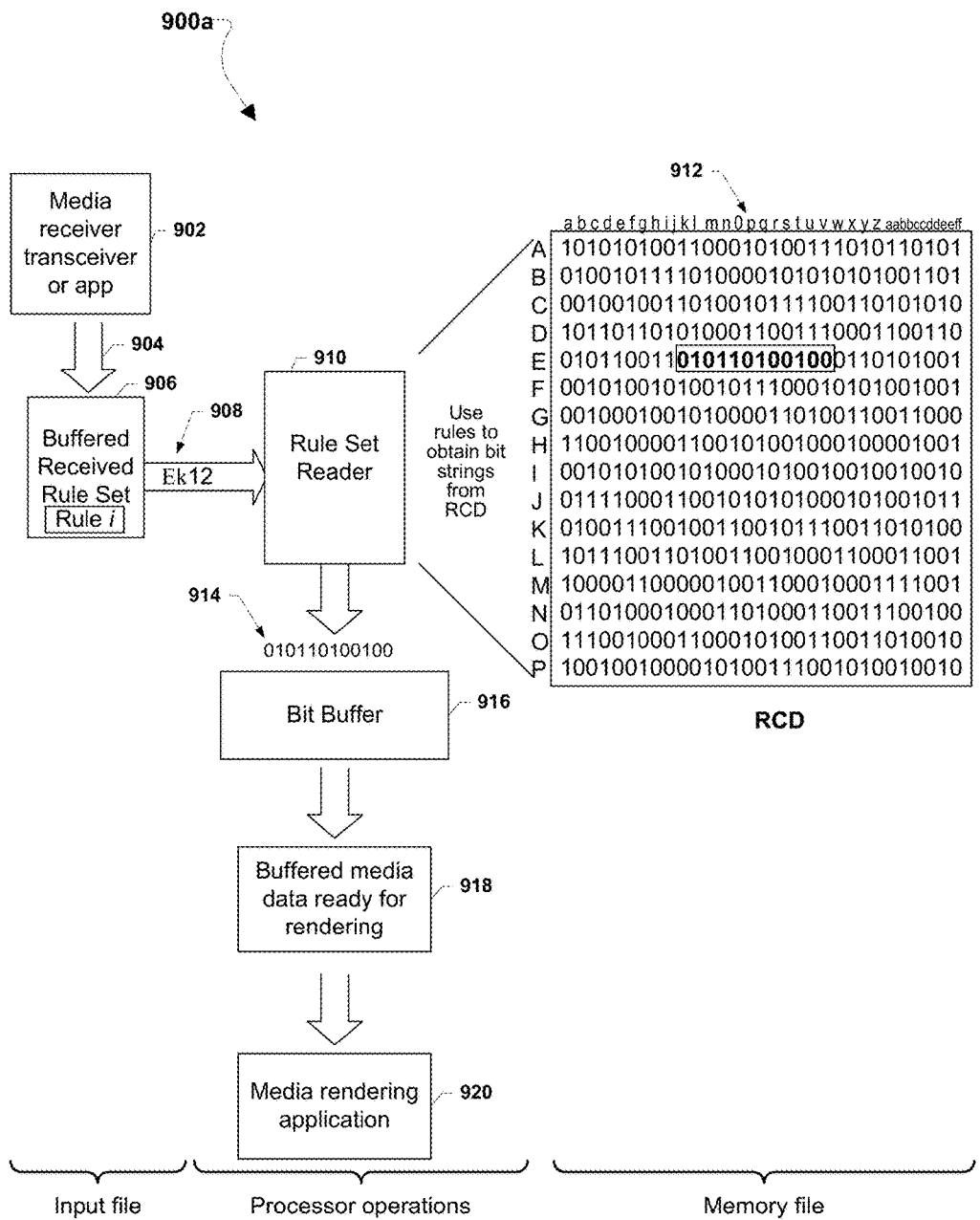
FIGS. 9A and 9B are block diagrams illustrating methods of receiving and reproducing a file based on received rule and a shared RCD according to some embodiments.

FIG. 9A graphically illustrates a method 900a by which a computing device receiving a transmission of one or more rule sets generated according to the method 800a and having the same RCD 808 stored in an available memory can quickly reconstruct and render the original multimedia file 802 using any conventional media rendering application 920.

A media receiver, transceiver or application 902 of a computing device may receive a transmission (e.g., via email, Internet, SMS, etc.) of one or more rule sets 904 that includes the sequence of rules generated as illustrated in FIG. 8A. In some embodiments, the rule sets may be buffered 906 (i.e., temporarily stored) so that the rules may be individually processed by a rule set reader 910 while the media receiver, transceiver or application 902 continues to receive rules, as in a media streaming implementation. As an illustration, a rule set may include a particular Rule i "Ek12" for locating a particular string of bits within the RCD 808. A rule set reader 910 executing within the computing device may receive individual rules 908 and use each rule to look up the corresponding bit string within the RCD 912. In the illustrated example in which the RCD 912 is a tabular data file having vertical and horizontal indexes, the rule "Ek12" enables the rule set reader 906 to identify a string of bits 914 beginning at the intersection of horizontal index "E" and vertical index "k" and extending for 12 bits (i.e., "010110100100"). This output 914 may be temporarily stored in a bit buffer 916 adjacent to a previously obtained bit string. Periodically, data held within the bit buffer 916 may be copied to a media data buffer 918 that is configured to queue multimedia data (e.g., multimedia data packets according to the original media data format) for rendering by a conventional media rendering application 920.

Figure 9B:
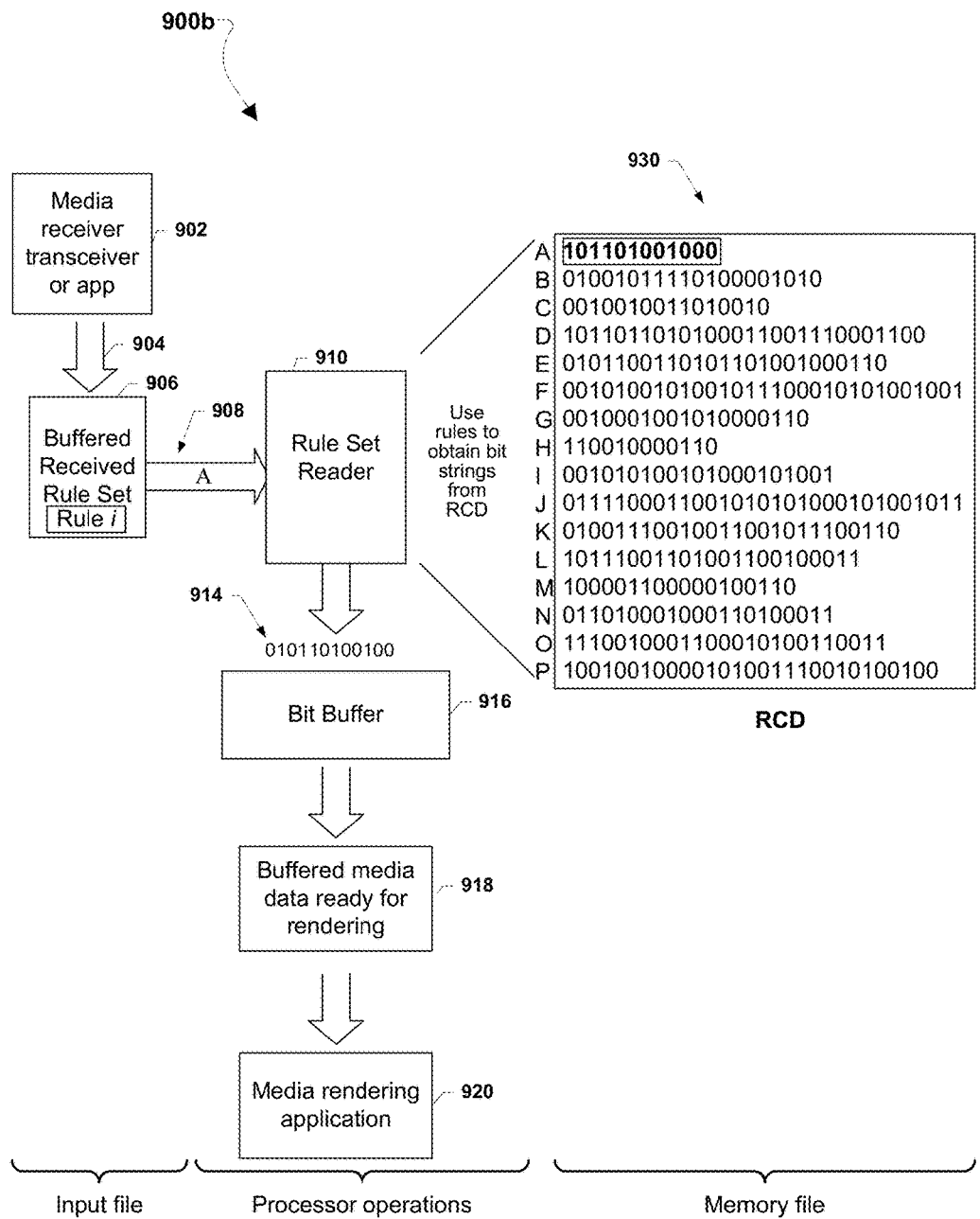

In embodiments in which a media-specific RCD are used, the receiving computing device operates in a similar manner. FIG. 9B illustrates a method 900b in which a computing device replicates a multimedia file that was encoded using a media-specific RCD per the method the method 900a illustrated in FIG. 9A. In the illustrated example, the Rule i of index "A" maps to the field in the media-specific RCD 930 including the bit string "010110100100" that the rule set reader 910 may output to a bit buffer 916 as described with reference to FIG. 9A.

Thus, in the method 900a illustrated in FIG. 9A and the method 900b illustrated in FIG. 9B, a computing device receives one or a series of rule sets by any of a variety of communication networks and protocols, uses each rule to look up a corresponding string of bits within an RCD 912 stored as a memory file, accumulates the identified bit strings into media play buffer that supports (i.e., provides media data to) a conventional media rendering application. This enables the various embodiments to be used for transporting multimedia files of any format using any conventional communication network or protocol, including communication protocols not suitable for carrying the original multimedia data format, to computing devices for rendering using any conventional multimedia player or application compatible with the original multimedia data format.

Figure 10:
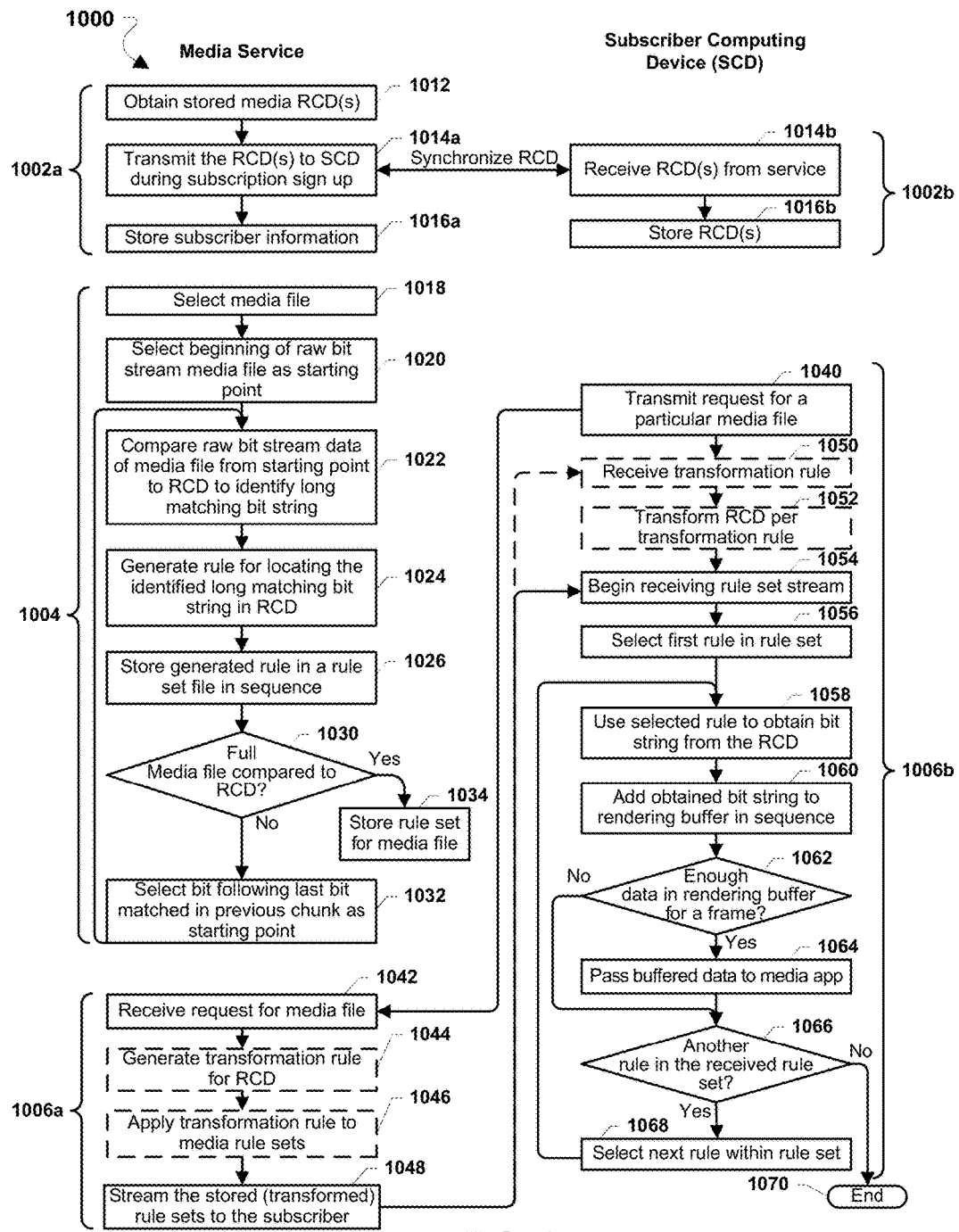
FIG. 10 is a process flow diagram illustrating methods for encoding, transmitting, receiving and reproducing multimedia files using a shared RCD according to some embodiments.

FIG. 10 illustrates algorithms or methods 1000 that may be implemented on a first computing device (CD1) sending a multimedia file (e.g., streaming video) to a subscriber computing device (CD2) using the techniques illustrated in FIGS. 8A, 8B, 9A, and 9B and described above. With reference to FIGS. 1-10, the algorithms or methods 1000 may be implemented by one or more servers or other computing devices within a media delivery service provider and one or more processors (e.g., 202) in a subscriber computing device with access to memory storing a synchronized RCD.

The methods 1000 may be implemented by a media delivery service (e.g., Netflix, Amazon, Hulu, etc.) for delivering movies and similar multimedia files to subscribers. To support such deliveries, the media delivery service may implement a subscription sign-up method 1002a by which the service provides synchronized one or more synchronized RCDs to a new subscriber computing device, which implements a subscription registration process 1002b. For example, a server of the media delivery service may obtain one or more stored media RCDs in block 1012. Such RCDs may be of a variety of formats including the examples described above. The RCD(s) may be generated by the media delivery service, may be unique to the subscriber computing device, or may be optimized for media delivery, such as described in more detail with reference to FIGS. 11-14. In block 1014a, the server may transmit the one or more RCDs to the subscriber computing device that receives and saves the RCDs in blocks 1014b and 1016b, such as during a subscription sign-up. This delivery may use any of a variety of forms, such as providing the RCDs for download from a website. In block 1016a, the server may store information regarding the subscriber that will be used in subsequent media delivery operations, such as information regarding the particular RCDs that were downloaded to the subscriber computing device.

To prepare a multimedia file for delivery using various embodiments, a server or other type of computing device of the media delivery service provider may perform operations in method 1004 to transform the multimedia file into one or more rule sets. For ease of reference, the computing device used to implement the method 1004 is referred to herein as a "server," however, this reference is not intended to be limiting as the operations may be performed by a workstation, mainframe computer, matrix of personal computers, or other type of computing device.

In block 1018, the server may obtain or access a multimedia file (e.g., a movie file) for processing. For example, the server may access a movie within a server farm of stored movie files.

In block 1020, the server may select the beginning (e.g., first bit) of the raw binary data of the media file as a starting point of the process of converting to a rule set linked to the RCD.

In block 1022, the processor of the first computing device, such as using a rule set generator application, may begin comparing a sequence of bits of the raw binary data beginning from the selected starting point to the RCD to identify a long matching stream that appears within the RCD data. As described above with reference to FIGS. 8A and 8B, this may be accomplished by reading in a string of bits from the multimedia file while so long as matches to the string of bits can be located in the RCD. A long string of bits may be identified when an additional bit cannot be matched to a string within the RCD or the length of the string reaches a preset maximum or threshold length.

Once a long string of bits is identified in block 1022, the server may generate a rule for locating or recovering the string of bits within/from the RCD in block 1024. The rule may be generated using any of a variety of methods, including methods described above, depending upon the data structure of the RCD.

In block 1026, the processor may store the generated rule in a rule set file in sequence.

In determination block 1030, the processor may determine whether the entire multimedia file has been compared to the RCD.

In response to determining that the entire multimedia file has not been compared to the RCD (i.e., determination block 1030="No"), the processor may select the bit within the multimedia file following the last bit in the previously matched bit string as the starting point for the next comparison in block 1032, and then compare the sequence of bits of the raw binary data beginning from the newly selected starting point to the RCD to identify a long matching stream that appears within the RCD data in block 1022 as described above. Thus, the operations of matching strings of bits to the RCD to identify long strings of bits and rules for finding those long strings in the RCD may continue until the entire multimedia file has been compared to the RCD.

In response to determining that the entire multimedia file has been compared to the RCD (i.e., determination block 1030="Yes"), the processor may store the rule sets generated in blocks 1020-1032 for later use in response to a request to play the media file received from a subscriber. By linking long strings of bits to RCD-lookup-rules that are relatively small, the method 1000 may enable delivery of movie-length multimedia files to subscriber computing devices using communication methods that have limited bandwidth or a small maximum file size. Further, the rule sets may be broken into separate messages that are transmitted within message size limits.

The subscriber computing device may perform method 1006b in order to download and render a multimedia file (e.g., a movie) from the media delivery service. For example, a processor of the subscriber computing device may transmit a request for a particular media file to the media delivery service in block 1040 using any of a variety of communication methods (e.g., accessing a website, transmitting a request via an application, sending an email, etc.).

The media delivery server may respond to a request for a multimedia file by executing operations of method 1006a. In block 1042, the server may receive the request of the media file from the subscriber computing device, and access data for delivering the multimedia file to the subscriber from memory. This may involve accessing information regarding the particular subscriber computing device, such as a subscriber identifier, information regarding the previously downloaded RCDs, and information related to the subscriber's account.

In optional block 1044, the server may generate a transformation rule for transforming or otherwise randomizing the RCD, and apply the transformation rule to the rule sets for the requested multimedia file in optional block 1046. In some embodiments, the rule sets for the particular the media file previously generated in method 1004 may be altered consistent with how the transformation rules generated in block 1044 will cause the subscriber RCDs to be modified. In this manner the rule sets sent to the subscriber computing device will only work in identifying bit streams of the particular multimedia file using the subscriber's RCDs after the RCDs has/have been transformed according to the transformation rule. Thus, the rule sets transmitted to each subscriber computing device for a given media file may be different. These operations may be considered optional because protecting digital rights may be accomplished using other DRM methods, such as encrypted communication protocols, direct network connections, etc.

In block 1048, the server may begin streaming the stored and, optionally transformed, rule sets for the requested media file to the subscriber computing device. Again, the delivery of the rule sets to the subscriber computing device may use any known or for future form of data communication suitable for streaming data delivery. Examples include streaming data via Internet HTTP protocol, mobile streaming media protocols, etc.

In optional block 1050, the subscriber computing device may receive the transformation rule from the media service provider server, and apply the rule to transform the RCD accordingly in optional block 1052. By transforming the RCD in this manner, the subsequently received rules will correspond to the correct bit strings of the selected media file.

In block 1054, the subscriber computing device may begin receiving rules within the rule set and, optionally, the transformation rule from the first computing device.

In block 1056, the processor of the subscriber computing device may select the first rule within the rule set.

In block 1058, the processor may use the selected rule to obtain the correlated bit string from the RCD. As described with reference to FIGS. 9A and 9B, the processor may perform this operation using a rule set reader application 910 or software to apply the information in the rule to identify the sequence of bits within the RCD and copy that bit string.

In block 1060, the processor of the subscriber computing device may add the obtained bit string to a rendering bit buffer or memory file in sequence. In this operation, the processor may store the bit string copied from the RCD into the buffer or memory file adjacent to (i.e., concatenated with) the previously stored bit string.

In determination block 1062, the processor may determine whether enough data has been received and added to the rendering buffer to enable rendering of a complete frame of the original media file. This determination may depend upon the amount of data that appears in the buffer, or the presence within the data of a flag or demarcation data indicating the start or end of a frame of data as may appear in the original media file format.

In response to determining that enough data appears in the rendering buffer for a media frame (i.e., determination block 1062="Yes"), the data within the rendering buffer may be passed to a media application in block 1064. Again, the media application may be any known or conventional video rendering application that is capable of rendering the original media file format. Many such media applications include a buffer or memory queue for accepting and temporarily streaming data as data packets are received and assembled so that a constant stream of media data can be provided to a rendering process. The operations in block 1064 may direct data to any such buffer or memory queue, thereby supporting interoperability with a media rendering application.

In response to determining that insufficient data to support rendering a frame has been received in the rendering buffer (i.e., determination block 1062="No"), or before or after buffer data is passed to the media application in block 1064, the processor of the subscriber computing device may determine whether there is another rule within the rule set to be applied in determination block 1066. In this embodiment addressing the rendering of streaming media files, this determination may be equivalent to determining whether the media file is over.

In response to determining that there is another rule within the rule set to be processed (i.e., determination block 1066="Yes"), the processor may select the next rule within the rule set in block 1068, and use this selected rule to obtain the bit string from the RCD in block 1058 and proceed with blocks 1060-1068 until the subscriber computing device stopped receiving streamed rule sets and the full media file has been rendered.

In response to determining that there are no more rules within the rule set to process (i.e., determination block 1066="No"), the processor may end the method.

Figure 11A:
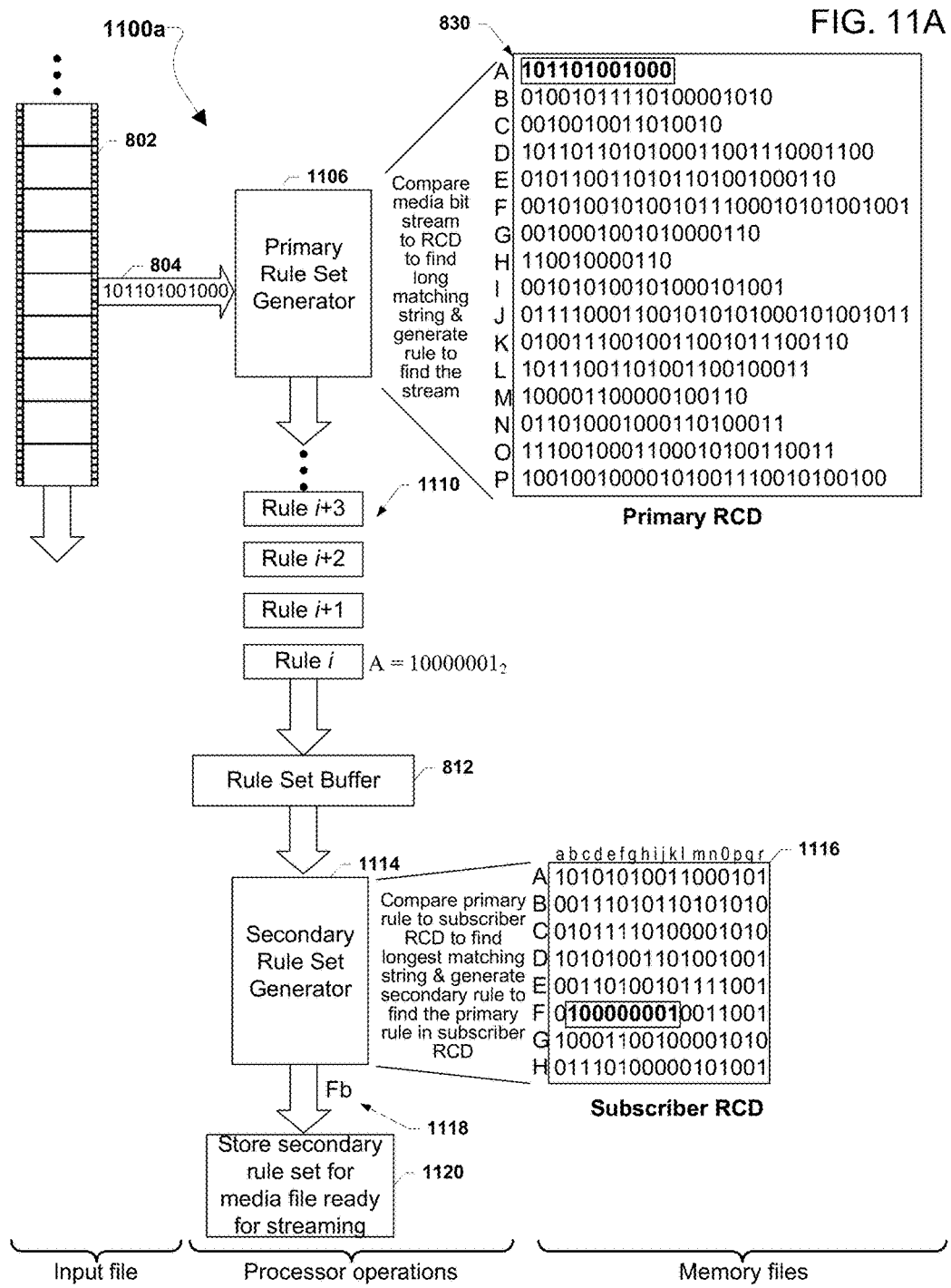
FIGS. 11A and 11B are block diagrams illustrating further methods of encoding a multimedia file into rule sets based on a primary RCD and a subscriber RCD according to some embodiments.
Figure 13A:
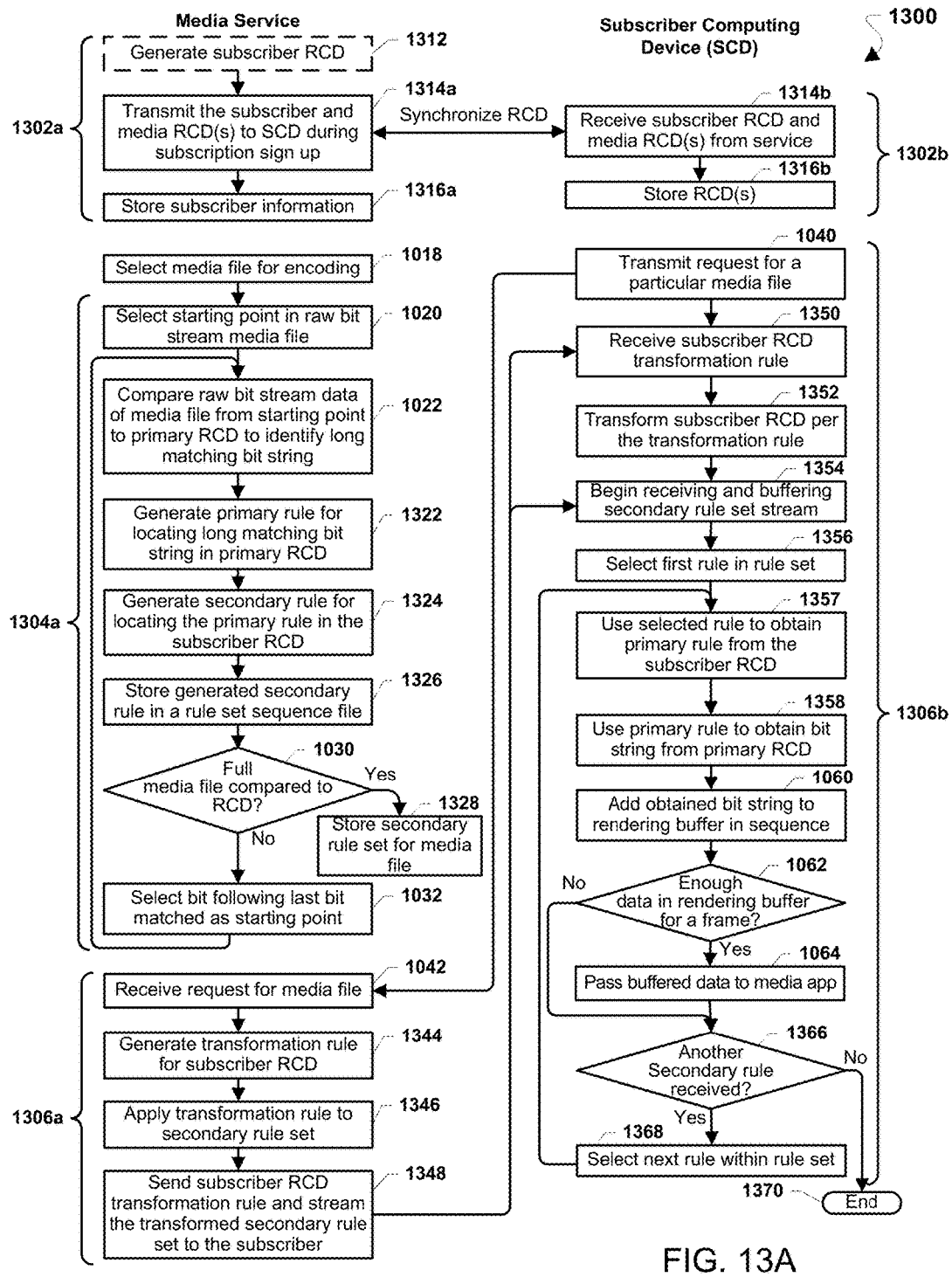
FIG. 13A is a process flow diagram illustrating methods for encoding, transmitting, receiving and reproducing multimedia files using a shared RCD and a shared subscriber RCD according to some embodiments.

As described above with reference to FIG. 8B, the transmission of certain types of multimedia files, such as movies, may be facilitated by generating a media-specific RCD that includes long bit strings that have a high probability of appearing in the multimedia files. FIGS. 11A-12 illustrate the delivery of multimedia files using such media-specific RCDs and a subscriber RCD to provide additional DRM. FIG. 13A illustrates methods for encoding and rendering multimedia files using such media-specific RCDs and subscriber RCDs.

Referring to FIG. 11A, a multimedia file including a stream of image frames 802 that are to be delivered to receiving devices may be obtained or received by a computing device that implements a primary rule set generator 1106 according to various embodiments. The primary rule set generator 1106 may be the same as or similar to the rule set generator 806 described with reference to FIGS. 8A and 8B. The multimedia file may be formatted in any conventional media data format. For example, the media file may be in full fidelity high definition image format in which each image frame includes information for each and every pixel. As another example, the media file may be in a high definition (HD) video format. As another example, the media file may be in a digital video broadcasting (DVB) format such as compliant with the DVB-X standard. As another example, the media file may be in the Multimedia Messaging Service (MMS) format. As another example, the multimedia file may be in the multimedia broadcast and multicast system (MBMS) format or the enhanced MBMS (eMBMS) format. As another example, the multimedia file may be in a compressed video format such as defined in ISO/IEC 14496-10/MPEG-4 AVC. In the other format of multimedia, including multimedia formats yet to be defined, may be used with various embodiments. Some media formats may not include complete image data for each frame, such as compressed video formats that intersperse information regarding changes in portions or particular pixels from one frame to the next between full image frames. Again, the term "image frame" is used to refer to the information included in a multimedia file associated with a particular frame of video as well as associated audio, even if that information is not a complete, standalone image. Thus, the various embodiments enable conversion and delivery of multimedia regardless of the format of the input multimedia file.

The rule set generator may receive the raw data of each image frame 802 as a string of bits 804. The rule set generator may compare the file bit string 604 to strings of bits within the RCD 830 to find long strings of matching bits. This process may be accomplished using any of a variety of algorithms. For example, the primary rule set generator 1106 may read in bit strings 604 while matching the bits to portions of the RCD 830 and continue to do so until a match in the RCD is no longer found. Thus, the longest matching bit string appearing in the RCD 830 may be identified by the primary rule set generator 1106. In some embodiments, this comparison of bit string's 804 to the RCD may be performed until a maximum bit string length is reached. While the process of matching the raw bit string of image files to the RCD may be time-consuming, the various embodiments are most useful in applications in which there is sufficient time to transform large video files into relatively small rule set files for later transmission.

When a long matching string is identified, the primary rule set generator 1106 may generate a rule 1110 that will enable a recipient computing device to locate the string within the same RCD 830. The rules 1110 for locating matching bit strings may depend upon the organization of the RCD 830. A variety of RCD structures are described above, but a simple example is illustrated in FIG. 8B in which a media-specific RCD 830 is structured as an indexed table with each row or file associated with a single index value (illustrated A-P). The potential advantage of using a media-specific RCD 830 is that the various bit strings can be treated as data fields in an indexed data base, thus simplifying the format of rules used to identify particular bit strings. Using this example RCD 830, the portion matching the file bit string 804 has the index value "A". Thus, the example rule i is "A". This rule for locating the matching bit string intended to be illustrative, and not limit the claims in any way to a particular form of indexing or locating bit strings within an RCD.

In view of the ability to use an index rule for a media-specific primary RCD when a secondary RCD is used to obfuscate primary rules, short bit strings of a length equal to the index binary bit length may be included within the primary RCD. For bit strings in the multimedia file that are shorter than the index binary bit length, the data itself may be the corresponding rule, such as with a most significant bit serving as a flag to indicate whether the rest of the index value is a data string or a rule mapping to the primary RCD. For example, if the primary RCD includes no more than 32,768 entries, a two-byte index can be used leaving the most significant bit available for use as a flag for indicating raw bit string data (e.g., a "0" in the most significant bit) or an RCD lookup rule (e.g., a "1" in the most significant bit). Thus, in this non-limiting example, the primary rule set generator 1106 that is unable to match a bit string longer than 16 bits to the RCD would output a 16 bit rule in which the first bit is "0" and the rest of the bits in the index are the first 15 bits of the unmatched bit string. Because such data rules will be interspersed with rules mapped to long bit strings, this transmission of raw data should not compromise the DRM protections provided by various embodiments.

As the rule set generator 1106 identifies rules 1110 for locating a long bit string within the RCD 808, the rules may be accumulated in a rule set buffer 812.

In this embodiment, in which the media-specific RCD 830 may be structured as an indexed date piece of frequently appearing long bit strings, it may be difficult to transform the RCD for purposes of ensuring security or implementing DRM methods. The RCD may be shifted in a simple manner, such as shifting rows or lines, however, such simple methods may be easy to discover by checking a relatively small number of shifts until the correct shift is found. Therefore, to provide security and DRM methods, the rules for finding bit strings within the media-specific RCD 830 generated by the primary rule set generator 1106 may be encoded into secondary rules by a secondary rule set generator 1114 using a subscriber RCD 1116. The purpose of the subscriber RCD 1116 is to render a rule set for delivery to the subscriber computing device that is usable only by that device, thereby protecting the multimedia file from being pirated or copied by intercepting or copying the transmitted rule set. For ease of reference, rules generated by the primary rule set generator 1106 are referred to as primary rules 1110, while rules generated by the secondary rule set generator 1114 are referred to as secondary rules 1118.

Thus, primary rules 1110 generated by the primary rule set generator 1106 may be individually compared to a subscriber RCD 1116 by a secondary rule set generator 1114. The secondary rule set generator 1114 performs a similar function to the primary rule set generator 1106 in that the bit string of each primary rule is compared to bit strings within the subscriber RCD 1116 to find the longest matching string, and generate the secondary rule to enable a receiving computing device to find the primary rule within a matching subscriber RCD.

Since the length of the primary rules will be limited, the subscriber RCD 1116 may be a smaller database then necessary to serve the functions of the primary RCD 830. Being small, the subscriber RCD 1116 may be easier to generate transformation rules that can be applied to the secondary rule set in the subscriber RCD 1116 than is the case for a very large RCD as in the embodiments illustrated in FIGS. 8A-10.

In the illustrated example, the long bit string 804 of "101101001000" is found by the primary rule set generator 1106 to match the entry within the primary RCD 830 with an index value of "A" for Rule i, which in ASCI is the binary number "10000001." The secondary rule set generator 1114 finds this number "10000001" within the subscriber RCD 1116 at index "Fb". Since the index for the primary RCD 830 may be a fixed format, a length of the bit string may not be required for the secondary rule as illustrated.

Secondary rules 1118 generated by the secondary rule set generator 1114 may be stored as a set of rules in memory 1120 that can be transmitted to a computing device to which the media file 802 is to be provided. As with other embodiments, the rule set may be transmitted using any form of computer-to-computer communication protocol and network, including communication protocols not otherwise suitable for communicating multimedia files. Further, because the subscriber RCD 1116 may be rendered unique to a particular subscriber and media delivery by transformation, the transmission of only the secondary rule set provides effective protections for digital rights because a party intercepting or copying the secondary rule set transmission will be unable to reconstruct the multimedia file. Thus, digital rights management (DRM) requirements can be satisfied while transmitting the multimedia files using any form of communication network protocol without encryption.

Thus, in the method 1100*a* illustrated in FIG. 11A, a computing device such as a server transforms an input multimedia file, such as a movie or similar file, through a series of processor operations referencing a primary RCD 830 stored as a memory file, into a series of rules sets that essentially encodes the image frames and audio as a series of rules that a receiving computing device can use to reconstruct the file referencing the same RCD stored in the device's local memory.

Figure 11B:
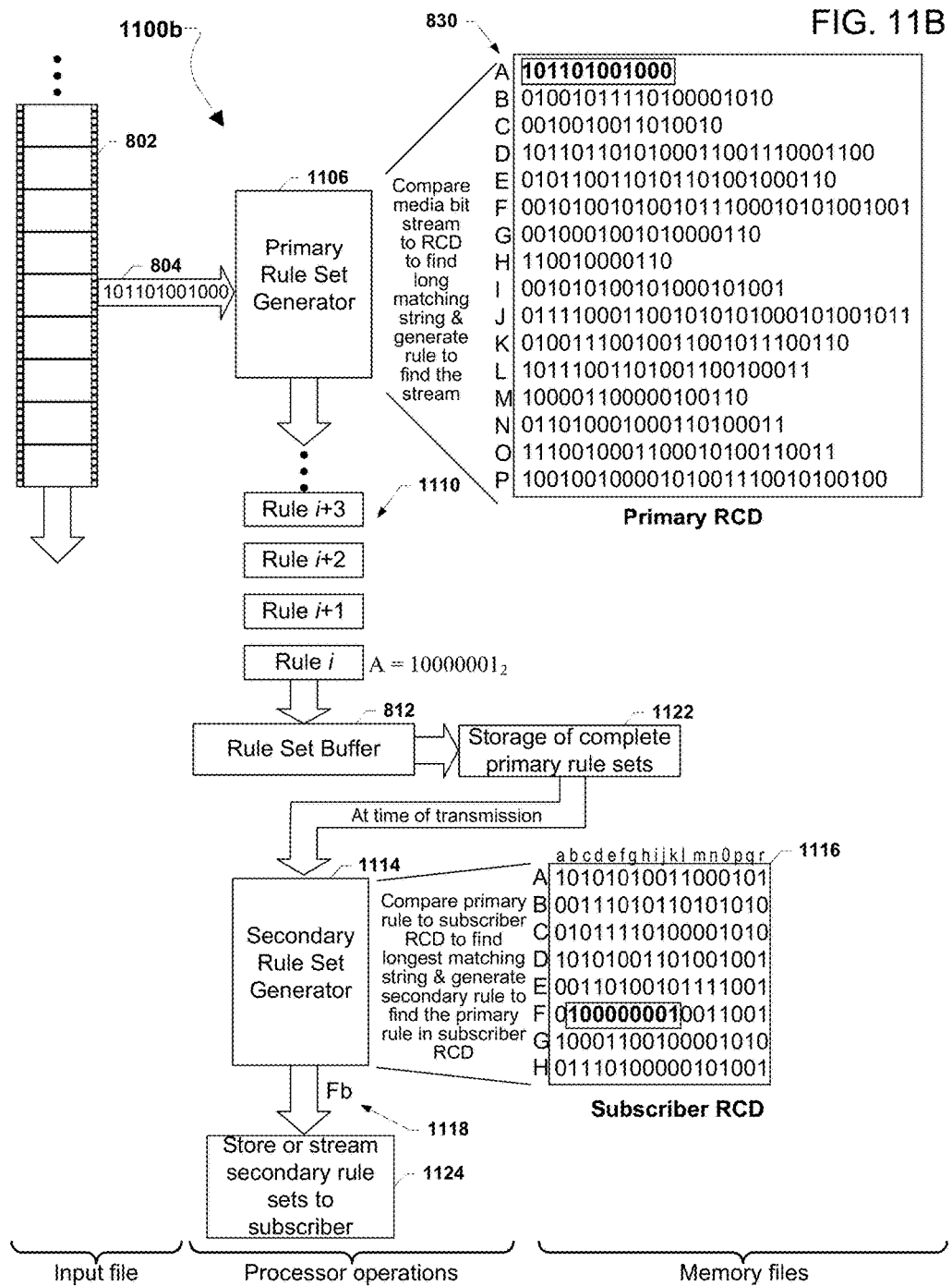

FIG. 11B graphically illustrates a method 1100*b* according to another embodiment in which primary rules are stored in memory for later delivery to customers and the generation of secondary rule sets occurs at or near the time of transmission. In this embodiments, all the operations described above with reference to FIG. 11A are performed with the addition that primary rule sets from the rule set buffer 812 are saved in a storage for all completed primary rule sets 1122, such as in a large database of a server farm supporting the media delivery service. Then, when a customer requests delivery of a particular multimedia file (e.g., a movie), the corresponding primary rule sets are drawn from the storage 1122 and processed through the secondary rule set generator 1114 as described above to generate secondary rules 1118 that may be temporarily stored and/or streamed to the subscriber in block 1124. Given the smaller and known format of primary rules and smaller size of the subscriber RCD, the operations of generating secondary rules may be performed at the same time as and in parallel with streaming the rules to the subscriber. Alternatively, a subscriber may request downloading of a multimedia in advance (e.g., a few minutes, a few hours or a few days) of viewing, during which the generation of secondary rule sets may be performed and temporary stored until the pre-set time of streaming.

This alternative embodiment may enable the use of subscriber RCDs 1116 that are unique to a particular subscriber and/or download event. For example, a subscriber unique RCD may be generated and stored on the subscriber's computing device upon registration. Such subscriber unique RCDs may be periodically changed (e.g., transformed) or upgraded. As another example, an RCD distributed to more than one subscriber may be rendered one-time unique through a transformation rule that is sent to the subscriber's computing device prior to streaming and used by the server to transform the subscriber RCD 1116 before the process of generating secondary rule sets begins.

Similar to the method 1100a illustrated in FIG. 11A, the method 1100b illustrated in FIG. 11B involves a computing device such as a server transforming an input multimedia file, such as a movie or similar file, through a series of processor operations referencing a primary RCD 830 stored as a memory file, into a series of rule sets that essentially encodes the image frames and audio as a series of rules that a receiving computing device can use to reconstruct the file referencing the same RCD stored in the device's local memory.

FIG. 12 graphically illustrates a method 1200 by which a subscriber computing device receiving a transmission of secondary rule sets generated according to the methods illustrated in FIG. 11A or 11B. With reference to FIGS. 1-12, the subscriber computing device has a primary RCD 830 stored in memory that is the same as (or essentially the same as the primary RCD 830 used in generating primary rule sets in the methods illustrated in FIG. 11A or 11B. The subscriber computing device also has a secondary RCD 1116 stored in memory that is the same as (or essentially the same as) the secondary RCD 1116 used in generating secondary rule sets in the methods illustrated in FIG. 11A or 11B. The primary and secondary RCDs may be stored in an available memory can quickly reconstruct and render the original multimedia file 802 using any conventional media rendering application 1222.

A media receiver, transceiver or application 1202 of a computing device may receive a transmission (e.g., via email, Internet, SMS, etc.) of one or more secondary rule sets 1204 that include the sequence of secondary rules 1118 generated as illustrated in FIG. 11A or 11B. In some embodiments, the secondary rule sets may be buffered 1206 (i.e., temporarily stored) so that the secondary rules 1208 may be individually processed by a secondary rule reader and primary rule set generator 1210 while the media receiver, transceiver or application 1202 continues to receive rules, as in a media streaming implementation.

As an illustration, a rule set may include a particular Rule i "Fa" for locating a particular string of bits within the secondary or subscriber RCD 1116. A secondary rule reader and primary rule set generator 1210 executing within the computing device may receive individual rules 1208, use each rule to look up the corresponding bit string within the subscriber RCD 1116, and output the corresponding bit string as a primary rule 1212. In the illustrated example in which the subscriber RCD 1116 is a tabular data file having vertical and horizontal indexes, the rule "Fa" enables the secondary rule reader and primary rule set generator 1210 to identify a string of bits beginning at the intersection of horizontal index "F" and vertical index "a" and extending for the standard length of primary rules (e.g., 12 bits and thus "010110100100" which is the ASCI value for "A" in the illustrated example). This output of a primary rules may be output to a primary rule set reader 1214 executing in the computing device.

The primary rule 1212 output of the secondary rule reader and primary rule set generator 1210 may be received and processed by a primary rule set reader 1214. In some embodiments, the primary rules 1212 may be temporarily staged or queued in a buffer (not shown) before processing by the primary rule set reader 1214. The primary rule set reader 1214 may use each primary rule to look up the corresponding bit string within the primary RCD 830, and pass the bit string to a bit buffer 1218. In the example illustrated in FIG. 12, the primary rule set reader 1214 uses Rule i having the index value "A" output by the secondary rule reader and primary rule set generator 1210 to find the bit string "010110100100" within the primary RCD 830, and passes this data to the bit buffer 1218.

Periodically data held within the bit buffer 1216 may be copied to a media data buffer 1220 that is configured to queue multimedia data (e.g., multimedia data packets according to the original media data format) for rendering by a conventional media rendering application 1222. The storage format and operations in blocks 1220 and 1222 may be those of whatever media rendering application executes in the subscriber's computing device to render the multimedia.

Thus, in the method 1200 illustrated in FIG. 12, a computing device receives secondary rule sets by any of a variety of communication networks and protocols, uses each secondary rule to look up a corresponding primary rule in a secondary or subscriber RCD, uses each primary rule to look up a corresponding string of bits within a primary RCD stored as a memory file, accumulates the identified bit strings into a media play buffer that supports (i.e., provides media data to) a conventional media rendering application. This enables the various embodiments to be used for transporting multimedia files of any format using any conventional communication network or protocol, including communication protocols not suitable for carrying the original multimedia data format, to computing devices for rendering using any conventional multimedia player or application compatible with the original multimedia data format.

FIG. 13A illustrates algorithms or methods 1300 that may be implemented on one or more servers of a media delivery service for sending a multimedia file (e.g., streaming video) to a subscriber computing device using the techniques described above with reference to FIGS. 11A-12. With reference to FIGS. 1-13A, the algorithms or methods 1300 may be implemented by one or more servers or other computing devices within a media delivery service provider and one or more processors (e.g., 202) in a subscriber computing device with access to memory storing a synchronized primary RCD.

The methods 1300 may be implemented by a media delivery service (e.g., Netflix, Amazon, Hulu, etc.) for delivering movies and similar multimedia files to subscribers. To support such deliveries, the media delivery service may implement a subscription sign-up method 1302a by which the service provides one or more synchronized primary RCDs and a synchronized secondary or subscriber RCD to a new subscriber computing device, which implements a subscription registration process 1302b. For example, a server of the media delivery service may obtain one or more stored media primary RCDs and a subscriber RCD in block 1312. Such RCDs may be of a variety of formats including the examples described above. The primary RCD(s) may be generated for particular types of multimedia (e.g., specific movie genres) as described below with reference to FIGS. 11A-14. The subscriber RCD may be unique to the subscriber computing device, or may be optimized for primary rule look up after being transformed according to a transformation rule.

In block 1314a, the server may transmit the primary RCDs and subscriber RCD to the subscriber computing device that receives and saves the RCDs in blocks 1314b and 1316b, such as during a subscription sign-up. This delivery may use any of a variety of forms, such as providing the RCDs for download from a website. In block 1316a, the server may store information regarding the subscriber that will be used in subsequent media delivery operations, such as information regarding the particular RCDs that were downloaded to the subscriber computing device.

To prepare a multimedia file for delivery using various embodiments, a server or other type of computing device of the media delivery service provider may perform operations in method 1304 to transform the multimedia file into one or more secondary rule sets for delivery to a subscriber. For ease of reference, the computing device used to implement the method 1304 is referred to herein as a "server," however, this reference is not intended to be limiting as the operations may be performed by a workstation, mainframe computer, matrix of personal computers, or other type of computing device.

In block 1018, the server may obtain or access a multimedia file (e.g., a movie file) for processing. For example, the server may access a movie within a server farm of stored movie files.

In block 1020, the server may select the beginning (e.g., first bit) of the raw binary data of the media file as a starting point of the process of converting to a rule set linked to the RCD.

In block 1022, the server, such as using a rule set generator application executing the server, may begin comparing a sequence of bits of the raw binary data beginning from the selected starting point to the primary RCD to identify a long matching string of bits that appears within the RCD data. As described above with reference to FIG. 11A this may be accomplished by reading in a string of bits from the multimedia file while so long as matches to the string of bits can be located in the RCD. A long string of bits may be identified when an additional bit cannot be matched to a string within the RCD or the length of the string reaches a preset maximum or threshold length. In some embodiments, the primary RCD may be indexed or otherwise enhanced with metadata that enables the server to quickly identify matching bit strings. Such indexing or metadata may be possible because the primary RCD may be populated with bit strings that appear frequently based on analyses of a number of multimedia files (e.g., movies within a particular genre). As an example of a metadata enhancement, the bit strings stored in the RCD may include information indicating whether a longer bit string including the same bits is present in the RCD and if so provide indexes of bit strings to compare. For example, if a particular long string is matched, metadata associated with the matched bit string may inform the server there are no longer bit string including the matched bits in the RCD so the server can stop the search and use the matched bit string. As another example, if a particular long string is matched, metadata associated with the matched bit string may inform the server of the indices (or other locating information) of longer bit strings including the matched bits in the RCD so the server can compare the multimedia data bits to those longer strings in the search for the longest matching bit string.

Once a long string of bits is identified in block 1022, the server may generate a primary rule for locating or recovering the string of bits within/from the primary RCD in block 1322. The primary rule may be generated using any of a variety of methods, including methods described above, depending upon the data structure of the primary RCD. For example, a primary rule may be the index (or other locating information) of the matched long bit string within the primary RCD.

In block 1324, the server may compare the primary rule to the subscriber RCD to identify a matching bit string (or matching value) and generate a secondary rule for locating the matched bit string within the subscriber RCD.

In block 1326, the server may store the generated secondary rule in a rule set sequence file.

In determination block 1030, the processor may determine whether the entire multimedia file has been compared to the primary RCD.

In response to determining that the entire multimedia file has not been compared to the primary RCD (i.e., determination block 1030="No"), the processor may select the bit within the multimedia file following the last bit in the previously matched bit string as the starting point for the next comparison in block 1032, and then compare the sequence of bits of the raw binary data beginning from the newly selected starting point to the primary RCD to identify a long matching stream that appears within the primary RCD data in block 1022 as described above. Thus, the operations of matching strings of bits to the primary RCD to identify long strings of bits and rules for finding those long strings in the primary RCD and then generating secondary rules for finding the primary rules within the subscriber RCD may continue until the entire multimedia file has been compared to the primary RCD.

In response to determining that the entire multimedia file has been compared to the primary RCD (i.e., determination block 1030="Yes"), the processor may store the secondary rule sets generated in block 1324 for later use in response to a request to play the media file received from a subscriber. By linking long strings of bits to primary RCD-lookup-rules that are relatively small and then linking the primary rules to secondary rules based on a subscriber RCD, the method 1300 may enable delivery of movie-length multimedia files to subscriber computing devices using communication methods that have limited bandwidth or a small maximum file size while providing DRM protections. Further, the rule sets may be broken into separate messages that are transmitted within message size limits.

The subscriber computing device may perform method 1306b in order to download and render a multimedia file (e.g., a movie) from the media delivery service. For example, a processor of the subscriber computing device may transmit a request for a particular media file to the media delivery service in block 1040 using any of a variety of communication methods (e.g., accessing a website, transmitting a request via an application, sending an email, etc.).

The media delivery server may respond to a request for a multimedia file by executing operations of method 1306a. In block 1042, the server may receive the request of the media file from the subscriber computing device, and access data for delivering the multimedia file to the subscriber from memory. This may involve accessing information regarding the particular subscriber computing device, such as a subscriber identifier, information regarding the previously downloaded RCDs and the subscriber RCD, and information related to the subscriber's account.

In block 1344, the server may generate a transformation rule for transforming or otherwise randomizing the subscriber RCD and apply the transformation rule to the secondary rule sets for the requested multimedia file in block 1346. In some embodiments, the secondary rule sets for the particular media file previously generated in method 1304a may be altered consistent with how the transformation rules generated in block 1344 will cause the subscriber RCD to be modified. In this manner the rule sets sent to the subscriber computing device will only work in identifying the primary rules for identifying bit streams of the particular multimedia file using the subscriber's RCD after that RCD has been transformed according to the rotation rule. Thus, the secondary rule sets transmitted to each subscriber computing device for a given media file may be different.

In block 1348, the server may begin streaming the stored and transformed secondary rule sets for the requested media file to the subscriber computing device. Again, the delivery of the secondary rule sets to the subscriber computing device may use any known or future form of data communication suitable for streaming data delivery. Examples include streaming data via Internet HTTP protocol, mobile streaming media protocols, etc.

In block 1350, the subscriber computing device may receive the subscriber RCD transformation rule from the media service provider server and apply the transformation rule to transform the subscriber RCD accordingly in block 1352. By transforming the subscriber RCD in this manner, the subsequently received secondary rules will correspond to the correct primary rules for obtaining bit strings for the selected media file from the primary RCD.

In block 1354, the subscriber computing device may begin receiving rules and optionally buffering secondary rules from the server of the media delivery service.

In block 1356, the processor of the subscriber computing device may select the first secondary rule within the secondary rules received/buffered in block 1354.

In block 1357, the processor may use the selected secondary rule to obtain the corresponding from the subscriber RCD. As described with reference to FIG. 12, the processor may perform this operation using a secondary rule reader primary rule set generator application 1210 or software to apply the information in the secondary rule to identify the sequence of bits within the subscriber RCD and use that information as the corresponding primary rule.

In block 1358, the processor may use the generated primary rule to obtain the correlated bit string from the primary RCD. As described with reference to FIG. 12, the processor may perform this operation using a primary rule set reader application 1214 or software to apply the information in the rule to identify the sequence of bits within the primary RCD and copy that bit string.

In block 1060, the processor of the subscriber computing device may add the obtained bit string to a rendering bit buffer or memory file in sequence. In this operation, the processor may store the bit string copied from the primary RCD into the buffer or memory file adjacent to (i.e., concatenated with) the previously stored bit string.

In determination block 1362, the processor may determine whether enough data has been received and added to the rendering buffer to enable rendering of a complete frame of the original media file. This determination may depend upon the amount of data that appears in the buffer, or the presence within the data of a flag or demarcation data indicating the start or end of a frame of data as may appear in the original media file format.

In response to determining that enough data appears in the rendering buffer for a media frame (i.e., determination block 1062="Yes"), the data within the rendering buffer may be passed to a media application in block 1064. Again, the media application may be any known or conventional video rendering application that is capable of rendering the original media file format. Many such media applications include a buffer or memory queue for accepting and temporarily streaming data as data packets are received and assembled so that a constant stream of media data can be provided to a rendering process. The operations in block 1364 may direct data to any such buffer or memory queue, thereby supporting interoperability with a media rendering application.

In response to determining that insufficient data to support rendering a frame has been received in the rendering buffer (i.e., determination block 1062="No"), or before or after buffer data is passed to the media application in block 1064, the processor of the subscriber computing device may determine whether another secondary rule has been received in determination block 1366. In this embodiment addressing the rendering of streaming media files, this determination may be equivalent to determining whether streaming of the media file is finished or suspended.

In response to determining that another secondary rule has been received for processing (i.e., determination block 1366="Yes"), the processor may select the next secondary rule in block 1368, and use this selected secondary rule to obtain the next primary rule from the subscriber RCD in block 1357 and proceed with the operations in blocks 1358-1368 until the subscriber computing device stops receiving streamed secondary rules Thus, in response to determining that no more secondary rules remain to process (i.e., determination block 1366="No"), the processor may end the method.

The algorithms or methods 1300b for implementing the embodiments illustrated in FIG. 11B are similar to those described above with the differences illustrated in FIG. 13B and FIG. 13C. Specifically, the operations of registering a subscriber and synchronizing primary RCDs and a subscriber RCD (i.e., methods 1302a and 1302b), as well as the operations for processing streamed secondary rules and generating multimedia data from the two RCDs in the subscriber computing device (i.e., method 1306b) may be substantially the same as the operations illustrated in FIG. 13A.

Figures 13B, 13C:
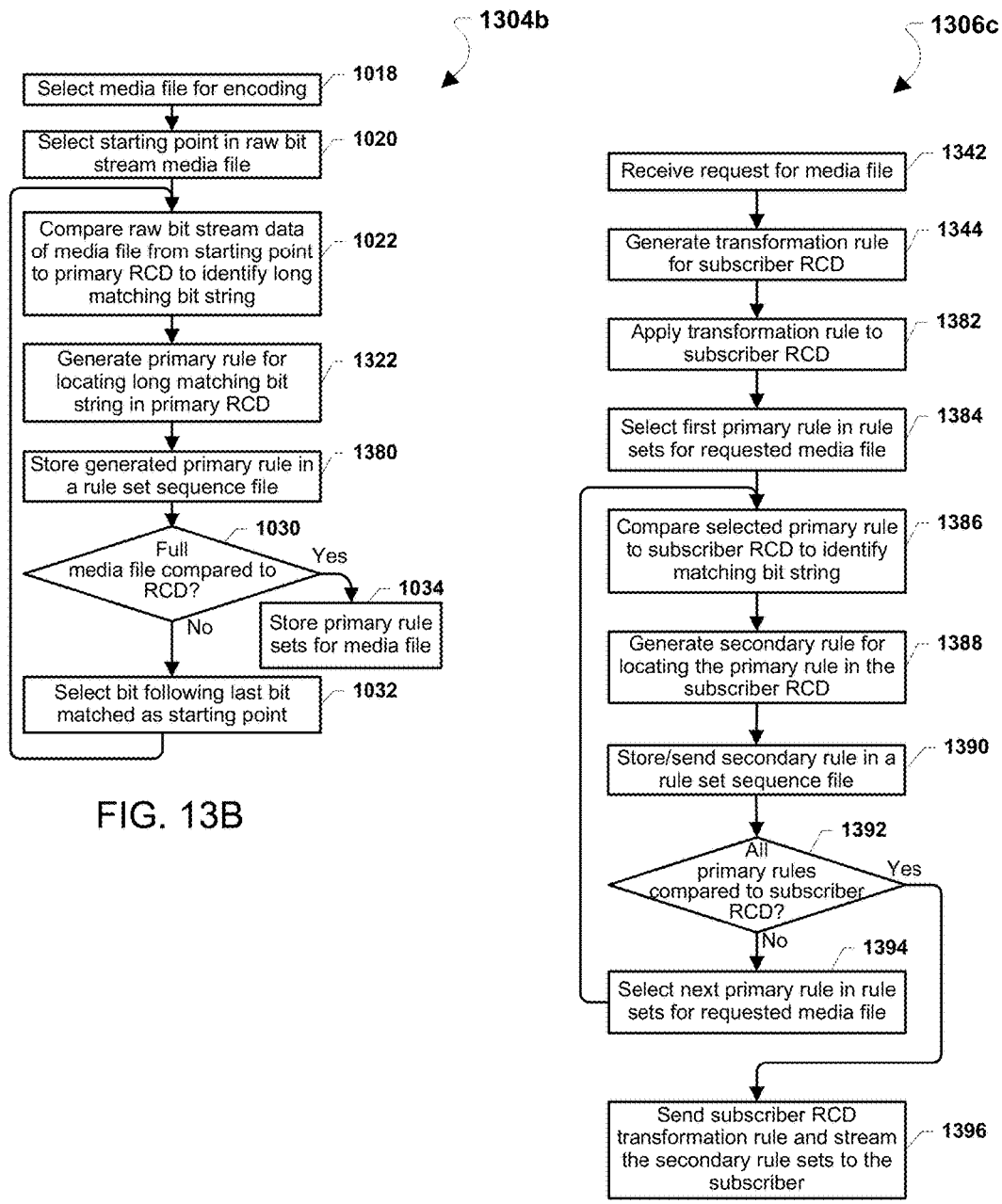
FIG. 13B is a process flow diagram illustrating another method for encoding multimedia files using a shared RCD according to some embodiments.
FIG. 13C is process flow diagram illustrating another method for transmitting multimedia files that have been encoded using a shared RCD by using a subscriber RCD according to some embodiments.

In the embodiments illustrated in FIG. 11B and described above, the processes of generating the primary rule set in the secondary rule sets are separated in time, with the secondary rule sets being generated at or close to the time of delivering multimedia file to the subscriber computing device. FIG. 13B illustrates operations that may be performed by a server or other media delivery service in the first operation of generating the primary rule set. With reference to FIGS. 1-13B, the algorithms or method 1300b may be implemented by one or more servers or other computing devices with access to memory storing a suitable primary RCD (e.g., in RCD for the genre of the particular movie).

In block 1018, the server may select the media file for encoding. In block 1020, the server may select the starting point in a raw bit string of the selected media file.

In block 1020, the server may select the beginning (e.g., first bit) of the raw binary data of the media file as a starting point of the process of converting to a rule set linked to the RCD.

In block 1022, the server, such as using a rule set generator application executing the server, may begin comparing a sequence of bits of the raw binary data beginning from the selected starting point to the primary RCD to identify a long matching string of bits that appears within the RCD data. As described above with reference to FIG. 11B, this may be accomplished by reading in a string of bits from the multimedia file while so long as matches to the string of bits can be located in the RCD. A long string of bits may be identified when an additional bit cannot be matched to a string within the RCD or the length of the string reaches a preset maximum or threshold length. As described above, in some embodiments, the primary RCD may be indexed or otherwise enhanced with metadata that enables the server to quickly identify matching bit strings. Such indexing or metadata may be possible because the primary RCD may be populated with bit strings that appear frequently based on analyses of a number of multimedia files (e.g., movies within a particular genre). As an example of a metadata enhancement, the bit strings stored in the RCD may include information indicating whether a longer bit string including the same bits is present in the RCD and if so provide indexes of bit strings to compare. For example, if a particular long string is matched, metadata associated with the matched bit string may inform the server there are no longer bit string including the matched bits in the RCD so the server can stop the search and use the matched bit string. As another example, if a particular long string is matched, metadata associated with the matched bit string may inform the server of the indices (or other locating information) of longer bit strings including the matched bits in the RCD so the server can compare the multimedia data bits to those longer strings in the search for the longest matching bit string.

In block 1322, the server may generate a primary rule for locating the long matching bit string in the primary RCD. Again, this rule may depend upon the particular data structure (e.g., indexing) of the primary RCD.

In determination block 1030, the processor may determine whether the entire multimedia file has been compared to the primary RCD.

In response to determining that the entire multimedia file has not been compared to the primary RCD (i.e., determination block 1030="No"), the processor may select the bit within the multimedia file following the last bit in the previously matched bit string as the starting point for the next comparison in block 1032, and then compare the sequence of bits of the raw binary data beginning from the newly selected starting point to the primary RCD to identify a long matching stream that appears within the primary RCD data in block 1022 as described above. Thus, the operations of matching strings of bits to the primary RCD to identify long strings of bits and rules for finding those long strings in the primary RCD may continue until the entire multimedia file has been compared to the primary RCD.

In response to determining that the entire multimedia file has been compared to the primary RCD (i.e., determination block 1030="Yes"), the processor may store the primary rule sets for the multimedia file for later use in response to a request to download the multimedia file received from a subscriber.

FIG. 13C illustrates operations in method 1306c that may be performed by a server of the media delivery service at the time that download of the multimedia file has been requested by a subscriber. With reference to FIGS. 1-13C, the algorithms or method 1306c may be implemented by one or more servers or other computing devices with access to memory storing the subscriber RCD associated with the subscriber requesting the media download.

In block 1342, the server may receive a request for a particular multimedia file from a subscriber computing device.

In block 1344, the server may generate a transformation rule to be used for transforming or otherwise securing the subscriber RCD. This transformation rule may be generated using any of the methods described herein. In some embodiments, as part of the operation in block 1344, the server may transmit the transformation rule to the subscriber computing device so that the processor of the subscriber computing device can apply that rule in preparation for receiving secondary rule sets from the server.

In block 1382, the server may transform the subscriber RCD using the generated transformation rule. This generates a unique RCD for the particular media delivery event. Depending upon the initial subscriber RCD, the rotated RCD may be both unique to the subscriber and to the particular media delivery event.

In block 1384, the server may select a first primary rule in the rule sets for the requested multimedia file.

In block 1386, the server may compare the selected primary rule to the subscriber RCD to identify a matching bit string. This comparison may be accomplished using any of the methods described herein.

In block 1388, the server may generate a secondary rule for locating the primary rule within the subscriber RCD. As with other embodiments, the generated secondary rule will depend upon the data structure of the subscriber RCD.

In block 1390, the server may store the generated secondary rule in a rule set sequence file. In some embodiments, the server may also begin streaming secondary rules from the rule set sequence file to the requesting subscriber computing device.

In determination block 1392, the server may determine whether all primary rules have been compared to the subscriber RCD.

In response to determining that not all primary rules have been compared to the subscriber RCD (i.e., determination block 1392="No"), the server may select the next primary rule in the rule sets for the multimedia file in block 1394, and compare the selected primary rule to the subscriber RCD to identify matching bit string in block 1386, generate a corresponding secondary rule in block 1388, and store and/or transmitted the generated secondary rule in block 1390 as described.

In response to determining that all primary rules have been compared to the subscriber RCD (i.e., determination block 1392="Yes"), the server may send the subscriber RCD transformation rule to the subscriber computing device if the rotation rule was not already transmitted in block 1344, and begin streaming the generated secondary rule sets to the subscriber computing device if the server have not already started streaming secondary rules to the subscriber computing device in block 1390. In embodiments in which the subscriber RCD transformation rule has already been sent to the subscriber computing device and secondary rules are being streamed to the subscriber computing device as they are generated (e.g., in block 1390), the processor may end the method as the entire media file will have been assembled for rendering at this point.

For applications in which the various embodiments are used for delivering media files, such as streaming movie and video clips, the RCD may be custom developed to provide large chunks of bits that appear frequently in such files. Such a custom developed RCD may then enable media files to be transmitted with rules linked to a set of frequently repeating large strings of bits. This may enable the RCD to be smaller in size since the information contained in the RCD files are bit strings that are likely to be matched to the media file being transmitted, leaving out data that is unlikely to match to portions of the media file.

As described above, such custom developed RCDs may be developed by individual media service providers (e.g., Netflix, Amazon, Hulu, etc.) to their own media transmission requirements. For example, each media delivery service provider may have their own proprietary RCD files that are shared with subscribers upon sign-up. Thus, a rule set from a given media service provider for a particular media file (e.g., a movie) can only be used with the RCD of that media service provider. Additionally, media service providers may generate multiple RCDs, such as for different genre or types of media files to be delivered.

A variety of methods may be used for generating custom RCDs for transmitting media. In general, such methods may involve scanning one or more media files to identify large chunks of bits that appear multiple times within media files, and generating a database or data table of such bit chunks correlated to an index or rule set. FIG. 14 illustrates a nonlimiting example of one such method 1400 for purposes of demonstrating how one of skill ordinary in the art may process media files to generate a custom RCD.

Referring to FIG. 14, the method 1400 may be implemented on a server or a system of multiple servers (e.g., within a server farm) with access to a large memory. The operations of the method 1400 may be performed offline and over a long period of time.

In block 1402, the server may create a working copy of one or more media files, such as by copying an entire movie file into memory accessible to the server. The creation of a working copy enables the processor to manipulate the data without affecting the media file that will be provided to subscribers. In some embodiments or implementations, only a single file may be copied in block 1402. In some embodiments or implementations, multiple media files, such as several movies of a particular genre, may be copied into a single working file to enable identification of bit string chunks that appear in all of the media files.

In block 1404, the server may select and initial chunk size to use for searching for repeating bit string chunks. The initial chunk size may be determined statistically based on an analysis of the media file. Alternatively, the chunk size may be selected arbitrarily based on the nature of the media file to be distributed. For example, the maximum chunk size may be limited to the data in a single frame of the movie file as it is unlikely that different movies will include an identical sequence of image frames. As another example, the initial chunk size may be limited to one half (or another fraction) of the size of a single frame of a movie file.

In block 1406, the server may select a starting string of bits of the selected chunk size within the media file. In some embodiments, the server may start with the first bit and include all of the bits sequentially up to the selected chunk size. In some embodiments, the server may start somewhere within the media file, such as following a metadata portion of the media file beginning where the rendered image data begins to appear. In this operation, the server may copy all of the bits from the media file starting from the first bit at the selected starting point through the end of the selected chunk size. In some embodiments, the server may copy this selected string of bits to a portion of memory that is readily accessible, such as a large buffer or comparison register.

In block 1408, the server may select a starting point for a chunk size window within the media file. The bits in the media file within the chunk size window from the starting point will be compared to the string of bits selected in block 1406 (and later in block 1428).

In block 1410 and determination block 1412, the server may compare the selected string of bits to the bits within the chunk size window to determine whether there is a match. In some embodiments, this comparison may simply be a bit to bit comparison of the string of bits temporarily stored in memory to the bits within the chunk size window of the media file. In some embodiments, any of a number of algorithms may be used to simplify or shorten the comparison operation, such as rapidly determining that there is no match based on a simple calculation or hash. For example, the bits within the chunk size window of the media file may be processed in a hash routine to generate a hash result that may be compared to a hash of the string of bits stored in memory. The hash may be run on the selected string of bits at the time those bits are selected (i.e., in block 1406 or block 1428), and then run on the bits within the chunk size window as an initial comparison step. If the hash results do not match, then the strings of bits will also not match, and therefore no further comparisons may be needed. Further sampling of selected bits may be performed to quickly eliminate nonmatching windows of media file bits, such as comparing first and last bits to the first and last bits of the selected string. Thus, the comparison performed in block 1410 and determination block 1412 may be accomplished quickly except for cases where there is a match or a near match, in which case a bit by bit comparison may be performed after initial filtering or hash comparisons are performed.

In response to determining that the bits within the chunk size window of the working media file match the string of bits of the selected chunk size (i.e., determination block 1412="Yes"), the server may temporarily store the location within the working copy of the media file of the chunk size window matching the string of bits in optional block 1414, and increment a count of the number of times that the string of bits matches bits within the chunk size window in block 1416. Storing the temporary location of the chunk size window within the working media file is optional because the information is not needed to generate RCD, but may be used later to delete those bits from the working file in block 1426 as described below as a way to speed the analysis of the working copy of the media file by avoiding comparing those same bits to other strings of bits.

In response to determining that the bits within the chunk size window of the working media file do not match the string of bits of the selected chunk size (i.e., determination block 1412="No") or after the operations in optional block 1414 and block 1416, the server may shift the chunk size window within the working copy of the media file a predetermined increment, such as a single bit or one byte.

In determination block 1420, the server may determine whether the end of the working copy of the media file is reached within the shifted chunk size window.

In response to determining that the end of the working copy of the media has not been reached within the shifted chunk size window (i.e., determination block 1420="No"), the server may again compare the selected string of bits to the bits within the chunk size window of the working media file in block 1410 and determination block 1412 as described. Thus, in the operations blocks 1410 through 1420, the server may incrementally compare the selected string of bits to the working copy of the media file in shifting windows until the entire media file has been compared.

In response to determining that the end of the working copy of the media file has been reached within the shifted chunk size window (i.e., determination block 1420="Yes"), the server may compare the number of times that the selected string of bits matched the bits within the chunk size window to a threshold value in determination block 1422. This comparison may be used to determine whether the selected string of bits matches strings of bits within the media file frequently enough to justify including the string within the RCD. For example, the threshold may be 2 or more. There may be a trade-off between the size of the RCD in the threshold for the chunk match count that a media delivery service may want to adjust. On the one hand, the larger the string of bits associated with a single rule or index, the more information that is communicated with that rule/index. On the other hand, a large string of bits matching only a few portions of a media file will increase the size of the RCD but may not result in a significant reduction in the amount of information transmitted (i.e., the rule set) when delivering the media file to consumer.

In response to determining that the number of times that the selected string of bits matched bits within the chunk size window of the working media file equals or exceeds the threshold value (i.e., determination block 1422="Yes"), the server may store the selected string of bits to the RCD along with an index for location rule for finding the that string of bits within the RCD in 1424. In some embodiments, the selected string of bits may be stored to the RCD in a new record within a database, with the index being an identifier of that record. In some embodiments, the selected string of bits may be stored to the RCD adjacent to the previously stored bits, and a rule may be generated to enable finding where the selected string of bits begins in the RCD, such as starting point and string length values.

In optional block 1426, the server may delete all of the matching strings of bits from the working copy of the media file using the temporarily stored locations of the matched string bits temporarily stored in block 1414. As noted above, the leading matched strings of bits from the working copy of the media file will reduce the amount of data that is compared in subsequent passes through the method 1400, which may accelerate the generation of the RCD. On the other hand, not the leading the matched strings of bits will enable the method to identify smaller strings of bits (i.e., using smaller chunk sizes) that have a high frequency of occurrence.

In response to determining that the number of times that the string of bits matches bits within the chunk size window is less than the threshold (i.e., determination block 1422="No"), or after storing the selected strings of bits to the RCD in block 1424, the server may select a next string of bits of the selected chunk size within the media file in block 1428. At this point in the method 1400, the server has compared the previously selected string of bits to all bits within the working copy of the media file, counted the number of matches, and stored the string of bits to the RCD if there are a sufficient number of matches. Thus, the server selects the next string of bits to be compared to the working copy of the media file in chunk size windows. In some embodiments, the server may select the next string of bits beginning with the next bit, thus overlapping the previous string of bits by all the one bit. In some embodiments, the server may select the next string of bits beginning a certain number of bits, such as one byte, from the start of the previous selected string of bits.

In determination block 1430, the server may determine whether the selected next string of bits includes the end of the working copy of the media file. Said another way, the server may determine in determination block 1430 whether every string of bits of the selected chunk size have been compared through the working copy of the media file.

In response to determining that the end of the media file is not included in the selected string of bits (i.e., determination block 1430="No"), the server may select a starting point for a chunk size window in the working copy of the media file in block 1408 and repeat the operations of comparing the newly selected string of bits to bits within a moving chunk size window of the working copy of the media file in blocks 1410-1426 as described above. Thus, until the selected string of bits reaches the end of the media file, the server compares strings of bits equal to the selected chunk size (determined in either block 1406 or 1432) to bits within the working copy of the media file.

In response to determining that the end of the media file is included in the selected string of bits (i.e., determination block 1430=Yes"), the server may decrement the selected chunk size by an amount in block 1432. Said another way, having compared all or substantially all of the strings of bits within the media file with a length equal to the previously selected chunk size to windows of bits of the same chunk size within the working copy of the media file, and stored to the RCD the strings of bits of that length found to be repeating multiple times, the server reduces the size of the of the chunks that are compared in a next iteration of the operations of the method 1400 from block 1406 to determination block 1430. The amount by which the selected chunk size is decremented in block 1432 may vary. For example, the chunk size may be decremented by one bit in some embodiments. As another example, the chunk size may be decremented by one byte in some embodiments. As another example, the chunk size may be reduced by a factor of two in some embodiments.

Incrementally reducing the chunk size for subsequent iterations of the method 1400 enables the server to identify shorter repeating strings of bits. As the chunk size reduces with each iteration, the frequency of repeating strings of bits is anticipated to increase. In an initial iteration through of the method 1400, there may be no repeating strings of bits with a length equal to the initially selected chunk size, and the first few passes through the method 1400 may yield no additions to the RCD until the selected chunk size reaches a point at which multiple repetitions of bit strings begin to be observed.

In determination block 1434, the server may determine whether the newly selected chunk size is less than a minimum chunk length. The minimum chunk length may be a size of bits strings below which there is little benefit in terms of information communicated to a receiver device by providing an index or rule to the RCD instead of communicating the raw data directly. In other words, if the index or rule required to identify the location in the RCD of a string of bits requires the same number of bits is in the string, there is little to no benefit of referring to the RCD. For example, if the index or rule required to identify the location in the RCD of a string of bits requires three bytes of data, the minimum length for the chunk size may be 4 bytes (i.e., 32 bits).

In response to determining that the chunk size selected in block 1432 is greater than the minimum length (i.e., determination block 1434="No"), the server may select a starting string of bits of the selected chunk size within the media file in block 1406 and repeat the operations of blocks 1406 through 1434 as described above.

In response to determining that the chunk size selected in block 1432 is less than the minimum length (i.e., determination block 1434="Yes"), the server may store the RCD along with an index or rule set for use in the various embodiments because the entire media file has been analyzed and the RCD populated with multiple repeating strings of bits.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, 700, 800a, 800b, 900a, 900b, 1000, 1100a, 1100b, 1200, 1300, 1302a, 1304a, 1306a, 1302b, 1304b, 1306b, 1306c, and 1400 may be substituted for or combined with one or more operations of the methods 400, 500, 600, 700, 800a, 800b, 900a, 900b, 1000, 1100a, 1100b, 1200, 1300, 1302a, 1304a, 1306a, 1302b, 1304b, 1306b, 1306c, and 1400.

Figure 15:
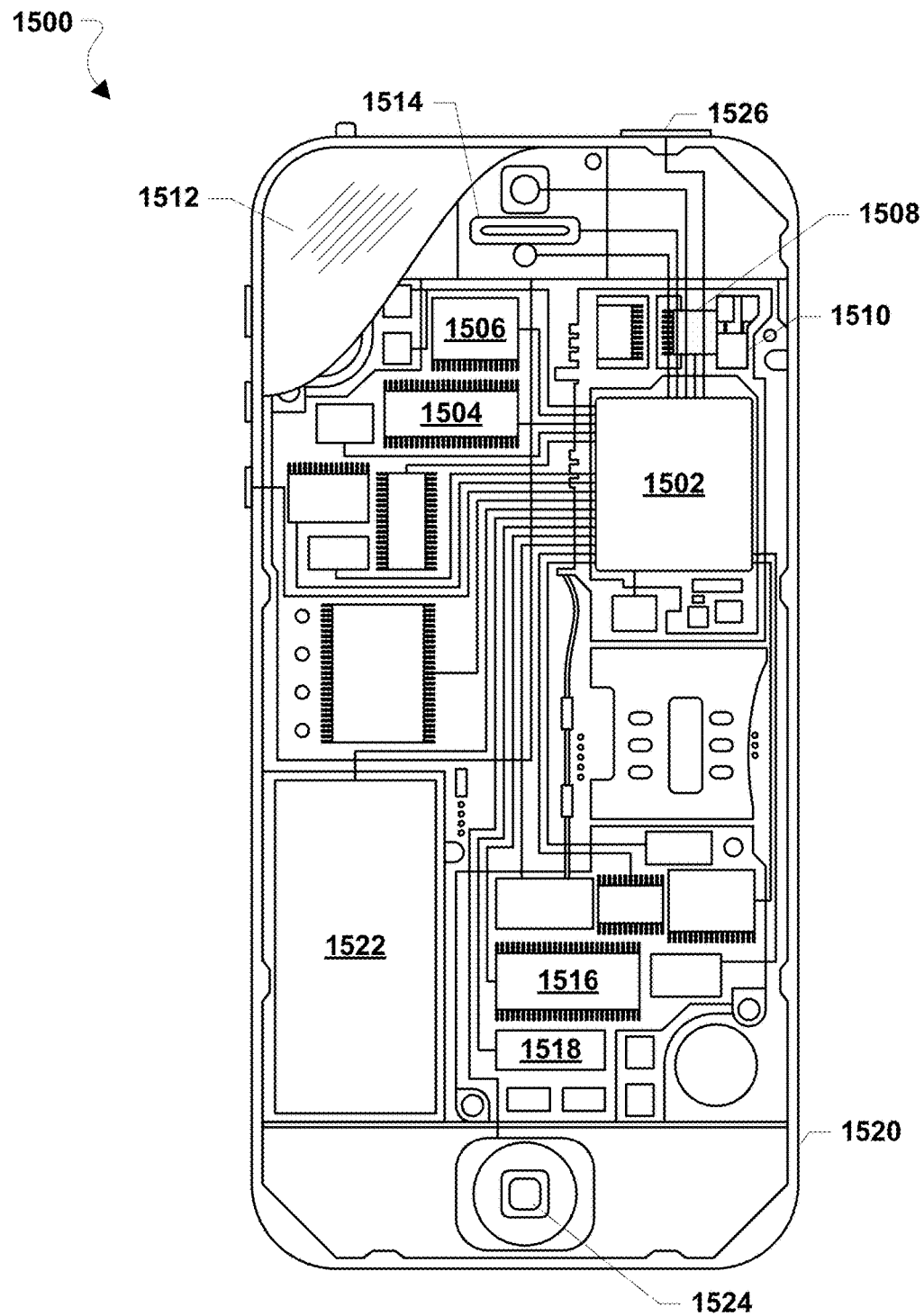
FIG. 15 is a component block diagram of a mobile wireless computing device suitable for implementing various embodiments.

FIG. 15 is a component block diagram of a mobile wireless communication device 1500 suitable for implementing various embodiments. With reference to FIGS. 1A-15, the mobile wireless communication device 1500 may include a processor 1502 coupled to a touchscreen controller 1506 and an internal memory 1504. The processor 1502 may be one or more multi-core integrated circuits designated for general or specific processing tasks. The internal memory 1504 may be volatile or non-volatile memory, and may also be secure and/or encrypted memory, or unsecure and/or unencrypted memory, or any combination thereof. The touchscreen controller 1506 and the processor 1502 may also be coupled to a touchscreen panel 1512, such as a resistive-sensing touchscreen, capacitive-sensing touchscreen, infrared sensing touchscreen, etc. Additionally, the display of the mobile wireless communication device 1500 need not have touch screen capability.

The mobile wireless communication device 1500 may have two or more radio signal transceivers 1508 (e.g., Bluetooth, Zigbee, Wi-Fi, radio frequency (RF), etc.) and antennae 1510, for sending and receiving communications, coupled to each other and/or to the processor 1502. The transceivers 1508 and antennae 1510 may be used with the above-mentioned circuitry to implement the various wireless transmission protocol stacks and interfaces. The mobile wireless communication device 1500 may include one or more cellular network wireless modem chip(s) 1516 coupled to the processor and antennae 1510 that enables communication via two or more cellular networks via two or more radio access technologies.

The mobile wireless communication device 1500 may include a peripheral wireless device connection interface 1518 coupled to the processor 1502. The peripheral wireless device connection interface 1518 may be singularly configured to accept one type of connection, or may be configured to accept various types of physical and communication connections, common or proprietary, such as USB, FireWire, Thunderbolt, or PCIe. The peripheral wireless device connection interface 1518 may also be coupled to a similarly configured peripheral wireless device connection port (not shown).

The mobile wireless communication device 1500 may also include speakers 1514 for providing audio outputs. The mobile wireless communication device 1500 may also include a housing 1520, constructed of a plastic, metal, or a combination of materials, for containing all or some of the components discussed herein. The mobile wireless communication device 1500 may include a power source 1522 coupled to the processor 1502, such as a disposable or rechargeable battery. The rechargeable battery may also be coupled to the peripheral wireless device connection port to receive a charging current from a source external to the mobile wireless communication device 1500. The mobile wireless communication device 1500 may also include a physical button 1524 for receiving user inputs. The mobile wireless communication device 1500 may also include a power button 1526 for turning the mobile wireless communication device 1500 on and off.

Figure 16:
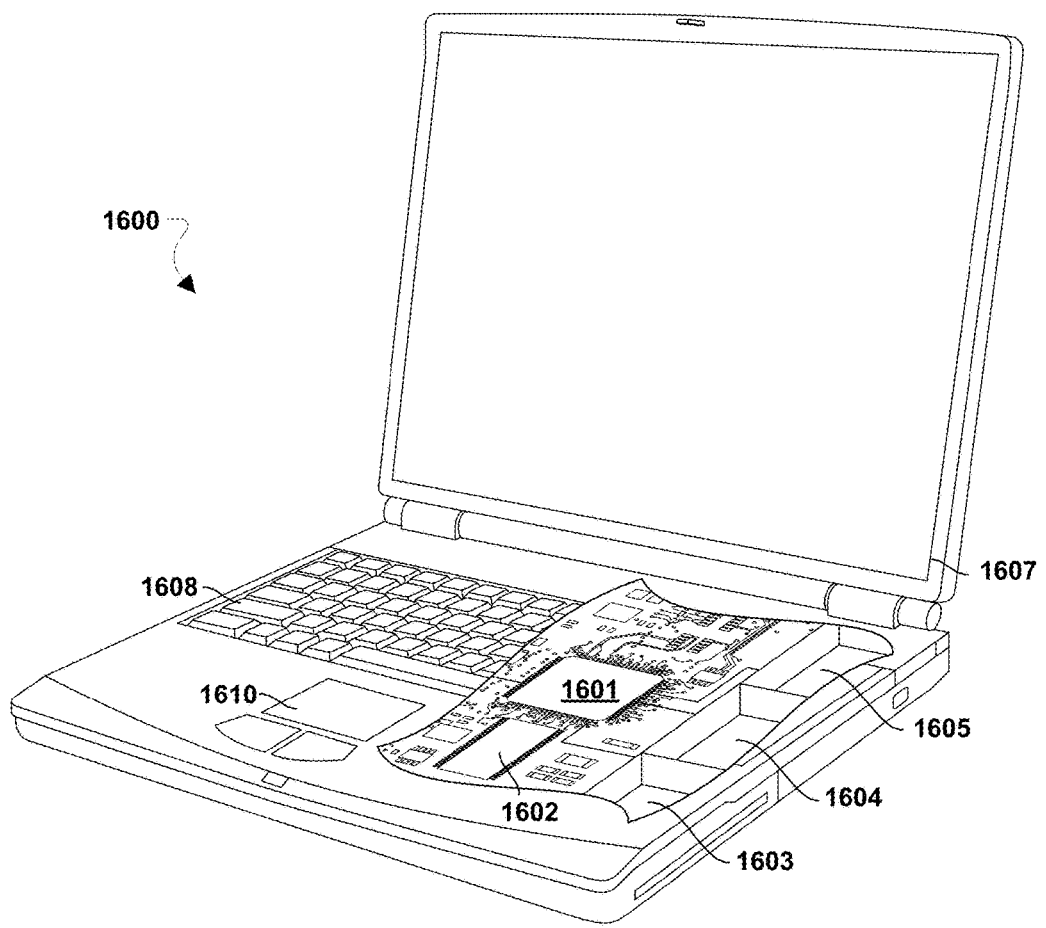
FIG. 16 is a component block diagram of a portable wireless communication device suitable for implementing various embodiments.

Other forms of computing devices may also benefit from the various aspects. Such computing devices typically include the components illustrated in FIG. 16, which illustrates an example laptop computer 1600. With reference to FIGS. 1A-16, the computer 1600 generally includes a processor 1601 coupled to volatile memory 1602 and a large capacity nonvolatile memory, such as a disk drive 1603. The computer 1600 may also include a compact disc (CD) and/or DVD drive 1604 coupled to the processor 1601. The computer 1600 may also include a number of connector ports coupled to the processor 1601 for establishing data connections or receiving external memory devices, such as a network connection circuit 1605 for coupling the processor 1601 to a network. The computer 1600 may also include a display 1607, a keyboard 1608, a pointing device such as a trackpad 1610, and other similar devices.

Figure 17:
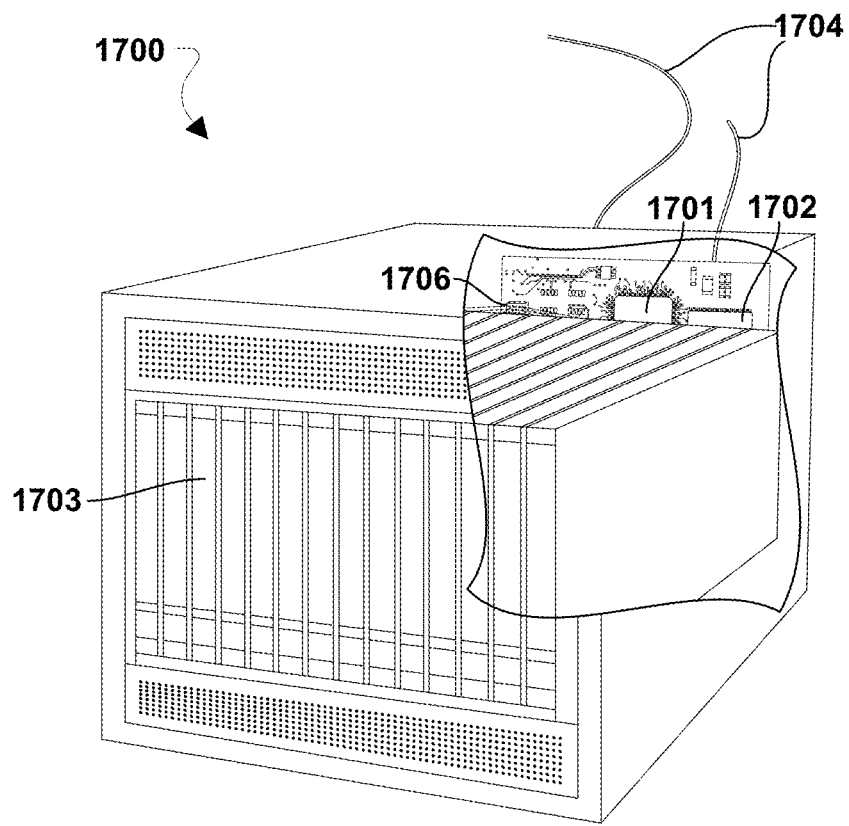
FIG. 17 is a component block diagram of a server device suitable for implementing various embodiments.

Various embodiments may employ a computing device as a network element of a communication network. Such network elements may typically include at least the components illustrated in FIG. 17, which illustrates an example network element, server device 1700. With reference to FIGS. 1A-17, the server device 1700 may typically include a processor 1701 coupled to volatile memory 1702 and a large capacity nonvolatile memory, such as a disk drive 1703. The server device 1700 may also include a peripheral memory access device such as a floppy disc drive, compact disc (CD) or digital video disc (DVD) drive 1706 coupled to the processor 1701. The server device 1700 may also include network access ports 1704 (or interfaces) coupled to the processor 1701 for establishing data connections with a network, such as the Internet and/or a local area network coupled to other system computers and servers. Similarly, the server device 1700 may include additional access ports, such as USB, Firewire, Thunderbolt, and the like for coupling to peripherals, external memory, or other devices.

The processors 1502, 1601, 1701 may be any programmable microprocessor, microcomputer or multiple processor chip or chips that can be configured by software instructions (applications) to perform a variety of functions, including the functions of the various aspects described below. In some mobile devices, multiple processors 1602 may be provided, such as one processor dedicated to wireless communication functions and one processor dedicated to running other applications. Typically, software applications may be stored in the internal memory 1504, 1602, 1702 before they are accessed and loaded into the processor 1502, 1601, 1701. The processor 1502, 1601, 1701 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of conveying a data file from a first computing device to a second computing device, comprising:
   analyzing one or more data files representative of the data file to be transmitted to identify long bit strings that appear at least a threshold number of times;
   storing in a referential complex dataset (RCD) each long bit string that appears at least a threshold number of times;
   generating an index for locating each long bit string stored in the RCD;
   generating metadata corresponding to each long bit string stored in the RCD that provides information useful for comparing data files to the RCD to identify matching long bit strings;
   storing the generated metadata in association with the corresponding long bit string;
   transmitting the RCD to the second computing device for storage;
   storing the RCD in memory of the first computing device and in memory of the second computing device;
   performing by a processor of the first computing device the following operations sequentially on the data file until the entire data file has been processed:
      comparing bit strings within the data file to bit strings within the RCD to identify a matching bit string in the RCD, by using metadata associated with a matched bit string in the RCD to determine whether a longer bit string including the same matched bits exists in the RCD;

generating a rule for locating the matched bit string in the RCD comprising
storing the index for the matched bit string in the rule set; and
storing the generated rule sequentially in a rule set; and
transmitting the rule set to the second computing device.

2. The method of claim 1, wherein storing the RCD in memory of the first computing device and in memory of the second computing device comprises:
generating, by the processor of the first computing device, a rule for changing the RCD stored in the memories of both the first computing device and the second computing device;
applying, by the processor of the first computing device, the generated rule to the RCD stored in memory of the first computing device to generate a changed RCD; and
transmitting the rule to the second computing device in a format that will enable a processor of the second computing device to apply the rule to the RCD stored in the memory of the second computing device to generate the changed RCD in the second computing device.

3. The method of claim 1, further comprising:
storing a subscriber RCD in memory of the first computing device and in memory of the second computing device;
performing by the processor of the first computing device the following operations sequentially on the rule set until the entire rule set has been processed:
comparing a bit string of each rule in the rule set to bit strings within the subscriber RCD to identify a matching bit string in the subscriber RCD;
generating a secondary rule for locating the matched bit string in the subscriber RCD; and
storing the generated secondary rule in a secondary rule set,
wherein transmitting the rule set to the second computing device comprises transmitting the secondary rule set to the second computing device.

4. The method of claim 3, further comprising:
receiving the secondary rule set in the second computing device;
sequentially using each secondary rule in the secondary rule set to identify corresponding bit strings in the subscriber RCD in memory;
using the identified corresponding bit strings in the subscriber RCD as rule to identify corresponding bit strings in the RCD in memory; and
copying the identified bit strings into a memory to replicate the data file.

5. The method of claim 1, wherein the data file to be transmitted is a multimedia file and analyzing one or more data files representative of the data file comprises analyzing one or more multimedia files having a similarity to the multimedia file to be transmitted.

6. The method of claim 1, further comprising:
receiving the rule set in the second computing device;
sequentially using each rule in the rule set to identify corresponding bit strings in the RCD in memory; and
copying the identified bit strings into a memory to replicate the data file.

7. The method of claim 6, further comprising:
processing the replicated data file using an application compatible with the data file processed by the first computing device.

8. A computing device, comprising:
a memory; and
a processor coupled to the memory and configured with processor-executable instructions to perform operations comprising:
analyzing one or more data files representative of the data file to be transmitted to identify long bit strings that appear at least a threshold number of times;
storing in a referential complex dataset (RCD) each long bit string that appear at least a threshold number of times;
generating an index for locating each long bit string stored in the RCD;
generating metadata corresponding to each long bit string stored in the RCD that provides information useful for comparing data files to the RCD to identify matching long bit strings;
storing the generated metadata in association with the corresponding long bit string;
transmitting the RCD to the second computing device for storage;
storing in the memory the RCD,
wherein the RCD is the same as an RCD stored in a memory of a second computing device;
performing the following operations sequentially on the data file until the entire data file has been processed:
comparing bit strings within the data file to bit strings within the RCD to identify a matching bit string in the RCD, by using metadata associated with a matched bit string in the RCD to determine whether a longer bit string including the same matched bits exists in the RCD;
generating a rule for locating the matched bit string in the RCD comprising storing the index for the matched bit string in the rule set; and
storing the generated rule sequentially in a rule set; and
transmitting the rule set to the second computing device.

9. The computing device of claim 8, wherein the processor is configured with processor-executable instructions to perform operations such that storing in the memory the RCD that is the same as the RCD stored in the memory of the second computing device comprises:
generating a rule for changing the RCD stored in memories of both the first computing device and the second computing device;
applying the generated rule to the RCD stored in the memory to generate a changed RCD; and
transmitting the rule to the second computing device in a format that will enable a processor of the second computing device to apply the rule to the RCD to generate the changed RCD in the second computing device.

10. The computing device of claim 8, wherein the processor is configured with processor-executable instructions to perform operations further comprising:
storing a subscriber RCD in the memory of the first computing device;
providing the subscriber RCD to the second computing device for storage in the memory of the second computing device;
performing by the processor of the first computing device the following operations sequentially on the rule set until the entire rule set has been processed:
comparing a bit string of each rule in the rule set to bit strings within the subscriber RCD to identify a matching bit string in the subscriber RCD;

generating a secondary rule for locating the matched bit string in the subscriber RCD; and storing the generated secondary rule in a secondary rule set, wherein transmitting the rule set to the second computing device comprises transmitting the secondary rule set to the second computing device.

11. The computing device of claim 8, wherein the data file to be transmitted is a multimedia file and analyzing one or more data files representative of the data file comprises analyzing one or more multimedia files having a similarity to the multimedia file to be transmitted.

12. A non-transitory processor-readable storage medium having stored thereon processor-executable instructions configured to cause a processor of a computing device to perform operations comprising:

analyzing one or more data files representative of the data file to be transmitted to identify long bit strings that appear at least a threshold number of times;

storing in a referential complex dataset (RCD) each long bit string that appears at least a threshold number of times;

generating an index for locating each long bit string stored in the RCD;

generating metadata corresponding to each long bit string stored in the RCD that provides information useful for comparing data files to the RCD to identify matching long bit strings;

storing the generated metadata in association with the corresponding long bit string;

transmitting the RCD to the second computing device for storage;

storing in a memory the RCD, wherein the RCD is the same as an RCD stored in a memory of a second computing device;

performing the following operations sequentially on the data file until the entire data file has been processed:

comparing bit strings within the data file to bit strings within the RCD to identify a matching bit string in the RCD, by using metadata associated with a matched bit string in the RCD to determine whether a longer bit string including the same matched bits exists in the RCD;

generating a rule for locating the matched bit string in the RCD; and storing the generated rule sequentially in a rule set; and transmitting the rule set to the second computing device.

13. The non-transitory processor-readable storage medium of claim 12, wherein the stored processor-executable instructions are configured to cause the processor of the computing device to perform operations such that storing in the memory the RCD that is the same as the RCD stored in the memory of the second computing device comprises:

generating a rule for changing the RCD stored in memories of both the first computing device and the second computing device;

applying the generated rule to the RCD stored in the memory to generate a changed RCD; and transmitting the rule to the second computing device in a format that will enable a processor of the second computing device to apply the rule to the RCD to generate the changed RCD in the second computing device.

14. The non-transitory processor-readable storage medium of claim 12, wherein the stored processor-executable instructions are configured to cause the processor of the computing device to perform operations further comprising:

storing a subscriber RCD in the memory of the first computing device;

providing the subscriber RCD to the second computing device for storage in the memory of the second computing device;

performing by the processor of the first computing device the following operations sequentially on the rule set until the entire rule set has been processed:

comparing a bit string of each rule in the rule set to bit strings within the subscriber RCD to identify a matching bit string in the subscriber RCD;

generating a secondary rule for locating the matched bit string in the subscriber RCD; and storing the generated secondary rule in a secondary rule set, wherein transmitting the rule set to the second computing device comprises transmitting the secondary rule set to the second computing device.

15. The non-transitory processor-readable storage medium of claim 12, wherein the data file to be transmitted is a multimedia file and analyzing one or more data files representative of the data file comprises analyzing one or more multimedia files having a similarity to the multimedia file to be transmitted.

* * * * *